(12) United States Patent
Tiernan et al.

(10) Patent No.: US 8,755,401 B2
(45) Date of Patent: *Jun. 17, 2014

(54) SYSTEM AND METHOD FOR SCALABLE MULTIFUNCTIONAL NETWORK COMMUNICATION

(75) Inventors: James C. Tiernan, Solana Beach, CA (US); Jonathan Fellows, Del Mar, CA (US)

(73) Assignee: Paganini Foundation, L.L.C., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,557

(22) Filed: Aug. 13, 2012

(65) Prior Publication Data

US 2013/0128897 A1     May 23, 2013

Related U.S. Application Data

(63) Continuation of application No. 10/578,739, filed on May 10, 2006, now Pat. No. 8,243,747.

(51) Int. Cl.
*H04J 3/26* (2006.01)
*H04B 7/212* (2006.01)
*H04L 12/413* (2006.01)
*H04L 12/43* (2006.01)
*H04J 3/16* (2006.01)
*H04J 1/00* (2006.01)

(52) U.S. Cl.
USPC ........... 370/432; 370/443; 370/447; 370/461; 370/468; 370/486

(58) Field of Classification Search
USPC .......................... 370/443, 447, 461, 468, 486
See application file for complete search history.

(56) References Cited

U.S. PATENT DOCUMENTS

| 5,012,469 A | 4/1991 | Sardana |
| 5,278,833 A | 1/1994 | Crisler et al. |

(Continued)

FOREIGN PATENT DOCUMENTS

| WO | 96/33590 | 10/1996 |
| WO | 98/47236 | 12/1998 |

(Continued)

OTHER PUBLICATIONS

Dail, James E. et al. "Adaptive Digital Access Protocol: A MAC Protocol for Multiservice Broadband Access Networks", IEEE Communications Magazine US, vol. 34, issue 3, Mar. 1996, pp. 104-112.

(Continued)

*Primary Examiner* — Brandon Renner
(74) *Attorney, Agent, or Firm* — Fitch, Even, Tabin & Flannery LLP

(57) ABSTRACT

A system and method for scalable multifunctional network communication between presentation devices and service providers are disclosed. A group of consumer premise equipment (CPE) units are coupled to the presentation devices, and a headend control computer receives upstream messages from the CPE units and for sending downstream messages to the CPE units. A group of service provider control subsystems interface between the headend control computer and the service providers. The head end control computer receives messages from the CPE units and transports them to the service provider control subsystems, and the headend control computer receives messages from the service provider control subsystems and transports them to the CPE units.

17 Claims, 21 Drawing Sheets

(56) References Cited

U.S. PATENT DOCUMENTS

| | | | |
|---|---|---|---|
| 5,390,181 A | | 2/1995 | Campbell et al. |
| 5,572,517 A | | 11/1996 | Safadi |
| 5,590,131 A | | 12/1996 | Kabatepe |
| 5,625,628 A | * | 4/1997 | Heath ................... 370/321 |
| 5,729,825 A | | 3/1998 | Kostreski et al. |
| 5,818,825 A | * | 10/1998 | Corrigan et al. ......... 370/329 |
| 5,867,485 A | | 2/1999 | Chambers et al. |
| 5,936,949 A | | 8/1999 | Pastermak et al. |
| 5,940,738 A | | 8/1999 | Rao |
| 5,963,557 A | * | 10/1999 | Eng ...................... 370/432 |
| 5,966,163 A | | 10/1999 | Lin et al. |
| 6,023,230 A | * | 2/2000 | Dorenbosch et al. ..... 340/7.24 |
| 6,028,867 A | | 2/2000 | Rawson et al. |
| 6,034,967 A | * | 3/2000 | Citta et al. ............. 370/443 |
| 6,038,213 A | * | 3/2000 | Albrow et al. ........... 370/229 |
| 6,041,056 A | | 3/2000 | Bigham et al. |
| 6,160,989 A | | 12/2000 | Hendricks et al. |
| 6,201,536 B1 | | 3/2001 | Hendricks et al. |
| 6,278,713 B1 | | 8/2001 | Campbell et al. |
| 6,292,493 B1 | | 9/2001 | Campbell et al. |
| 6,370,153 B1 | | 4/2002 | Eng |
| 6,408,009 B1 | | 6/2002 | Campbell et al. |
| 6,493,348 B1 | | 12/2002 | Gelman et al. |
| 6,667,967 B1 | | 12/2003 | Anderson et al. |
| 6,801,537 B1 | | 10/2004 | Kubbar |
| 6,931,003 B2 | | 8/2005 | Anderson |
| 6,988,148 B1 | | 1/2006 | Sheth |
| 6,999,477 B1 | | 2/2006 | Oz et al. |
| 7,027,461 B1 | | 4/2006 | Bontempi |
| 7,075,919 B1 | | 7/2006 | Wandt |
| 7,089,577 B1 | * | 8/2006 | Rakib et al. ............. 725/87 |
| 7,099,340 B2 | | 8/2006 | Liva et al. |
| 7,139,247 B2 | | 11/2006 | Desal et al. |
| 7,145,888 B2 | | 12/2006 | Dale et al. |
| 7,184,413 B2 | | 2/2007 | Beyer et al. |
| 7,277,450 B2 | * | 10/2007 | Neeley et al. ............ 370/420 |
| 7,840,981 B2 | | 11/2010 | Atwater et al. |
| 8,144,690 B2 | | 3/2012 | Richardson et al. |
| 8,243,747 B2 | | 8/2012 | Tiernan et al. |
| 2002/0048275 A1 | | 4/2002 | Atwater et al. |
| 2002/0061024 A1 | | 5/2002 | Malkernes et al. |
| 2002/0075875 A1 | | 6/2002 | Dravida et al. |
| 2002/0080816 A1 | | 6/2002 | Spinar et al. |
| 2002/0147833 A1 | | 10/2002 | Richardson et al. |
| 2003/0007508 A1 | | 1/2003 | Sala et al. |
| 2003/0143946 A1 | * | 7/2003 | Grzeczkowski ........... 455/3.05 |
| 2003/0176182 A1 | * | 9/2003 | Cerami et al. ........... 455/414.1 |
| 2004/0125818 A1 | | 7/2004 | Richardson et al. |
| 2004/0218609 A1 | | 11/2004 | Foster et al. |
| 2007/0047586 A1 | | 3/2007 | Tieman |
| 2007/0206117 A1 | | 9/2007 | Tian et al. |

FOREIGN PATENT DOCUMENTS

| | | |
|---|---|---|
| WO | 99/30242 | 6/1999 |
| WO | 99/31871 | 6/1999 |
| WO | 01/95569 | 12/2001 |
| WO | 2005/099197 | 10/2005 |

OTHER PUBLICATIONS

Nortel: Solutions: Long Term Evolution: Solution Literature: White Papers. Long-Term Evolution (LTE): The vision beyond 3G [online]. (Jul. 28, 2008) [retrieved Jan. 12, 2010].

* cited by examiner

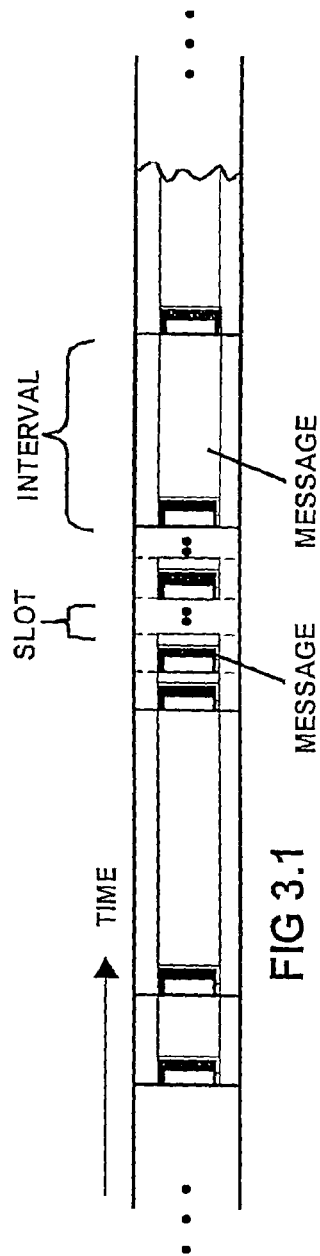
FIG 3.1
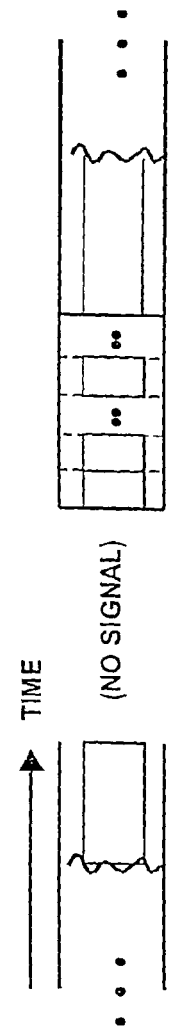
FIG 3.2
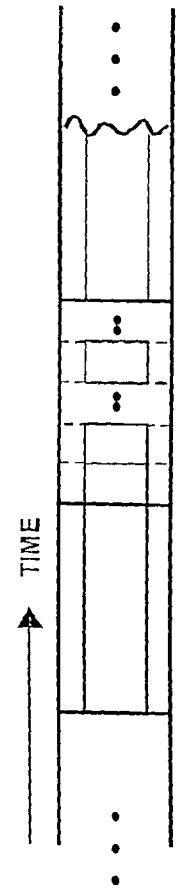
FIG 3.3
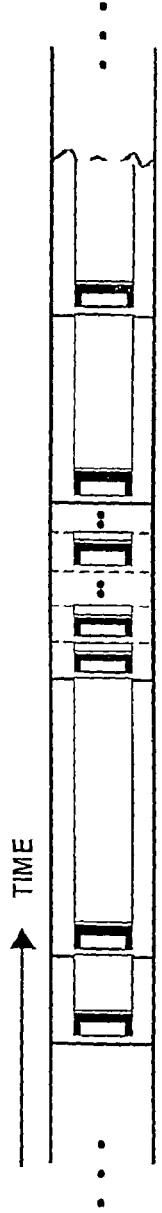
FIG 3.4

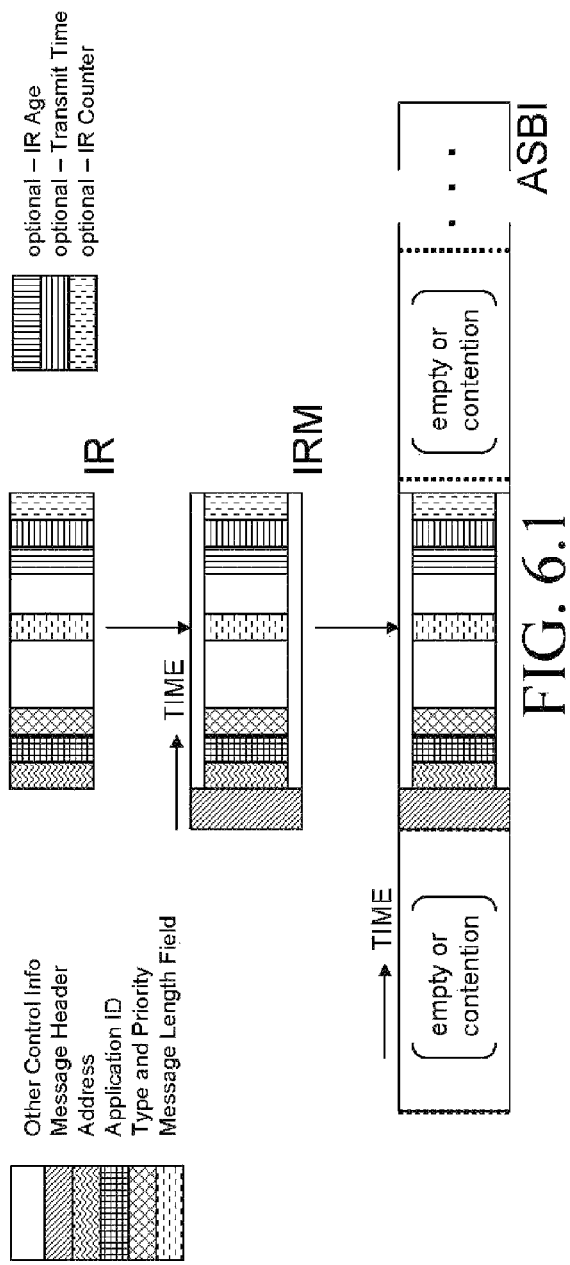
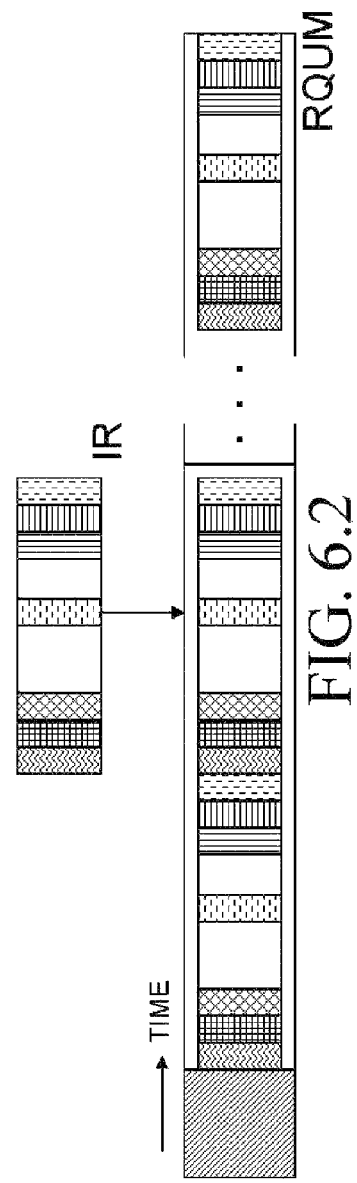
FIG. 6.1
FIG. 6.2

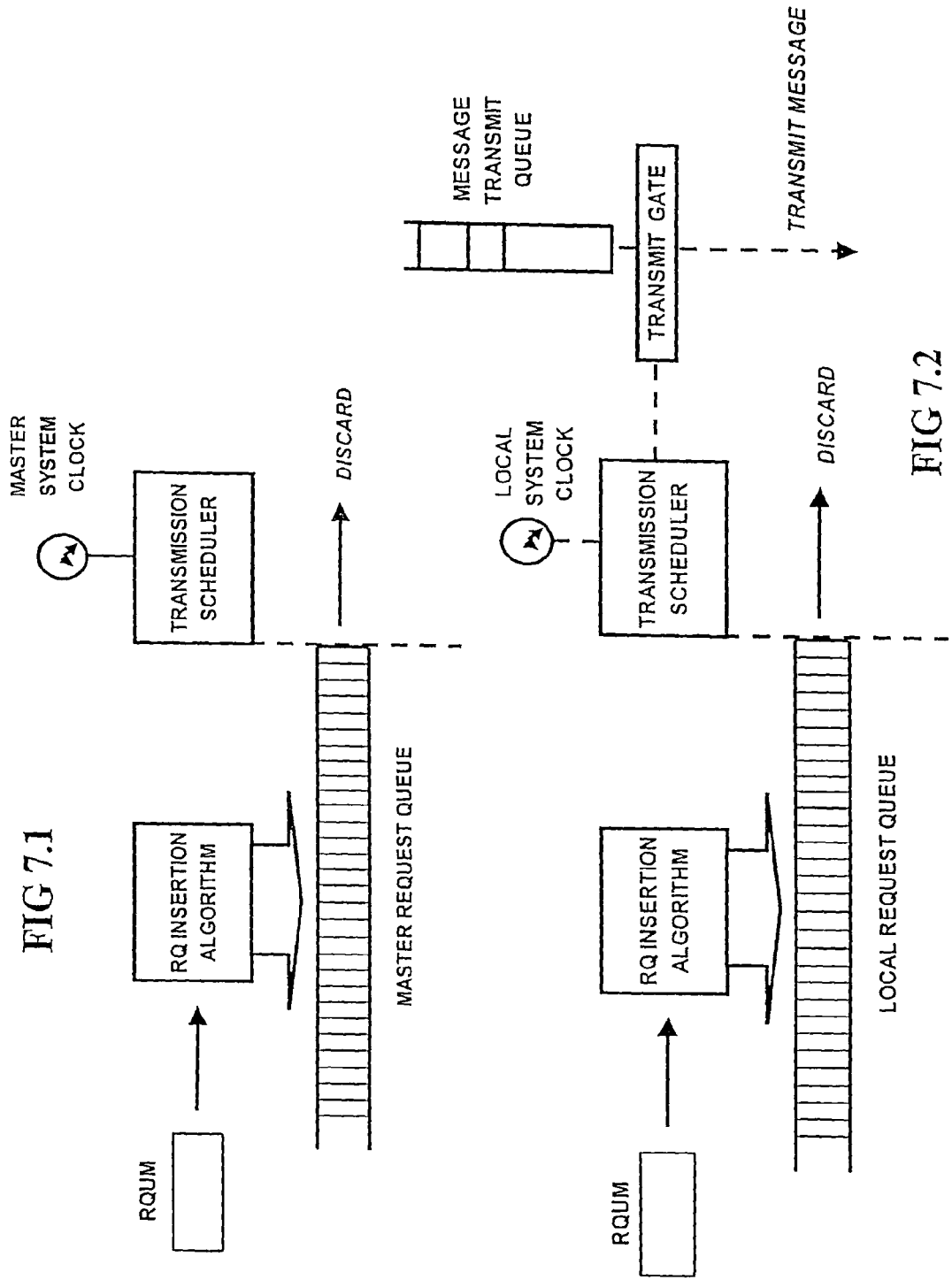

Np for Given Probability of Success with Request Limit

| Probability Of Success | Number of Request Attempts ||||| 
|---|---|---|---|---|---|
| | 16 | 8 | 4 | 2 | 1 |
| 99.9999% | 0.6 | 0.2 | | | |
| 99.9990% | 0.7 | 0.3 | | | |
| 99.9900% | 0.8 | 0.4 | 0.1 | | |
| 99.9000% | 1 | 0.6 | 0.2 | | |
| 99.0000% | | 0.8 | 0.4 | 0.1 | |
| 98.0000% | | 0.9 | 0.5 | 0.1 | |
| 95.0000% | | | 0.6 | 0.2 | |
| 90.0000% | | | 0.8 | 0.4 | 0.1 |

N = NUMBER OF USERS, N LARGE
p = PROB OF BSDP IR ATTEMPT IN AN ALOHA SLOT

FIG 16

SYSTEM AND METHOD FOR SCALABLE MULTIFUNCTIONAL NETWORK COMMUNICATION

This is a continuation application of U.S. patent application Ser. No. 10/578,739 filed on Mar. 25, 2005, which is incorporated herein as though set forth in full.

RELATED APPLICATION

The present invention claims priority to U.S. provisional patent application, entitled "Broadcast Spectrum Digital Pipe: A Scalable Medium Access Control Method," filed Mar. 26, 2005 and assigned Application No. 60/557,064.

BACKGROUND ART

There is no admission that the background art disclosed in this section legally constitutes prior art.

There have been many different types and kinds of communication networks. Reference may be made to U.S. Pat. Nos. 5,390,181; 5,590,131; 5,936,949; 5,966,163; 6,278,713; 6,292,493; 6,370,153; and 6,408,009. See also, Patent Cooperation Treaty, patent applications WO98/47236 and WO96/33590.

However, none of the foregoing patents disclose the "last mile problem," wherein a low cost scalable multi-functional network communication technique is provided for a premises such as private residences and businesses distributed throughout a large geographical location. In this regard, no one has successfully suggested the provision of such a communication network for low cost 2-way digital communication connectivity in a large metropolitan or rural area.

Modernly, fiber optic cable systems require the installation of cables to each individual premise of a subscriber. Such an undertaking is, of course, quite expensive and time consuming to install.

BRIEF DESCRIPTION OF THE DRAWINGS

The features of this invention and the manner of attaining them will become apparent, and the invention itself will be best understood by reference to the following description of certain embodiments of the invention taken in conjunction with the accompanying drawings, wherein:

FIGS. 3.1, 3.2, 3.3 and 3.4 are diagrams illustrating a channel structure for the system of FIG. 1A;

FIGS. 6.1 and 6.2 are diagrams illustrating an interval request for the system of FIG. 1A;

FIGS. 7.1 and 7.2 are diagrams showing request queue for the system of FIG. 1A;

FIGS. 11-19 are diagrams which are useful in understanding the disclosed embodiments of the invention.

DETAILED DESCRIPTION OF CERTAIN EMBODIMENTS OF THE INVENTION

Figure 1:
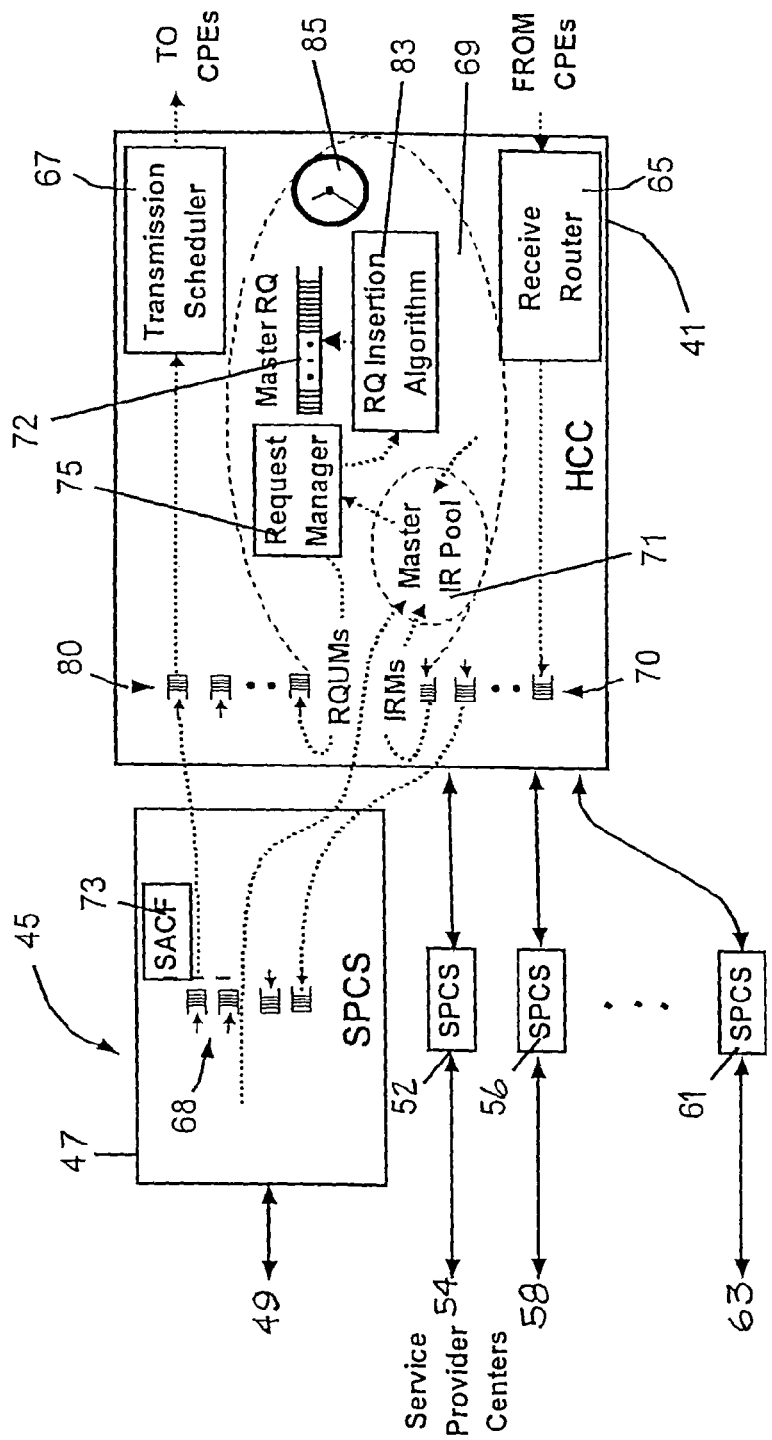
FIG. 1 is a symbolic block diagram of a headend control computer of the system of FIG. 1A.

A system and method for scalable multifunctional network communication between presentation devices and service providers are disclosed. A group of consumer premise equipment (CPE) units are coupled to the presentation devices, and a headend control computer receives upstream messages from the CPE units and sends downstream messages to the CPE units. A group of service provider control subsystems interface between the headend control computer and the service providers. The headend control computer receives messages from the CPE units and transports them to the service provider control subsystems, and the headend control computer receives messages from the service provider control subsystems and transports them to the CPE units.

The disclosed embodiments of the invention provide a system and method for low-cost two-way digital communications connectivity between consumer premise equipment (CPE) for use in homes or other premises and a hub including a headend computer control and service provider control subsystems, for a full metropolitan or other area. The method of the disclosed embodiment may be used for low-cost, two-way digital connectivity within embodiments entailing a variety of location arrangements and applications, ranging from the urban environment cited above, to providing low-cost two-way digital connectivity between a number of businesses in a rural or other geographical setting. The disclosed methods may be implemented in a broad range of physical media, and substantially all known or at least many physical layer technologies, including, but not limited to, wireless, fiber optics, telephone exchange, LAN, cable, and satellite. The disclosed methods may be implemented in a variety of terminal technologies including, but not limited to, fixed or mobile terminals. The presently referenced embodiment media is wireless, operating in a frequency range such that homes within a range of about 50 miles of the hub may be served. The disclosed method may be implemented with low-cost CPE equipment; the cost being minimized because the CPE equipment may only need to receive on a fixed channel from a fixed direction and transmit on a fixed channel in a fixed direction.

The method and system of the disclosed embodiments provide two-way digital communications connectivity between very many CPEs and an HCC in a single configuration, so that the number of terminals may not be limited except in that the access time available to them is smoothly reduced as the number of terminals increases. The disclosed embodiments usefully serve a large number of CPEs with digital services within a moderate and practical frequency bandwidth. The disclosed method may support assignment of uplink communications capacity in response to user needs as they develop in real-time. The disclosed method may not be sensitive to the purpose or use of data whose communications it regulates. A purpose is that the disclosed method support Internet access at low cost, but, in addition, telephone, Interactive education, broadcast television, radio, and substantively all other services requiring digital communications at a distance may be supported.

According to the disclosed embodiments, the CPEs' presentation devices can communicate directly with services, as manifest by service provider control subsystems that are associated, and possibly co-located with the headend, and can communicate with other CPEs' presentation devices indirectly through service provider control subsystems; to wit, information flowing from one CPE to another flows to the headend from the source CPE, out of the headend to a service provider control subsystem, is forwarded by that service provider control subsystem back to the headend, and therefrom on the downstream to the destination CPE.

The communication system of the disclosed embodiment provides communication with efficient use of channel capacity, such that only a small percentage of available communications capacity is required to support the method itself. The disclosed method may support data transmission with low delay among the CPEs of the network, or between a CPE and a service provider subsystem—within delay limits appropriate to supporting telephone conversations and video transmission either between CPEs or into and out of the network.

The disclosed system and method as disclosed may support a large number of CPEs—typically homes and/or businesses. There is no rigid limit on the number of terminals which may be supported in a given bandwidth. Many users with typical access patterns may be supported per Hertz of bandwidth in an efficient manner. The disclosed system and method allows the practical and effective use of a wireless media to reach a large number of users from a single hub with a general purpose high-bandwidth two-way digital connection. The broadcast spectrum in the range of 50 to 800 MHz may be such a medium. With the disclosed embodiments, capacity is used efficiently. When a network is operating at the traffic load level for which it is designed, with reasonable fluctuations around this load level, such traffic loading called herein later the Operating Point of the subject network, the uplink channel capacity is used with efficiency between 90% and 100%. Efficiency may be inherent for some applications because these applications may avoid dedicated assignment of capacity to users during transactions, such dedicated assignments usually being called circuits. Efficiency may be augmented by the distributed control of the disclosed method, which limits control traffic overhead.

Comment: Small "n" or large "N" for "network" above and below?

The disclosed Network may not be fully loaded with traffic, and is flexible to loading. Delay of sending messages through a network using the disclosed method decreases with decreased traffic loading. Delay of traffic through a fully loaded network in a typical embodiment may be below the level of sensitivity for the telephone application.

The effectiveness of the disclosed method is not affected by the purpose of the data it carries. Internet access, telephone access, television delivery, and interactive education and other social services may be brought to the home or other premise. The effectiveness of the disclosed method is not affected by the nature of the presentation devices at the CPE. Such devices may be custom devices or off-the-shelf devices such as personal computers, laptops, television sets, telephones, Interactive game terminals, and others. The CPE may be of a low cost to manufacture. Its structure may be simple and easy to implement in software or semiconductors.

The disclosed embodiments of the invention require a simple communications arrangement. The CPE oftentimes communicates in a single direction. In the simplest embodiment, it receives continuously, but transmits rarely on an adjacent channel. The CPE may always or substantially always transmit on the same frequency with the same bandwidth and may always or substantially always receive on the same frequency with the same bandwidth. Albeit the receive frequency may be distinct from the transmit frequency, but need not be. The CPE does not have to receive its own or any other CPE's transmission. The CPE only needs to receive from the HCC. This approach may lead to a low-cost transmission and reception architecture for the CPE for some applications. The disclosed HCC design also lends itself to low cost implementation.

The disclosed embodiments of the invention require synchronization of the HCC clock and the CPEs' clocks. An embodiment may require loose synchronization (multiple bits), or tight synchronization (sub-bit); in the former case header information may be used to synchronize the channel on a message-by-message basis; in the later case, header information may not be required to maintain channel synchronization. The disclosed embodiments of the invention are not effected by choice of modulation or service protocols. Modulations such as those known for cable, fiber, satellite, and wireless may be used. The disclosed embodiments may be used in a high noise or low-noise environment. Channel coding may be incorporated with the invention, and code synchronization data may be provided in control messages or in message headers.

Comment: Note "Message" rather than "message" here above and below.

The disclosed embodiments of the invention may provide prioritization of message traffic for the purpose of controlling service and control-specific delay and, possibly, message loss. The disclosed method may be embodied where messages are allowed to be "lost" due to instantaneous traffic patterns, such as with TCP/IP or ATM. However, it can also be implemented where there is no message loss allowed.

Considering now the details of the construction of the system and method of the disclosed embodiments of the present invention, there is provided a technique for the scalable multi-functional network communication by means of Service messages between presentation devices and service providers. A plurality of presentation devices are associated with, and typically co-located with, a single CPE. A plurality of service provider control subsystems are associated with, and may be co-located with, the HCC. The technique of the present invention includes communication between the HCC and the CPE units by means of control messages.

The HCC receives upstream messages from the CPE units and sends downstream messages to the CPE units, such message streams being a random or an ordered mix of service messages and control messages. A CPE receives downstream messages from the HCC and sends upstream messages to the HCC, such messages streams being a random or ordered mix of service messages and control messages. In the disclosed embodiment, only messages are sent on the upstream and on the downstream.

The HCC also receives messages locally from the service provider control subsystems, and from control applications within the HCC itself. A CPE also receives messages from Service Interface Modules (SIMs), which are a part of the CPE, and from control applications within the CPE itself. SIMs form the interface between A CPE and the associated plurality of presentation devices.

The HCC arranges in one or more Transmission Queues those messages that are to be sent to CPE units. The HCC arranges in several Receive Queues those messages that are received from CPEs and are to be distributed to service provider subsystems and to internal control applications.

A CPE arranges in one or more Transmission Queues those messages that are to be sent to the HCC. The CPE arranges in several receive queues those messages that are to be distributed to SIMs (and thereby to presentation devices) and to internal control applications.

Considering certain control messages, which provide a part of the means to manage the upstream traffic in the disclosed embodiments of the invention, any of the CPEs, the HCC control applications, or the service provider subsystems may initiate a request for transmission time on the upstream. These requests are for intervals of time on the upstream. Once formatted, these requests are called interval requests (IRs). IRs appear in upstream control messages called IR messages (IRMs), and in downstream control messages called Request Queue Update Messages (RQUMs). They also appear in a structure called a Request Queue (RQ) that resides at the HCC and at the CPEs.

An IR is created by the HCC when a service provider control subsystem or an internal control application wishes to provide space on the uplink for one or more messages to be transmitted from one or a plurality of CPEs. An IR is created by a CPE typically when a SIM or an internal control application has presented a message to be transmitted, but may be created when a SIM or internal control subsystem wishes to provide space on the uplink for one or more messages to be transmitted by one or a plurality of CPEs, not necessarily including the requesting CPE.

An IR that is created by a CPE is transmitted to the HCC in an IRM. An IRM is formed by the CPE and transmitted in one time sub-interval called an Aloha slot. An IRM comprises an IR with a header. Aloha slots appear in bursts on the upstream; such bursts being called Aloha slot burst intervals (ASBIs).

IRs arrive at the HCC from the CPEs in IRMs, and arrive from various local sources. These variously sourced IRs are collected together in an IR Pool at the HCC.

The HCC selects a set of IRs from the IR Pool, typically selecting all IRs present, and with these forms a request queue update message (RQUM). RQUMs carry the IRs to the CPEs where the information they carry is used in the disclosed embodiments of the invention in the process of scheduling traffic on the upstream.

Figure 1A:
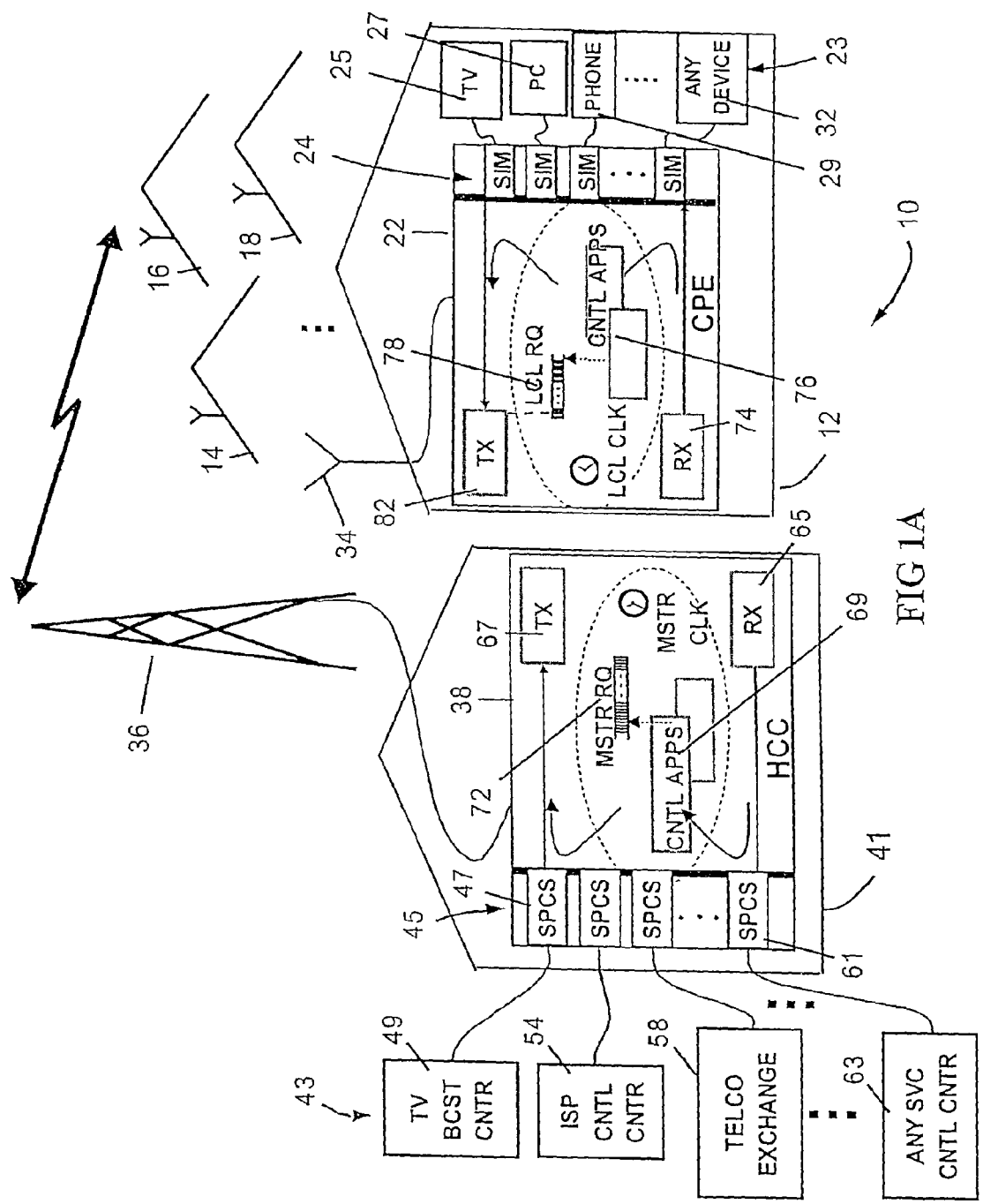
FIG. 1A is a symbolic block diagram of a system for scalable multifunctional network communication according to an embodiment of the present invention.
Figure 2:
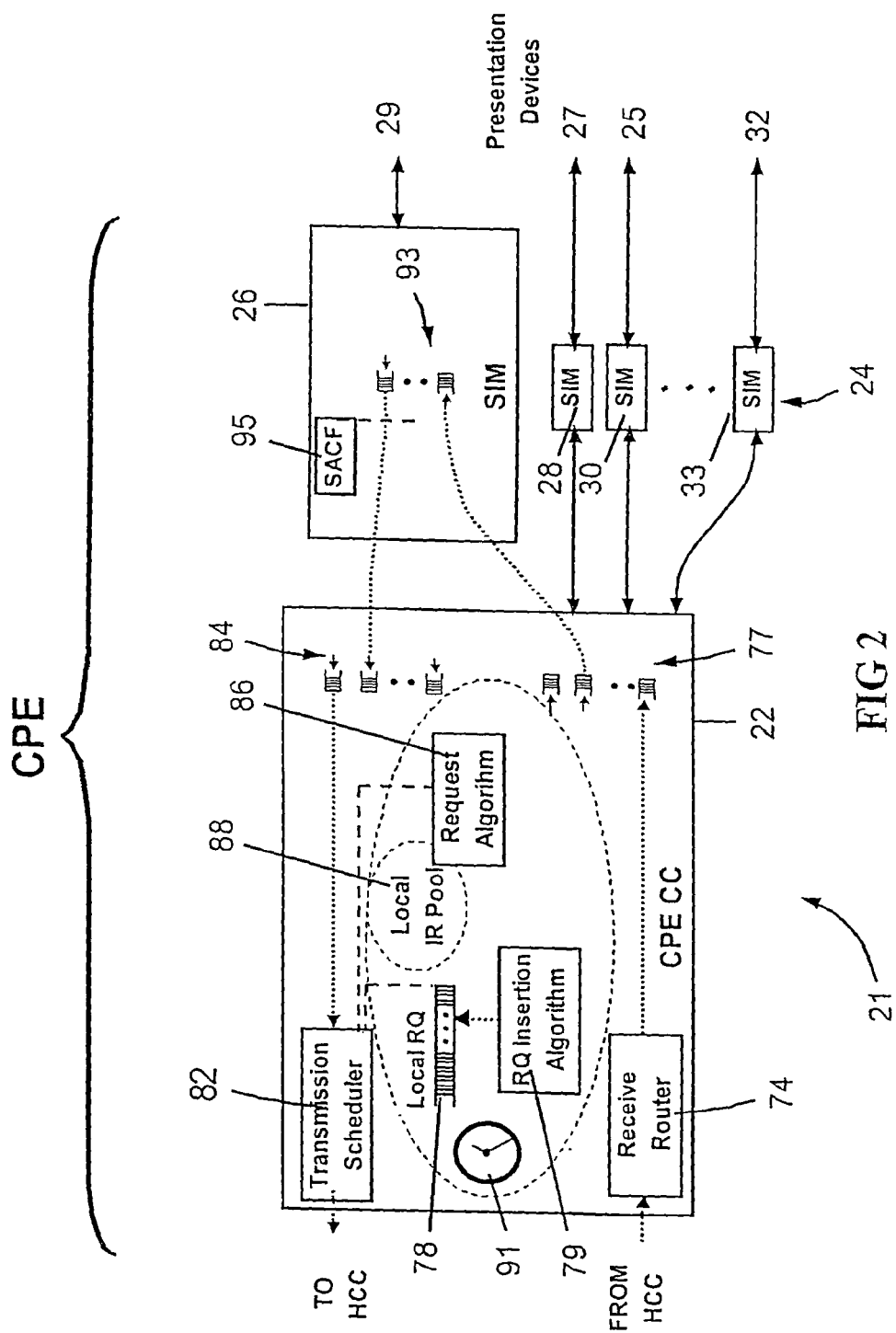
FIG. 2 is a symbolic block diagram of a consumer premise equipment unit of the system of FIG. 1A.

Referring now to the drawings, and more particularly to FIGS. 1A, 1 and 2 thereof, a scalable multi-functional network communication system 10 is constructed in accordance with an embodiment of the present invention, and enables communication to occur between a group of consumer premises, such as consumer premises 12, 14, 16 and 18, over a widely distributed geographical area. Each premise or building houses a CPE 21 which includes a CPE control computer 22. The CPE 21 is connected in communication with at least one presentation device as is generally indicated at 23. The display devices 23 may include a television set 25 connected via a subscriber interface module (SIM) 26 to the CPE control computer 22. Similarly, a personal computer 27 may be connected via an SIM 28 to the CPE control computer 22, and a telephone set 29 may be connected through an SIM 28 to the computer 22. There may also be other presentation devices 32 each of which is connected by an SIM 33 to the CPE control computer 22.

The CPE 21 includes an antennae 34 for wireless communication with a transmitter tower 36 which may be transmitting at a suitable radio frequency such as UHF on an otherwise unused channel. A headend control computer (HCC) 38 is electrically connected to the transmitter tower 36 so that the CPEs such as the CPE 21 can communicate upstream to the HCC 38, and the HCC 38 can communicate downstream to each one of the CPEs. The HCC 38 may be housed within a premise or building 41, which may be located near the transmission tower 36.

The HCC 38 may be connected in communication with at least one service provider such as the service providers generally indicated at 43 (FIG. 1A). A group of service provider control subsystems (SPCS) generally indicated at 45 provide interface between the service providers 43 and the HCC 38. Such interfaces change the format for data flowing into and out of the network, such that on the network that data is presented in message form, and on the service side that data is presented in form and with timing conventional to the service. In this regard, an SPCS 47 interconnects the HCC 38 with the television broadcast center 49. Similarly, an SPCS 52 interfaces between an Internet service provider control center 54 and the HCC 38, and an SPCS 56 interfaces between a telephone exchange or point-of-presence 58 and the HCC 38. An SPCS 61 interfaces between an additional service control center of unspecified purpose 63 and the HCC 38 to provide messages to a representative unspecified device 32. It should be understood that the SPCSs may be located at the HCC 38 within the building 41, or they may be located elsewhere, such as at the SPCS's service provider operations center.

The HCC includes a receive router 65, which receives messages from the CPEs such as CPE 21 via the transmission tower 36. The HCC 38 further includes a transmission scheduler 67 for scheduling the sending of messages downstream via the transmission tower 36 to the CPEs. Likewise, the CPE 21 includes a receiver router 74, which receives messages from the HCC via the local antenna 34. The CPE 21 further includes a transmission scheduler 82 for scheduling the sending of messages upstream via the local antenna 34 to the HCC.

At the HCC 21 (FIG. 1), when messages are received via the receive router 65 from the CPEs, they are sent from the router 65 to message receive queues generally indicated at 70, where their contents are either eventually transferred to a internal control processes (such as that overseeing the Master IR Pool 71) or to one of the SPCSs such as the SPCS 43, each of which SPCSs having at least one I/O Receive Queue 73.

The Service Admission Control Functions is a gateway for messages coming into the system—i.e. for messages to be transmitted through the network.

At the HCC (FIG. 1), IRs arrive in the IR Pool from the CPEs by means of IRMs. In this regard, a control application 69 unloads IRs from messages in the message receive queue 70 designated for IRMs and places them in the Master IR Pool 71. From time-to-time, a request manager 75 takes a selection of IRs from the Master IR pool 71, typically all IRs in the pool would be taken, and places them in a request queue update message (RQUM), which is then placed in a transmit queue. The transmission scheduler 67 takes messages to be transmitted in accordance with the claimed method from any one of the transmit queues generally indicated at 80 and initiates their transmission. Once the RQUMs are transferred to the message transmit queues 80, a copy of the RQUM is inserted in a Master Request Queue (Master RQ) 72 via a request insertion algorithm 83.

A master clock 85 controls the operation of the HCC 41. The CPEs are synchronized to this clock.

At the CPE, as best seen in FIG. 2, a receive router 74 receives messages from the HCC 41, and transfers them to message receive queues 77. Service messages are transferred directly from the message receive queues 77 to the SIMs such as the SIM 26.

The admissions control function may only regulate the flow of messages/into the network. It may not act on received messages that are flowing out of the network (to SIMs).

The control messages that are received in the Control message receive queues such as certain of those indicated in 77 are transferred to various internal control applications 76. In particular, an RQUM is routed to a queue that carries, among possibly others, messages destined for the request queue insertion algorithm 79. The RQ Insertion Algorithm 79 places the IRs contained in a received RQUM into the local request queue (Local RQ) 78. The Local RQ 78 serves to sequence a transmission scheduler 82 for sending messages upstream to the HCC 41.

The Transmission Scheduler 82 has a second function. It places requests for specific sized upstream intervals to be used to send particular messages. These requests are formatted as IRs and collected in the Local IR Pool 88 until such time as upstream space is available for requests to be sent to the HCC 41. An upstream space to carry a request is called an Aloha slot. A burst of Aloha slots occurs from time-to-time on the upstream. This burst, formed within a single interval, is called an Aloha slot burst interval (ASBI). The Transmission Scheduler 82 places one or several requests in an ASBI, in slots that it picks at random.

Comment: ASBI is introduced a page or so earlier.

In use, assume that a telephone call is initiated by a caller using a standard telephone associates with CPE 21, and dialing in a conventional way. The signal from the phone flows to its associated SIM which forms a message that it sends to the SCPC associated with the telephone service provider. This message contains a packet of service data that describes the call that is being set up. To send this message the CPE 21 must send anIR to the headend HCC 38 requesting an upstream interval for the message. In order to send the IR, an Aloha slot must be available to the CPE 21.

Aloha slots become available when the headend HCC 38 decides to collect additional IR requests. At this time, the headend HCC 38 itself creates an IR for an ASBI, and adds this IR to the Master IR Pool 71. From time-to-time the HCC 38 determines to send a request queue update message (RQUM) on the downstream in order to add requests to the Request Queues 71 and 78, which are used to schedule transmissions on the upstream. The RQUM is formed from typically all the IRs in the IR Pool, although for reasons of priority or traffic control, a subset of the IRs present may be selected.

While the present telephone call IR rests at the Local IR Pool (number) in the CPE 21, the HCC 38 forms an IR which requests an ASBI. This IR is then placed in an RQUM and sent to the all of the CPEs. The ASBI requested might have, for example, 64 Aloha slots that are available for the CPEs 21 to use to attempt to transmit IR messages.

Upon receiving an RQUM, the CPE 21 loads its RQ 78 with the received IRs, including the ASBI request, and awaits the emergence of this particular request at the top of RQ 78 which signals that an Aloha slot burst interval is scheduled. When the burst interval thereby arrives, the CPE 21 has in waiting in its IR Pool (number) the telephone call IR. The CPE 21 may randomly select one of the Aloha slots in the ASBI, places the IR in a little message (an IRM) by adding a header, and places that IRM in the selected Aloha slot. The IRM contains the request for an interval to carry the telephone call packet message. It should be understood that there are many known types and kinds of techniques for selecting an Aloha slot.

The RQUM includes a header which has data allowing the CPE 21 to verify the synchronization of its clock 91 and RQ 78 with the HCC's clock 85 and RQ 71. If the CPE 21 is out of synch with the HCC 38, no transmissions will be made by the CPE until it resynchronizes—delaying the sending of the phone call request in the example.

The transmitted telephone call packet IRM may suffer damage from contention by other IR senders or from noise. In either case it may not be received at the HCC 38 and thereby its IR will not enter the Master IR Pool 71, and will not be received back at the CPE 38 in an RQUM. The requesting CPE will know when this IR should arrive in an RQUM (or perhaps in any one of a set of RQUMs, depending on the embodiment). When the requesting CPE 38 determines that it's IR has been missed, it reverts to a suitable contention resolution algorithm which may include the resending of the IR. IRs transmitted by a CPE 38 may be saved for possible resending until safe reception is confirmed.

At the headend HCC 38, the IRM containing the subject IR request is received and enters the IR is unloaded from the IRM and placed in the IR Pool 71. Once the headend HCC 41 determines that all 64 mini slots have been received, then the slots containing information such as the IR request from the CPE 21, may be, if desired, ordered and arranged according to any desired algorithm. Assuming, for example, that only 30 of the 64 mini slots contain messages, all 30 of the messages are transferred to the message transmit queue 80, together with other IR messages, if any, from the IR pool 71. Thus, the sequence of IR messages are then transmitted downstream to each one of the CPEsm and a copy of the sequence is placed in the master request queue 72.

The RQUM containing the IR associated with the example telephone call packet is received at the CPE 21 and its IRs are placed in the Local IR Queue 78 by the RQ Insertion Algorithm 79 as was the case when the IR for an ASBI was distributed in the above sequence of events. The RQUM Insertion Algorithm (number) takes the set of IRs received in the RQUM and places them in accordance with an algorithm in the RQUM. The simplest algorithm is that the IRs in the RQUM go into the back of the RQ in the order they are received. However, any algorithm that does not prevent resynchronization of the RQ may be used. This opens the way to placing time-sensitive or high-priority message requests further forward in RQ.

The IR sent out to the CPE will eventually cycle to the front of the Local RQ 78, and at that instant the CPE 21 transmits the example phone call packet in a message on the upstream to the HCC 38. The contents of this first phone packet would include all of the dialed digit information needed for the call to be initiated by the telephone exchange. It should be understood that the complex process described to this point may have taken a short time such as a few milliseconds to accomplish.

When received at the HCC 38, the message containing the first telephone call packet from the CPE 21 is sent by the receive router (number) to the telephone exchange (number) through that exchange's associated service provider control subsystem (SPCS) 56.

The exchange then sets up the call, by conventional means. The exchange uses the protocols and processes of its standard POTS system if the destination party is external to the network 10. The exchange uses exactly the same protocols and process if the destination party is in the network 10. The SPCS translates between the network and the exchange to make the network appear to the exchange as a part of a conventional telephone system. The SPCS deals with the call participants that are internal to the network 10 by translating exchange actions to appropriate messages that are sent to the participants. It is recognized that conference call set-up is natural to the structure of the disclosed embodiments of the invention, and may be realized in the SPCS if desired.

Assume that the example call is to a party in the network 10. At initiation the exchange (number) signals a ring and the SPCS then sends a message to at another the called party premise such as premise 14, such message causing the SIM 56 at the destination to ring the telephone (not shown) for that consumer. The resulting two-way conversation is digitized and is communicated in a similar manner between the calling and called parties.

HCC

Referring to FIG. 1, the HCC (Headend Control Computer) is located at one site and implemented in one or more custom or off-the-shelf hardware devices, which may include a digital computer. The functions of the HCC may be implemented in hardware, including integrated circuitry, in software, or in a combination thereof.

The disclosed method is used to regulate data traffic on a Network, such traffic flowing in both directions between the set of Service Provider Control Subsystems (SPCSs) at a central location and Service Interface Modules (SIMs) that are located at many distant sites. SIMs are hardware and software functions that enable data flow between a Network connection points at distant client sites, the Network using the disclosed method, and presentation devices, such as Personal Computers, Television sets, and telephones, which are local to the distant client sites. These presentation devices present and receive information associated with using the Service Providers' offerings. SPCSs are the source of all Service messages transmitted by the HCC and are the destination for all Service messages received by the HCC. For the sake of clarity, FIG. 1 depicts those elements that must be contained in an SPCS to allow it to interface with the HCC; and does not depict other elements, which may be expected in an SPCS.

As shown in FIG. 1, the elliptical boundary in the region indicated, encloses a diagram highlighting certain key functions for the control applications of the HCC control structure. This control structure regulates data traffic going onto the downlink of the Network, and cooperates with the CPEs (Consumer Premise Equipments) of the Network in regulating the data traffic going onto the uplink of the Network. The Master System Clock is located at the HCC and provides a time reference for the HCC and for the CPEs. In the disclosed method, time-rate is all that is necessary for a practical and useful embodiment. Time itself may be used in variances, extensions, or enhancements of the disclosed method.

Accurate transmission timing is important in the disclosed method. Thus, the delay between the time a message leaves the HCC and it arrives on the physical medium may be fixed and known.

The Receive Router receives and routes incoming messages to message Receive Queues as indicated in FIG. 1. Each message intended for an SPCS carries a header that contains information adequate to determine the specific message Receive Queue that will be served by the appropriate SPCS. For the sake of clarity, there may be more than one message Receive Queue for interface to a single SPCS.

Control messages received by the HCC are routed to control applications through a message Receive Queue or Queues. In particular, All IRM messages may be routed to a message Receive Queue from which they are directed to the Master IR Pool.

Message buffers, referred to as SPCS message queues, used for input and output of service messages are shown in the SPCS structure. These may not be a part of the disclosed method, but represent functions that may be present at the SPCS-HCC interface. These entities indicate the starting points and destinations for service messages flowing through the HCC.

Message buffers referred to as message receive queues and message transmit queues are shown in the drawing as a part of the HCC. The function of these queues may be a part of the disclosed method.

Message receive queues contain service messages and control messages. Each queue is assigned to one application—either a service application or a control application—and that application timely serves the queue (i.e. takes messages from the queue). There must be at least one message receive queue for an HCC embodiment.

Message transmit queues contain service messages and control messages. These queues may be designated in an embodiment to hold messages of a particular priority or type, or messages from a particular service of a particular type, or messages from certain control applications. The number and role of queues is a function of the embodiment. There may be at least one message transmit queue in the HCC and one message transmit queue in each CPE in the disclosed method.

Flow of messages across the interface between the HCC and an SPCS is indicated in FIG. 1. Service messages to be transmitted are placed in the message transmit queue or queues. Service messages to be received are taken from message receive queue or queues. Additional control information typically flows across this interface.

The SACF (Service-Message Admission Control Function) is a server that selects messages to be transmitted from the SPCS and regulates the length and frequency of transmission of such messages to assure that these factors are within limits required by the disclosed embodiment. For the sake of clarity, the combined effect of the discipline of downlink traffic from each SPCS is required to be such that the over-all downlink traffic pattern of the Network is within the limits of a set of values set for the embodiment of the disclosed method.

Control applications in the HCC carry out system and other control functions. The Request Manager and RQ Insertion Algorithm are example applications that are shown. All other control activities that are determined in a particular embodiment of the disclosed method are included in the control application and Database area as depicted.

RQUMs and other control messages may be placed in message transmit queue or queues by control applications. The Request Manager control application forms RQUMs. IRMs and other control messages are timely taken from message queue or queues by control applications. The Request Manager provides the RQ Insertion Algorithm with a copy of an RQUM that it has created for transmission on the downlink. The Request Manager uses IRs that it has collected in the Master IR Pool to form the RQUM. The RQ Insertion Algorithm is a control application that receives IRs from the Request Manager and places them into the Master RQ in accordance with an established set of rules and procedures. The RQ Insertion Algorithm also maintains time and priority databases associated with RQ.

The Master RQ is a database that holds IRs placed in a particular order by the RQ Insertion Algorithm. It is initiated by the RQ Insertion Algorithm, and maintained by the RQ Insertion Algorithm, such maintenance involving adjusting priorities and IR Transmit Times of IRs as each RQUM is received from the Request Manager. For the sake of clarity, no RQ Synchronization may be required in the HCC and the RQ Synchronization Algorithm may not present in the HCC.

CPE

Referring now to FIG. 2, the CPE (Customer Premise Equipment) is located at one site distant from the HCC site, and implemented in one or more custom or off-the-shelf hardware devices, which may include a digital computer. The functions of the CPE can be implemented in hardware, including integrated circuitry, in software, or in a combination thereof. The CPE includes a CPE Control Computer (CPE CC). In most embodiments envisioned, the CPE also includes transmission/reception equipment associated with the medium, and includes interfaces to presentation equipment that is also located at the same site.

The disclosed method is used to regulate traffic on a Network, such traffic flowing in both directions between a set of SPCSs (see FIG. 1) and many SIMs (standing for Service Interface Modules) that are located at distant sites, such SIMS to communicate with presentation devices, such as Personal Computers, television sets, and telephones, which are local to their site. A set of SIMs is depicted. SIMs are the source of all service messages transmitted by the CPE and are the destination for all service messages received by the CPE.

In the preferred embodiment of the disclosed method, SIMs are physical modules similar to PC cards that marry with custom CPE equipment containing the CPE CC. An alternative embodiment is that the SIMS be a part of the presentation devices.

A set of control applications and Databases of the CPE CC are shown enclosed in an elliptical boundary in the Drawing. Certain key elements of the CPE control structure are shown. This control structure cooperates with the HCC in regulating traffic going onto the uplink of the Network and regulates traffic coming from the downlink of the Network.

The Local System Clock located at the CPE may be used to provide a time-rate (i.e. tick rate) reference for the CPE CC BSDP functions. In the disclosed method, time-rate is all that is necessary for practical and useful embodiment. However, time itself may be used in variances, extensions, or enhancements of the disclosed method. The Local System Clock may be locked to the Master System Clock in the disclosed method.

In FIG. 2, interfaces are indicated with the CPE terminal's receive subsystem (see Receive Router), and with the CPE terminal's transmission subsystem (see Transmission Scheduler). Accurate transmission timing may be critical in the disclosed method. Thus, the delay between the time a message leaves the CPE CC and it arrives on the physical medium may be fixed and known.

The Receive Router receives and routes incoming messages to message receive queues as indicated in FIG. 2. Each message intended for an SIM carries a header that contains information adequate to determine the specific message receive queue that will be served by the appropriate SIM. For the sake of clarity, there may be more than one message receive queue for interface to a single SIM.

All control messages received by the CPE may be routed to control applications. This is done through message receive queues. In particular, all RQUM are routed to a message receive queue from which they are directed to the RQ Insertion Algorithm.

Message buffers, as shown in the SIM depictions in the figures, are used for input and output of service messages. These are not a part of the disclosed method, but represent functions that must be present at the SIM-CPE CC interface. These entities indicate the starting points and destinations for service messages flowing through the CPE CC.

message buffers, called message receive queues and message transmit queues are shown in the figures as a part of the CPE CC. The function of these queues is a part of the disclosed method.

Message receive queues contain service messages and control messages. Each queue is assigned to one application—either a service application or a control application—and that application timely serves the queue (i.e. takes messages from the queue). There may be at least one message receive queue for a CPE embodiment.

Message transmit queues contain service messages and control messages. These queues may be designated in an embodiment to hold messages of a particular priority or type, or messages from a particular service of a particular type, or messages from certain control applications. The number and role of queues is a function of the embodiment. There may be at least one message transmit queue in the CPE.

Flow of messages across an interface between the CPE CC and SIM is indicated in FIG. 2. Service messages to be transmitted are placed in a message transmit queue or queues. Service Messages to be received are taken from message receive queue or queues. Additional control information typically flows across this interface.

Interface technology for interfacing between a SIM and the CPE CC for practical and useful embodiments of the disclosed method is within the known state of the art.

The SACF (Service-Message Admission Control Function) is a server that selects messages to be transmitted from the SIM and regulates the length and frequency of transmission of such messages to assure that these factors are within limits required by the embodiment. For the sake of clarity, the combined effect of the discipline of uplink traffic from each SIM in the network is required to be such that the over-all uplink traffic pattern of the network matches the limits of a set of values set for the embodiment of the disclosed method.

For the sake of clarity, the SACF function may exist at each SCPC for the purpose of regulating the message traffic on the downlink, and the SACF function exists at each SIM for the purpose of regulating the message traffic on the uplink. Control applications in the CPE CC carry out system and other control functions. The RQ Synchronization Algorithm and RQ Insertion Algorithm are example applications that are shown. All other control activities that are determined in a particular embodiment of the disclosed method are included in the control application area as depicted.

IRMs and other Control Messages are placed in message transmit queue or queues by control applications. The CPE Transmission Scheduler forms IRMs.

RQUM and other control messages may be timely taken from message queue or queues by control applications. The Transmission Scheduler is a server that selects messages to be transmitted from the message transmit queue or queues and monitors the length and frequency of such messages to assure that these are within the over-all limits required by the embodiment. The Transmission Scheduler for a CPE only causes a message to be transmitted when the CPE is synchronized according to a disclosed embodiment of the invention.

The CPE Transmission Scheduler forms an IRM for each message entered by other applications in the message transmit queues. The CPE Transmission Scheduler manages the transmission of IRMs using the Aloha slots in accordance with the disclosed method. The CPE Transmission Scheduler schedules the transmission of messages, other than IRMs, in the message transmit queues by following the schedule of uplink message transmissions as determined locally and presented in the Local RQ. The RQ Insertion Algorithm is a control application that receives IRs in RQUMs (directly from a message receive queue) and places them into the Local RQ in accordance with an established algorithm. The RQ Insertion Algorithm also maintains time and priority databases associated with RQ.

The RQ Synchronization Algorithm is a control applications that monitors the RQ and received control data to determine that RQ Synchronization is maintaining, and establishes RQ Synchronization when the CPE is or becomes out of RQ Synchronization. The Local RQ is a database that holds IRs placed in a particular order by the RQ Insertion Algorithm. It is initiated by the RQ Synchronization Algorithm, and maintained by the RQ Insertion Algorithm, such maintenance involving adjusting priorities and IR Transmit Times of IRs as each RQUM is received from the Request Manager.

Channel Structure

Referring now to FIG. 3A, a channel is a dedicated physical media that may carry a stream of symbols. In Networks using the disclosed method, channels are divided in time into intervals. In the preferred embodiment these intervals are contiguous, one interval following immediately after another. intervals on the downlink and on the uplink have varying lengths as determined in real-time by the HCC control circuitry. In the preferred embodiment downlink and uplink are carried on different channels. An alternative embodiment comprises downlink and uplink information carried on the same channel.

Channel time may be further divided in the case of some intervals. These intervals are divided into slots. In the preferred embodiment of the BSDP method, slots are of fixed length in a given type of interval, for the sake of simplicity of structure. However, the BSDP method allows slots within an interval to be of variable length. Slots are provided to allow collection of small messages in a single interval. This provides a means to increase the efficiency of channel use in the BSDP method.

The clock used to provide time for the disclosed method is the Master System Clock. The HCC carries the Master System Clock. The CPE carries a Local System Clock that is locked to the Master System Clock (FIG. 2). The time of the interval and slot boundaries is referenced to Master System Clock time and is measured when the interval is at the HCC, i.e. when it is transmitted for the downlink, and when it is received for the uplink. In the disclosed method, CPEs compute the arrival time of an interval at the HCC in determining when to transmit.

Messages are transmitted in intervals and slots. There is at most one message per interval unless the interval is partitioned into slots. In this case there may be at most one message per slot. For the preferred embodiment, as shown in FIG. 3A, timing is maintained to an accuracy that allows symbol boundary tracking across interval boundaries, and no gap is required in the interval to account for timing uncertainty in placing the message. In addition, the preferred embodiment includes continuous downlink transmission with coherent symbol modulation from one message to the next.

Message headers and related subparagraphs are shown in all messages in FIG. 3A. These message headers are shown to include acquisition sequences, which are used to support acquisition by the receiving terminal of the attributes of the modulation in the Physical Layer. message headers are required in the disclosed method in downlink messages. Acquisition sequences are only required in some messages on the downlink, their exact location depending on the requirements of a particular embodiment.

Message headers may not be required on the uplink. For the sake of clarity, acquisition sequences are required from time-to-time, but may be in the body of a control message or in a message header, or in both.

FIG. 3B emphasizes that in the disclosed method, a message header may not be needed in most messages on the uplink for the HCC to know the attributes of the Message. Information, required in the method, need not be in message headers on upstream messages because said required information has been previously transmitted in an IRM to the HCC. Thus, the only purpose of an uplink message header, if present, may be to support acquisition. With some media, this is not necessary. With all media, if symbol boundary tracking is maintained across an interval or slot boundary, acquisition using data in the message body may cause a high error rate over only the first few symbols of a message, but coding and interleaving may be used to recover this data, thereby allowing the exclusion of a message headers. This discussion also applies to consideration of removal of acquisition aiding sequences on downlink messages. However, on downlink messages, certain data must be present in the message header for the CPEs to successfully capture and route the message.

FIG. 3C illustrates an embodiment that has gaps in the intervals. By excluding message headers, it is implied in the diagram that this is an upstream channel. Downlink channels can also allow similar gaps in this type of embodiment.

FIG. 3D illustrates a channel arrangement in which messages are placed in intervals and slots that have guard spaces, and the messages have message headers that support acquisition of each message. The guard space allows the messages to be transmitted with somewhat inaccurate clocks, as might be found on the uplink in an embodiment with the goal of supporting a Network with low-cost CPE terminals. Clock inaccuracy in the CPE may also be found in Networks where transmission on the downlink is intermittent, thereby creating an environment where the Local System Clocks can drift from the value of the Master System Clock. This embodiment is also appropriate on the downlink in the case that terminals are often joining and leaving the Network, or where transmission by the HCC is intermittent.

Downlink Synchronization

Figure 4:
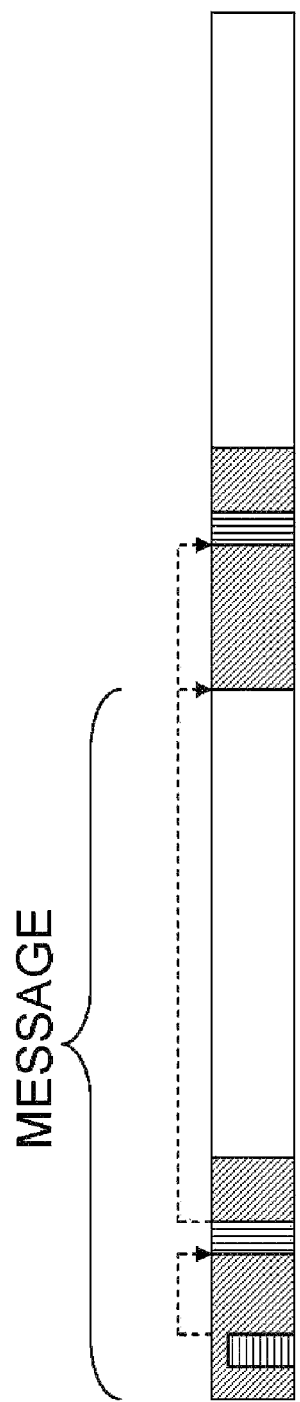
FIG. 4 is a diagram illustrating a downlink synchronization scheme for the system of FIG. 1A.

Referring now to FIG. 4, messages are carried on the downlink. Downstream messages have a message header and a message body (see claim 110 with its subparagraphs). The message header may contain a DTA data structure. The subject embodiment must have continuous transmission of messages on the downlink (at least so far as the set of messages carried between messages that contain DTA data structures), and maintain symbol alignment across message boundaries (i.e. the boundary of the end of the last symbol in a message coincides in time with the boundary of the first symbol of the next message). It is important, but not essential to the method described herewith, that the embodiment maintains phase coherence from one symbol to the next across message boundaries in those network channels where such a demodulation method is germane.

All downlink messages may have message headers that contain, as a minimum, a message length and an address. Message headers may also contain DTA Data Structures and Acquisition Sequences to support CPE acquisition and tracking of the downlink data and formats. For the sake of clarity, Acquisition Sequences are used to support acquisition by receivers of frequency, phase and symbol boundaries, such acquisition which may not have to do with acquisition of interval boundaries as addressed in the drawings.

The field may be shown within the Header, but not necessarily at its front. By the time the CPE turns to Downlink Synchronization, it has acquired the downlink symbol stream. Thus, the DTA Data Structure need not be first-to-arrive in a sequence of fields within a message header. In some embodiments, it may be preferable to have the DTA Data Structure some distance behind the front of the message. The CPE detects the unique sequence in this field and establishes a correlation, thereby determining exactly where the beginning and end points of the field are in the flow of bits. This is the marker that enables the CPE to determine all interval boundaries following, and thereby Downlink Synchronization.

Each message header on the downlink contains a message length field in a fixed and known relative position to the start of the message. The format of the message containing the DTA data structure is known by the CPE to the extent that it knows the number of bits between the end of the DTA Data Structure and the beginning of the message length field. Thus, the CPE can access the message length field.

The message length value allows the CPE to compute location of the body of the present message and decode it. It also allows the CPE to compute the interval boundary between the present interval and the next interval, thereby achieving Downlink Synchronization. The message length field is of known location relative to the start of the message which is itself coincident with the interval boundary. This allows the CPE to locate the body of the next message and the boundary at the end of that message, and thereby continue in downlink synchronization.

Message Format

Figure 5:
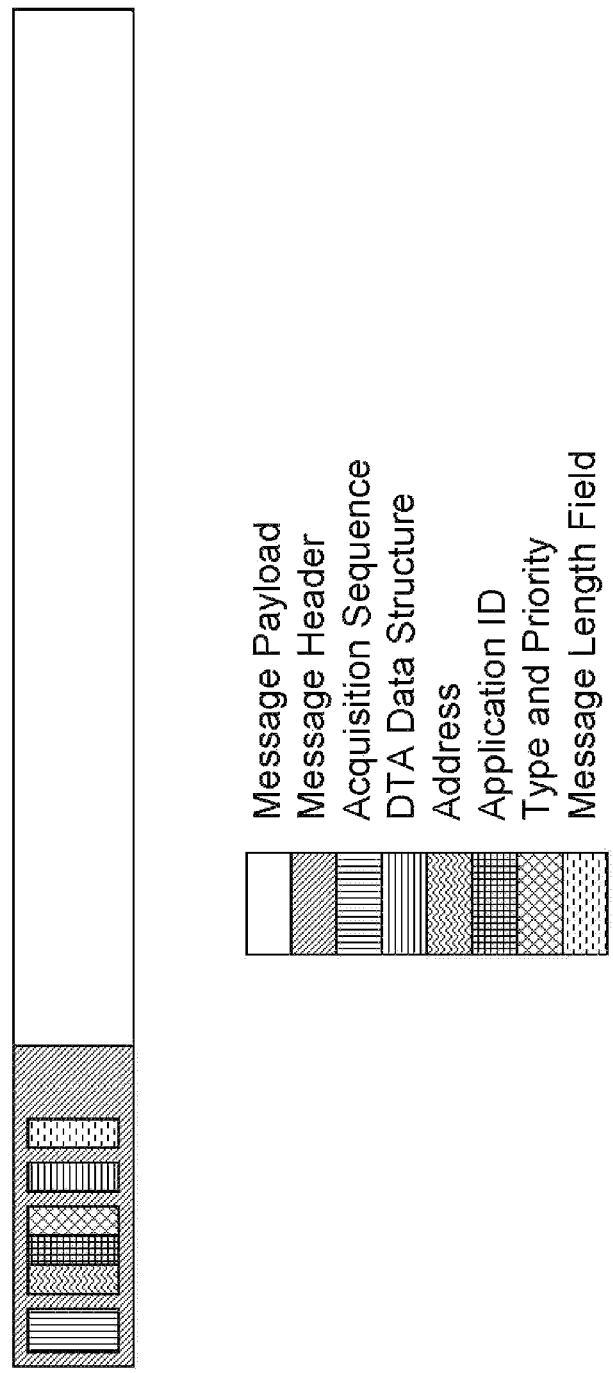
FIG. 5 is a diagram of a message format for the system of FIG. 1A.

Referring now to FIG. 5, the disclosed method does not require a particular ordering or placing of the various fields of a message. However, the message header data fields and the message body field or fields may be at known locations relative to the start of the message. As an example, the message header information can be scattered in a known way between parts of the message body. Practically speaking, there is no guarantee of the size of the message body in the disclosed method, although a minimum message body size can be established in a particular embodiment. Thus, typically, message header information may be placed at the front of the message so that the location of the various fields are known independent of the size of the message body. There is one exception to the allowed flexibility in field placement in a message, which is an issue of known art: The acquisition sequence supports Physical Layer functions associated with the method. If the embodiment requires that the receiving terminal also decode a message, with which physical layer acquisition is achieved, then the Acquisition Sequence must come first in the message. The message in the disclosed method contains a message body, which is provided by an application. The downlink message must contain a message header. The uplink message may contain a message header, depending on the embodiment. For the sake of clarity, every uplink message has associated with it an IR that carries certain control information relating to the message. This Associated IR is disseminated to the HCC and every CPE of a network in the BSDP method by means of various control messages. The information in the IR is adequate for the fundamental message control function of the disclosed method, thereby giving the embodiment design the option of not including a message header on upstream messages.

The message header may contain a number of fields of system control information, as indicated. We show the message header with undesignated data areas. These areas constitute a field called other control information, indicating that the embodiment designer may choose to use message headers to carry information not required by the disclosed method, but enhancing it. An example of such control information is a set of parameters that is changed from time-to-time; such parameters used in a system control algorithm at the CPEs.

An Acquisition Sequence may be present at the start of a message header, or within a message header. It is to be noted that acquisition sequences do not have to be present in any message header. They may be present in the body of control messages.

The DTA Data Structure may be present in a message header to support downstream synchronization. In the Downlink Synchronization process, the boundaries of the downlink intervals are located. (More precisely, the boundaries of the start of a message or sequence of messages are located, thereby implying that determination of interval boundaries is accomplished with satisfactory accuracy.)

The address may be present on the downstream. On the downstream, this address designates which CPE or CPEs are to receive the message. The destination address need not be present on upstream messages because the HCC receives all upstream messages. However, the address field associated with an upstream message designates the controlling entity address, which is usually the sender, but may be the HCC or some other CPE. This controlling entity address is carried in the IRM associated with a message, and may also be carried in the address field of message header in certain embodiments. The Address is provided to the system transmission function by the application that is requesting that the message be transmitted.

The message length field contains a value designating the message length; such length can be conveyed in terms of time, MTUs, or data units. Examples of data unit are: (1) bits, (2) bytes, or (3) in terms of the minimum message resolution size, for example 8 byte units. The downlink message must contain the message length field. The uplink message may contain the message length field. message length may be known on the upstream, but this information is also available in an Associated IR.

The application ID field identifies the application within a receiving terminal to which the message is to be routed. The application ID can be mapped at the receive terminal to a unique message receive queue (FIGS. 1 and 2), such queue either being served by a BSDP control application, or by an application in an SCPC or a SIM. The application ID information is provided to the system Transmission Scheduler by the application requesting that the message be transmitted, typically by simply providing the header to the message.

The Type and Priority field contains additional control information that is used by the RQ Insertion Algorithm application in placing the Associated IR in the RQ. In addition, this field may have information used for other control functions. An example is a parameter that indicates that the message contains slots of a particular size and for a particular system function. The identification of the Type and Priority information is provided to the system transmitting function by the application requesting that the message be transmitted, typically simply by providing the Message Header with the message.

Request Data

Referring now to FIG. 6, data elements are coded as indicated in the drawing. For the sake of clarity, message headers do not contain control information used by service elements. White is used for the background or unspecified data in an interval request.

The interval request (IR) format is presented in FIG. 6. One and only one IR is associated with every uplink interval, called the associated interval. The associated interval is typically used to hold one and only one message called the associated message. The IR format contains fields of data common with those designated for a message, with the exception that the interval Length of an IR may be longer than the message length of the associated message. The Transmission Scheduler forms the IR; the said application utilizes the IR to make a request for an associated interval. Aside from the typical case where an interval is requested for the purpose of sending a single message, an interval may be requested by one CPE for another or by the HCC for a CPE, or by any of these for an interval with slots to be used in a more complex way as determined by control applications, SCPCs, or SIMs working with a Transmission Scheduler control application. An example is the IR established, by the Request Manager at the HCC for the purpose of requesting an ASBI on the uplink.

The IR contains an address that represents the Controlling Entity. Such Address would typically be the CPE that is requesting the interval to carry an upstream service message. However the disclosed method, supports complex actions such as polling by the HCC; service-level control of complex interactions, the scheduling of intervals with slots, and others; and in such cases the Address may be different from that of the CPE or CPEs that may use the interval.

The application ID serves to provide the system control applications the information needed to route the associated message or messages in the receiving HCC or CPE. This field's information may be used for other ancillary control functions. The Type and Priority field may provide the information needed by the RQ Insertion Algorithm to schedule the interval. This field's information may be used for other ancillary control functions.

The interval Length field contains the Length of the Associated interval. For the sake of clarity, this field in the IR always refers to an interval, while the comparable field in a message header refers to the length of that message. The IR interval (i.e. the Aloha Slot) may include guard space, and thereby be larger than the associated IRM message length of the associated message. Space called Other Control Information is allowed in an IR; the use of such space being specific to a particular embodiment.

In an embodiment, a field may be present in IR called the IR Counter. This field allows control applications to distinguish IRs from the same CPE, this being useful in the case where multiple IRs are in Distribution from the same CPE, or when multiple copies of the same IR have been received by the HCC from a CPE.

In a given embodiment, a field may be present in the version of IR carried in RQ, such field being IR Birth Time and/or IR Age. RQ Insertion variants and some RQ Synchronization variants may use this field information for organizing and synchronizing RQ. In the disclosed embodiment, the IR Transmit Time field may be present in the version of IR carried in RQ. In the disclosed method, for the variant claimed, such value may be in a database associated with RQ and accessible by the Transmission Scheduler, and the IR data element may provide such an appropriate location for the data.

The RQUM may have two required fields in its message header (alternatively such information must get to the CPE by another means that is functionally equivalent). The RQ Depth field gives the depth of the Master RQ at the instant that the RQUM is transmitted, such depth being measured in convenient terms, one being the number of IRs in the Master RQ.

A second RQUM message header field that may be present (or the equivalent function provided by an alternative means in the BSDP method) is the RQUM Top Time. This provides the exact transmit time of the top element of the Master RQ, in terms of the Master System Clock. A useful way to do this may be to provide the time of transmission of the top element relative to the transmit time of RQUM.

A field that is used in some variants of the disclosed method, and is therefore optional, is the RQUM Counter field. The value of this field is incremented each time an RQUM is sent. This allows the CPEs to easily detect that one or more RQUMs have been lost in transmission and, therefore, to declare themselves out of synchronization.

IRs are typically placed contiguously in an RQUM. The method does allow other control information to be placed in the message body of the RQUM at the discretion of the embodiment designer.

IRs are transmitted on the uplink in IR messages as shown in FIG. 6. Such messages have a message header in a typical embodiment, although applications in which a message header is not required are foreseen.

Request Queue

Referring now to 7, there is shown the Request Queue. The representation for RQ indicates that the top of the queue is on the right. This is where elements are removed from the queue. They are put into RQ at any point, depending on the RQ Insertion Algorithm.

The RQ elements are IRs. Along with the IR information, each of these elements has associated with it, possibly carried in the element itself, the IR Transmit Time for the associated message; such time provided by the RQ Insertion Algorithm application. The IR at the top of RQ indicates the next interval to be transmitted on the uplink. Elements are taken from the top of the queue once their IR Transmit Time has passed. They are discarded, although there may be cause to archive them after they are drawn from the RQ.

The interval request (IR) format is presented in FIG. 6. interval requests arrive in RQUMs at the HCC RQ Insertion Algorithms. These RQUMs are created locally in the HCC by the Request Manager, and forwarded to the RQ Insertion Algorithm simultaneously with being placed in an HCC message transmit queue.

The RQ Insertion Algorithm in the HCC places new IRs in the Master RQ and maintains the Master RQ, removing IRs that may have aged too much, or whose Transmit Time has passed, and updating priority and other control information in the IRs. The Master RQ in the HCC is the accurate version of RQ. Local RQs in the CPEs represent an estimated copy of the Master RQ and can be erroneous representations under certain circumstances. The Transmission Scheduler may not schedule transmissions at the HCC using the RQ. Rather, the RQ is simply used to track the status of the uplink. In the HCC, the Transmit Scheduler may remove the top element of RQ at the time that its IR Transmit Time passes, thereby keeping it appropriate for uplink interval scheduling. This is identical with such function in the CPEs.

The Master System Clock in the HCC provides the timing base for the BSDP method. CPEs carry an estimate of the time-rate of the Master System Clock, and may carry an estimate of the absolute time of this clock. The Transmission Scheduler uses the Master System Clock time base to schedule transmissions at the HCC. The IR Transmit Times carried in or associated with the IRs is in terms of the Master System Clock time.

The top element of the RQ is discarded once its IR Transmit Time has passed as per note (g) above. The interval request (IR) format is presented in FIG. 6. Interval requests arrive on the downstream in RQUMs at the CPE and are forwarded to the RQ Insertion Algorithms.

The RQ Insertion Algorithm in the CPE places new IRs in the Local RQ and maintains the Local RQ, removing IRs that have aged too much, or whose Transmit Time has passed, and updating priority and other control information in the IRs. The identical algorithms are used to those used by the RQ Insertion Algorithm in the HCC. The Local RQ in the CPE is an estimate of the Master RQ. This estimate is correct so long as the CPE has received all RQUMs with IRs still in the Master RQ and the RQ Synchronization Algorithm has been applied to put the terminal in RQ Synchronization.

The Transmission Scheduler in the CPE schedules uplink transmissions using the Local RQ. Transmit Scheduler removes the top element of RQ at the time that its IR Transmit Time passes, thereby keeping it appropriate for upstream interval scheduling. This is identical with such function in the HCC.

The Local System Clock in the CPE provides the timing base for the disclosed method in the CPE. The Local System Clock is locked to the Master System Clock in time-rate. In some embodiments, it may be locked to the absolute time of the Master System Clock also. The IR Transmit Times carried in or associated with the IRs is in terms of the Local System Clock time. For the sake of clarity the CPE Offset is either considered in determining the IR Transmit Time, or the Transmission Scheduler factors this offset in determining the transmit time from the IR Transmit Time. For the sake of clarity, the IR Transmit Time in every terminal may be different in the disclosed method, because the Local System Clocks may not be synchronized in absolute time. IR Transmit Times are determined so as the affected transmission arrives at the HCC at the scheduled interval time based on the Master System Clock.

The top element of the RQ is discarded once its IR Transmit Time has passed. The top IR is discarded whether it references a local message or a message in another CPE. This is identical with such function in the HCC as per note (i) here above. At the CPE messages to be transmitted are held in one or more message transmit queues. The Transmit Scheduler regulates the transmission of messages on the upstream.

RQ Timeline

Figure 8:
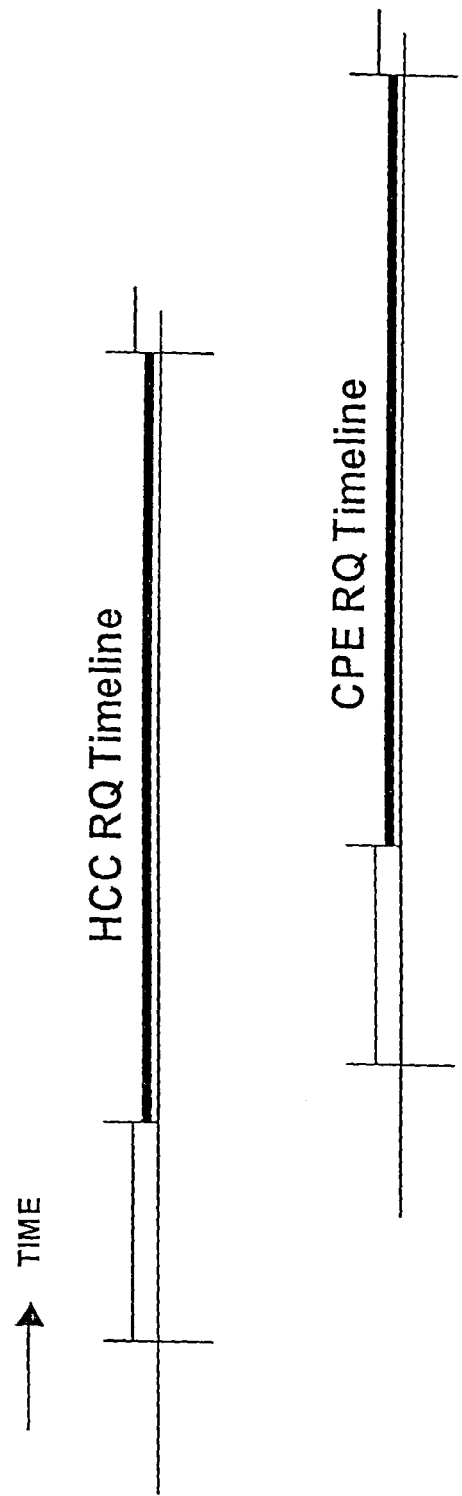
FIG. 8 is a diagram illustrating the time of existence of a given state in the request queues of the headend and a single consumer premise equipment.

Referring now to FIG. 8, there is shown the timing of a sequence of actions by the RQ Insertion Algorithm at the HCC and of the RQ Insertion Algorithm of a CPE. The same (i.e. identical) RQUM, or equivalent data set, arrives at the HCC and the CPE. This data arrives close in time, but not coincident in time. The RQUM arrives at the HCC RQ Insertion Algorithm coincident with being put into a message transmit queue. Thus, it arrives at the HCC RQ Insertion Algorithm before it arrives at any CPE RQ Insertion Algorithm. In all cases the time between the arrival of data at the HCC and at a CPE is short enough to be timely for satisfactory operation of the disclosed method (i.e. no uplink transmissions will occur that are ill-timed).

The RQ Insertion Algorithm at every site reacts to the arrival of the new data by performing database changes on RQ. These include placing new IRs that have arrived, and adjusting time references such as IR Transmit Time and IR Age. So long as the CPE remains in RQ Synchronization, the computations that are done at this time result in the Local RQ being a satisfactory approximation of the Master RQ, such approximation including that the two RQs having and only having the same IR elements in the same order. Certain fields of these elements may be different, or have approximately identical values, in accordance with the details of each embodiment.

In the period after the time for updating the RQs, the HCC RQ and the CPE RQ are in condition to be compared. When it is stated in the Claims that the RQs meet certain conditions when compared, it is meant that the comparison is between the two RQs during the time intervals in FIG. 8. If the CPE has been in RQ Synchronization and the RQUM referenced in FIG. 8, the CPE remains in RQ Synchronization. If the CPE does not receive the RQUM at the expected time, as indicated, the contents of the Local RQ diverges from the contents of the Master RQ and the CPE falls out of RQ Synchronization.

RQ Synchronization

Figure 9:
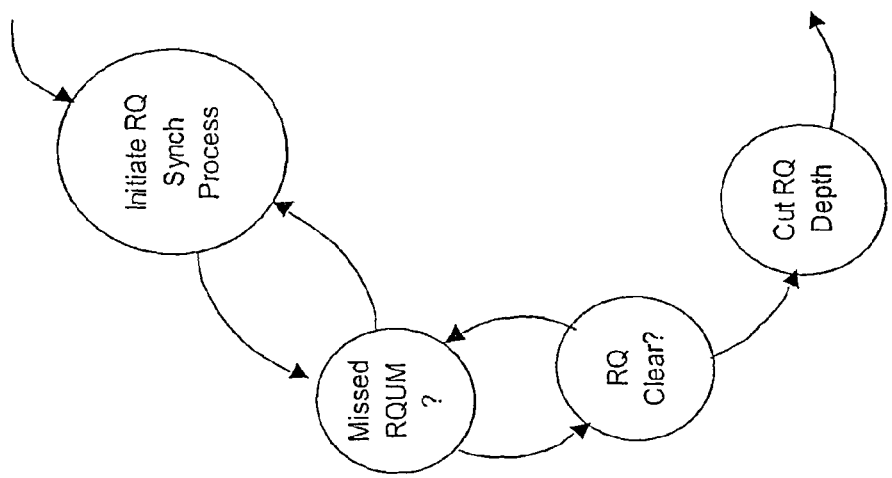
FIG. 9 is a request queue synchronization of flow diagram for the system of FIG. 1A.

Referring now to FIG. 9, there is shown the Request Queue. The RQ Synchronization Algorithm located in the CPE may perform the RQ Synchronization Process. This process may be done in two stages: The first stage is to establish RQ Clear assuring that no IR are missing from the Local RQ that are in the Master RQ. The second stage is to delete IRs from the Local RQ that are not in the Master RQ.

The RQ elements are IRs. Each of these elements may have associated with it, possibly carried in the element itself, the IR Transmit Time, which is the precise time of transmission for the associated message; such time provided by the RQ Insertion Algorithm application. The RQ Synchronization Algorithm determines from information carried in, or associated with, each RQUM if it has missed receiving an RQUM. If an RQUM (or equivalent data delivery mechanism) has been missed, the RQ Synchronization Algorithm restarts the RQ Synchronization Process. The process is initialized with the RQUM information just received.

If it is determined by the RQ Synchronization Algorithm that an RQUM has not been missed before the present received RQUM, then this application determines if the terminal has achieved the RQ Clear state. If the CPE is not yet in the RQ Clear state, the RQ Synchronization Algorithm gathers another RQUM and repeats the process. In the case where the CPE has achieved the RQ Clear state, the RQ Synchronization process eliminates surplus IRs from the Local RQ. At this stage the Local RQ matches the Master RQ.

In the case where the CPE has achieved the RQ Clear state, the RQ Synchronization process eliminates surplus IRs from the Local RQ. At this stage the Local RQ matches the Master RQ. The RQ Synchronization Algorithm then declares the CPE in RQ Synchronization, or waits for a confirmation cycle before declaring the CPE in RQ Synchronization.

CPE Transmission Scheduler

Figure 10:
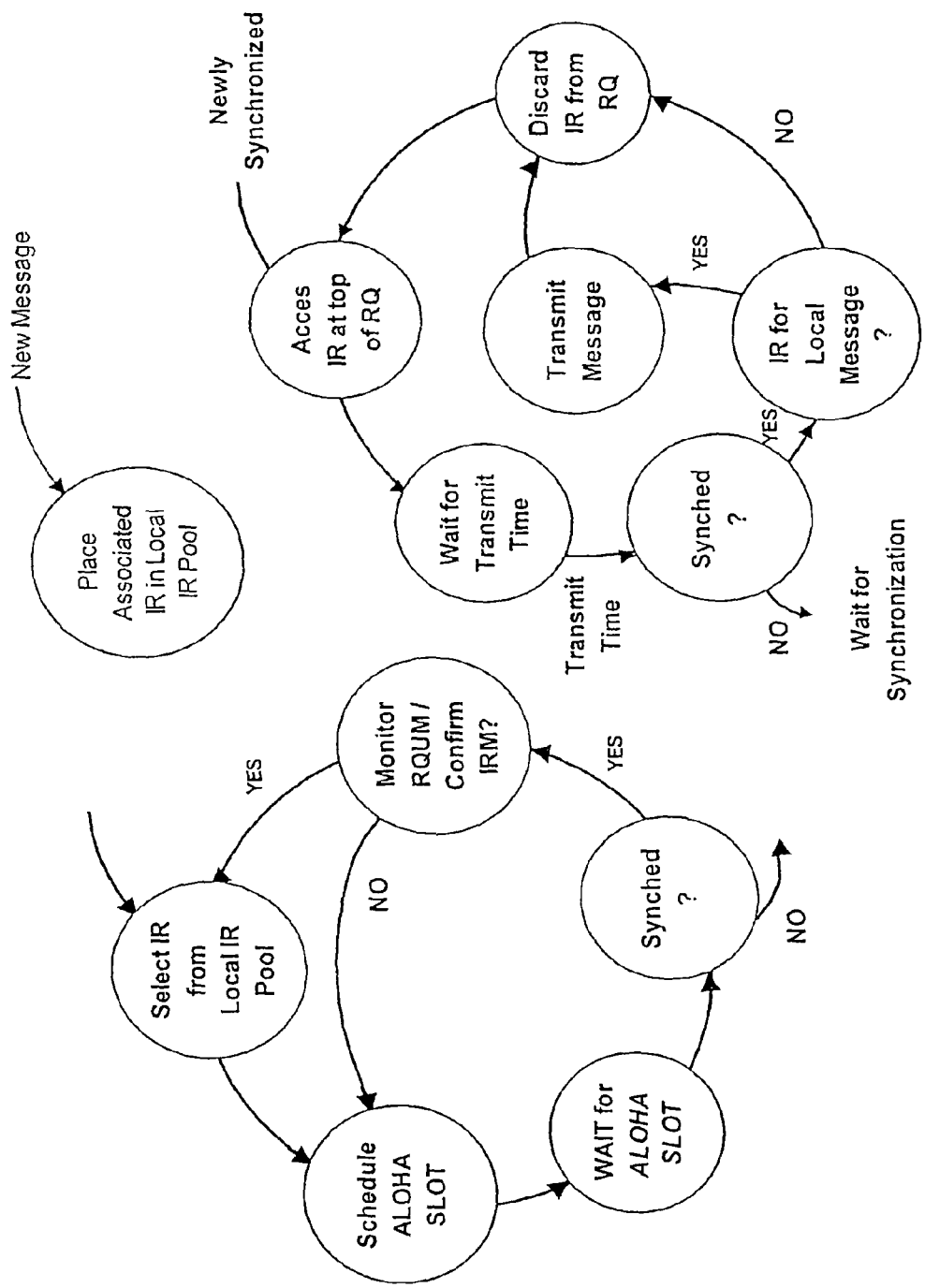
FIG. 10 is a flow diagram of a consumer premise equipment transmission scheduler for the system of FIG. 1A.

Referring now to FIG. 10, the CPE Transmission Scheduler may perform the three functions shown, each of which is a part of scheduling and sending a message from the CPE. The process of sending a message at a CPE may start when an application places the message in a message transmit queue. It ends when the Transmission Scheduler affects the transmission of the message. Between these two events, the Transmission Scheduler seeks and obtains an interval on the uplink assigned for the transmission of the message. The Transmission Scheduler carries out three activities in the process.

The Transmission Scheduler monitors the inputs to the message transmit queue or queues and forms an IR for each new message. The IR is placed in the Local IR Pool. Once the CPE is Synchronized, the Transmission Scheduler puts an IR into IR Distribution as soon as possible after it reaches the IR pool. For the sake of clarity, an embodiment may support multiple IRs in IR Distribution at the same time, or it may require an IR to be distributed (i.e. in place in RQ) before another IR is allowed to enter IR Distribution.

As a first step in IR Distribution, the Transmission Scheduler places the IR in an IRM and puts this IRM in a message transmit queue. The Transmission Scheduler uses the IRSF algorithm and knowledge of the Aloha slot interval structures of coming intervals to select an Aloha slot to receive the transmitted IRM. For each ASBI, there is an Associated IR in the RQ. The ASBI is assigned like any other uplink interval. Thus, there is an IR in RQ associated with that interval's transmission. Thus, from this IR, the structure of an Aloha interval is known before it arrives. The structure of an ASBI may be fixed and known or may vary from interval to interval.

The Transmission Scheduler waits for the Aloha slot scheduled for the IRM. Just prior to transmitting, The Transmission Scheduler confirms that the CPE is Synchronized. Given that the CPE is Synchronized, the Transmission Scheduler affects the transmission of the IRM into the Aloha slot. It then places the IRM in the IRM Holding Pen in anticipation of possibly having to retransmit the IRM.

Refer to claim 30 with its subparagraphs. The Transmission Scheduler thereafter monitors the IRs received on RQUM, or equivalent, seeking to find that the IR that it has transmitted has been forwarded by the HCC. This wait goes on for a fixed time period or a fixed number of RQUMs depending on the details of implementation.

If a transmitted IR does not appear on the downlink in a fixed time, the Transmission Scheduler declares that this IR was unsuccessfully transmitted, most probably because of contention in the Aloha slot. The Transmission Scheduler then begins the process of transmitting the IRM again. In the example state diagram there is little or no limit to the number of re-transmissions attempted. However, there may be a limit to the number of retransmissions in a particular embodiment. However, in most embodiments, it is foreseen that there will be a maximum number of retransmission attempts allowed.

If a transmitted IR timely appears on the downlink, the Transmission Scheduler confirms that it has successfully transmitted the IRM and removes it from the IRM Holding Pen and discards it. It then goes about its business. In the example state diagram, it is implied that only one IR can be in the IRM Holding Pen at a time. However, the Transmission Scheduler in some embodiments of the disclosed method can have multiple instantiations of the same process (represented by the referenced state diagram) going on concurrently—i.e. it can be scheduling multiple messages at the same time.

In the third state diagram, the process is presented for transmitting a successfully scheduled message. Once the CPE is Synchronized, the Transmission Scheduler constantly monitors the top of the Local RQ for IR associated with a local message to be transmitted. The Transmission Scheduler determines the IR Transmit Time of the message represented by its Associated IR at the top of the Local RQ. At the Transmit Time it goes into the process of affecting the Transmission. As a first step in this process, it checks to insure that the CPE is still Synchronized. If not, it aborts the process.

If the CPE is Synchronized, it determines which message is to be transmitted, and whether this is a message held locally, or it is a message held in some other CPE. In an extension there may be contention slots or intervals scheduled by the IR, and the Transmission Scheduler determines in this case whether it should transmit into these slots or intervals.

The Transmission Scheduler removes the IR from RQ timely. The removed IR is discarded or archived. After this, the Transmission Scheduler moves on to repeating the process for the next IR in the RQ.

Service messages originate in the SPCS I/O queues and are presented to the HCC 38, which embodies a part of the method of the disclosed embodiment. This flow of messages into the network may be regulated by the SACF. These messages are placed in message transmit queues and the Transmission Scheduler regulates their placement on the downstream.

Messages received on the uplink are placed in message receive queues. These queues are served by Service applications in the SPCSs and by control applications in the HCC itself.

The Request Manager collects interval requests (IRs) from certain uplink control messages and from local control applications. These are placed in the Master IR Pool 71. From time-to-time the Request Manager 75 forms a control message containing a set of IRs and places this in a message transmit queue 80, and coincident with this action passes it to the RQ Insertion Algorithm 83. The RQ Insertion Algorithm 83 places IRs into the Master RQ 72 and updates data in the IRs of the Master RQ from time-to-time. The Master RQ contains the schedule of interval assignments on the uplink.

As shown in FIG. 2, service messages originate in the SIM message queues 93 and are presented to the CPE CC 22. This flow of messages into the network may be regulated by the SACF 95. These messages are placed in message transmit queues and the Transmission Scheduler 82 regulates their placement on the downlink, using the schedule presented in the Local RQ.

The Receive Router 74 places messages received on the uplink in message receive queues 77. These queues are served by service applications in the SIMs and by Control applications 76 in the CPE CC 22 itself.

The Transmission Scheduler 82 forms IRs, one for each interval required by it, and places these in the Local IR Pool 88. It timely forms request messages called IRMs and transmits these to the HCC 38 using a slotted Aloha protocol.

The RQ Synchronization Algorithm manages the Local RQ with regards to establishing it as an accurate copy of the Master RQ. From time-to-time a set of IRs is received in a control message on the downstream. The RQ Insertion Algorithm 79 places these IRs into the Local RQ 78 and updates data in the IRs of the Local RQ from time-to-time. The Local RQ 78 contains a best estimate of the schedule of interval assignments on the uplink.

Referring now to FIG. 3A timing diagrams are present for the use of a channel in the disclosed embodiment of the inventive method. FIG. 3A depicts a typical format for channel use, on the uplink or downlink. FIG. 3B illustrates an uplink format with messages formatted to not contain message headers. FIG. 3C illustrates that there can be gaps in interval sequences in the disclosed embodiment. FIG. 3D illustrates the format of a channel in an embodiment with Guard Bands.

The disclosed embodiment of the method includes channel organization with a TDMA structure. Typically there is a separate downlink and uplink channel with messages flowing in one direction. Embodiments may have multiple uplinks and/or downlinks or may share a single channel for the uplink and downlink.

Messages on the downlink must have message headers to support reception and routing functions. Messages on the uplink may have message headers. However, all information needed to support routing may be present in Associated IRs. Thus, embodiments may not necessarily have message headers on the uplink.

Modulation and demodulation on links may be organized so that re-acquisition is not required message-to-message on the downlink. On the uplink, the timing may be accurate enough so that message boundary timing is preserved across messages. However, there may be at least a need for frequency, phase, and level pull-in on the uplink since the messages are transmitted from different sources.

Referring now to FIG. 4, the timing diagram is for a variant that may be used for downlink synchronization—how the receiver locates the messages on the downlink. This variant relies on the message length field, under certain channel organization restrictions to determine the location of one message following another. A Correlation Sequence called the DTA Data Structure is present in some message headers to support acquisition of the first message used to initiate the message boundary tracking process.

Referring to FIG. 5, the format for the message of the disclosed embodiment of the method is presented. A message may contain a message body, and may contain a message header. The message body may contain information placed by the application that creates the message. This may be a service application in a SCPS or SIM, or it may be a control application.

The message header on the downlink may contain certain fields, and may contain others. It may contain an Address, an application ID, a Type and Priority field, and a message length field, (or the functionally equivalent structures). messages on the uplink may have a message header, and this header may contain the above information.

The message header on the downlink may contain an Acquisition Sequence to aid demodulators in acquiring the message. It may contain a DTA Data Structure to aid in locating the data boundaries of the message. It may contain other control information in additional space in the message header, such additional information called Other Control Information, such information of use in the particular embodiment of the method.

Referring to FIG. 6, the format for the data structures associated with the interval request are presented. FIG. 6A presents the interval request (IR). FIG. 6B presents the interval request message (IRM). FIG. 6C presents the Request Queue Update Message (RQUM).

An interval request may contain an address, an application ID, a Type and Priority field, and an interval Length. These fields "describe" the message that the IR is associated with. In fact the first three of these fields are the same as those found in message headers, as shown in Drawing 5. The interval length field may not be identical to the message length field, because intervals may include guard bands. The CPE and HCC algorithms can take this factor into consideration and true message lengths can be carried in the IR, the source of the IR can add the appropriate extra space to the length when forming the IR, or the HCC can adjust this field in received IRs—any such scheme is within the scope of the disclosed method.

The IR may contain control information specific to a particular embodiment of the present invention, such information being placed in the Other Control Information field. Specific optional control information claimed in variants of the disclosed embodiment of the method. As shown in FIG. 6A, Birth Time, IR Age, IR Transmit Time, and IR Counter may be included. IRs may be created by control applications or by the Transmission Schedulers of CPEs. For uplink transmission IRs are encapsulated in IR messages (IRMs).

As shown in FIG. 6B, IRMs may or may not have message headers depending on the embodiment. IRMs are transmitted into Aloha slots of Aloha slot burst intervals. The transmission is ad hoc and may contend in the transmission period, destroying both. It may take several transmissions before an IRM is successfully transmitted to the HCC.

The HCC transmits a set of IRs on a downlink message called an RQUM. The format of the RQUM is shown in FIG. 6C. The RQUM message header may have control information specific to a particular embodiment carried in its Other Control Information field. The RQUM message header may carry data used to synchronize the RQ in the CPEs. It may carry RQ Depth and RQUM Top Time fields for this purpose. It may also carry an RQUM Counter field, whose value is used in managing RQ Synchronization.

As shown in FIG. 7, RQ is a single queue. IRs are the elements of RQ. The RQ Insertion Algorithm at both the HCC and the CPEs places these in RQ.

The elements of RQ (the IRs) progress to the right in FIG. 7A as time goes on. The far-right element may be said to be at the top of the queue. The RQ Insertion Algorithm need not place new elements at the bottom of the queue. Elements may be placed in the queue so that higher priority, or delay sensitive, IRs may be placed higher in the queue. There is a requirement on the placement algorithm that elements placed in the queue reach the top in reasonable time, but other algorithms may also be employed.

As shown in FIG. 7B, at the HCC, the Master RQ simply serves as the record of the state of the uplink. This information is used as a basis for synchronize information sent to the CPEs. It is also used by internal Control Algorithms in managing the uplink through various means.

As shown in FIG. 7C, the CPE, the Local RQ serves as the record of the state of the uplink. This information is used to determine when the CPE may transmit on the uplink. The CPE has an RQ Synchronization Algorithm that establishes the synchronization of the Local RQ with the Master RQ—i.e. forms the Local RQ so that it is substantially identical with the Master RQ—and monitors this synchronization.

FIG. 8 shows the time line for the maintaining a comparable Master RQ and Local RQ. Update information may arrive at the RQ Insertion Algorithm of the HCC at a certain time starting the cycle of update. At a different time, probably later, this same update information arrives at the RQ Insertion Algorithm at a CPE, which may also start the update cycle. Before the update cycle starts in either terminals, and after they both complete the update cycles, the RQ are substantially comparable. The Local RQ is said to be RQ Synchronized if it has exactly the same set of IRs placed in the same order as the Master RQ during the period after both have been updated with the same information. The update information typically may arrive in an RQUM at both the HCC and the CPE.

FIG. 9 depicts a state diagram for a typical RQ Synchronization algorithm. Synchronization may happen in two phases. In the first phase, the RQ Synchronization Algorithm in the CPE assures itself that it has received all RQ update information that has been sent over a period of time. This period of time is determined so that all messages associated with older elements of RQ have been transmitted on the upstream. The second phase of RQ Synchronization then determines which of the elements in the collected set remain to be transmitted, with the likelihood that some of the messages associated with these new elements have already been translated at the time that the determination is made. Such dated IRs may be removed from the Local RQ and synchronized.

Referring to FIG. 10, the Transmission Scheduler in the CPE may perform three distinct tasks, which are shown in the state diagrams. The affect of these three tasks combined is to schedule and transmit a message.

The Transmission Scheduler in the CPE monitors the message transmit queues, and timely forms an IR for each interval required. There are modes of operation where a message may be placed in an interval reserved by some other CPE or the HCC.

The Transmission Scheduler timely may take an IR from the Local IR Pool, forms an IRM and transmits this using the protocol.

The Transmission Scheduler monitors the top of the RQ and transmits a message when the top IR is associated with a local message. The Transmission Scheduler may also remove the top IR after its IR Transmit Time has passed.

Operation

The system and method of an embodiment of the invention enables an unrestricted number of terminals to be served in a communications network that is configured with: (1) a single central terminal (the HCC); and (2) multiple terminals (CPEs) located at a distance from the central terminal. The CPEs exchange digital data with the HCC by means of any two-way (duplex) communications channel or set of channels that have capacity that can be shared by the CPEs.

An embodiment of the present invention as disclosed herein employs slotted Aloha communications, and queuing theory. The information exchanged may be broken into messages by the sources. These messages are, sets of digital data. The length of each message is not fixed, but the average length of messages on each channel is prescribed and traffic is disciplined to meet this prescription by various means. Likewise the rate of messages on the various channels is not set, but the average rate is prescribed and traffic is disciplined to meet this prescription by various means.

The HCC receives information to be transmitted to the CPEs from interface equipment that interfaces between the HCC and service provider control subsystems, such as those of Internet Service Providers, Broadcasters, or Telephone companies. The HCC transfers information sent by the CPEs to these service providers' control subsystems. The CPEs and HCC also serve as sources and destinations for control information. In order for information to flow from one CPE to another, a service provider at the HCC may forward it.

The physical channel or channels carrying data from the HCC to the CPEs is called the downlink. The physical channel or channels carrying data from the CPEs to the HCC is called the uplink.

Downlink data transmission may be simply controlled, on a real-time basis in a TDMA fashion, by the HCC so as to share the available capacity between service providers, and to provide various network control information.

The accommodation of a large number of CPEs is accomplished by assigning uplink capacity on the fly to CPEs as they request it. The protocols, processes and algorithms unique to this patent deal with the assignment of uplink capacity and the execution of the transmission of data in accordance with this assignment.

The method according to an embodiment of the invention maintains the uplink full if traffic is available, and makes access totally flexible. The method of the disclosed embodiment sets little or no limit on the number of terminals on the Network. Capacity available to a single terminal reduces smoothly as the number of terminals increases. The disclosed method minimizes delay of message data transmission through the Network.

The uplink is kept full by having a reservation system so that no uplink capacity is wasted in delays caused in waiting for control information exchanges. On a subtler note, the uplink is kept full by having the reservation structure managed to minimize dead time. This second criterion is met by holding reservations in a queue of significant depth (typically 10 to 100 reservations), thereby smoothing request bursts and pauses.

Access is substantially flexible. Terminals or services (depending on the embodiment) have a prescribed average loading on the uplink. That is the only constraint on flexibility.

There is no inherent limit in the disclosed method. In fact, the method works best with many terminals present. There is an inherent prescription on the average loading of the Network from terminals so that the total message traffic loading on the uplink meets a limit set in the Network design, the exact nature of this prescription depending on the embodiment.

Given practical and agreed limits on the input by services to the downlink, the downlink delay is not significant. The uplink delay is dominated by the two phases of assignment of uplink capacity: (1) Request distribution, and (2) Reservation Service Delay.

A number of techniques are folded into the invention to make this delay small. Reservation data elements (called interval requests), which are small when compared against the average size of messages in the network, are sent on the upstream. The reservations are small to minimize the overhead. Slotted Aloha technology is used to avoid any structure on participating terminals regarding their use of their capacity (i.e. avoiding assigning fixed amounts of capacity to each terminal—the "circuit" concept.) The reservation system is distributed to the CPE terminals to avoid delays and waste of capacity in acting on reservations.

The distributed control system supports very low overhead and fast response, but at a cost that terminals can interfere with each other if they loose control information. A good portion of the invention is devoted to the methods and means invented to minimize or eliminate this possibility.

The structure central in the means to achieve the quick and effective assignment of uplink capacity is in the collection and distribution of requests. Requests are collected from CPEs in ASBIs that contain Aloha slots. Each Aloha slot can carry a request. The HCC controls the frequency of ASBIs and the number of slots in each interval, thereby controlling the performance of the DISCLOSED method. This control of ASBIs can be made very elaborate or very simple depending on the needs of the embodiment. Requests flow into the HCC a group at a time, each group of requests carried on an ASBI. An important factor in the performance of the system is the smoothing effect on request traffic of this collection process. The request transmissions are allowed to contend in the Aloha slots—there is no prescribed structure on the terminals for requests of access except that that slots selected for transmission of IRs must be selected randomly, and there must be a process for effectively retransmitting if a contention occurs, of which a number are known.

Because of the presence of contention, a CPE can be expected to have to repeat the transmission of a request more than once on the average.

Requests are distributed instantaneously from the HCC to the CPE and entered into the Request Queue (RQ) carried in each CPE. This RQ is considered an estimate or copy of a Master RQ kept in the HCC. Requests can be organized for service by priority. There are a number of means and methods for regulating the flow or requests through RQ. All CPE see the same request database, and implicitly know the assignments on the uplink.

A CPE who has requested uplink capacity simply regulates the RQ, as does every other terminal. When the assignment for an interval to carry the local message comes current, the CPE reacts and transmits accordingly.

The above process adds well under 100 milliseconds of delay in a well-balanced embodiment for a network with uplink and downlink in full use.

Physical Arrangement of Network

The system 10 includes one central site with the HCC. The HCC interfaces to a set of SPCSs at the central location. A large number of client sites located at a distance from the HCC site—a representative number being over 10,000 distant client sites. These sites are extent over a disk centered on the HCC. A representative radius of this disk may be between 5 and 50 miles.

The HCC site is associated with an existence broadcast site, with associated antenna infrastructure. The client sites are typically homes, but other premises may also be served by the system 10. The CPE sites are at fixed locations with antennas attached to the structures. The SIMs are a part of the CPE physical structure. The SIMS and SCPCs coordinate to provide messages of prescribed average message length and average message rate. The decision to transmit a message at one CPE is independent of the decision to transmit a message at another CPE.

Channel Structure, FDD One Down and One Up

The system 10 may include a block of contiguous 6 MHz channels used with center frequency in the broadcast band—with center frequency in 54 MHz to 756 MHz range. A representative size for this block is 4 channels giving 24 MHz-bandwidth. One single channel located in the block for the uplink and one single channel for the downlink. This is an FDD arrangement.

Channel Structure, FDD, One Down and Several Up

An alternative embodiment for channel structure may be preferred in the case where there is a desire to limit the uplink transmission power. A block of contiguous 6 MHz channels may be used.

Several single channels are located in the block for the uplink, and one single channel for the downlink. A representative number of uplinks channels is 10. CPEs are assigned to one or the other uplink permanently. This remains an FDD arrangement.

Channel Structure, TDD, One Down and Several Up

An alternative embodiment for channel structure is preferred in the case where there is a desire to limit the uplink transmission power and a desire for the broadest possible downlink bandwidth. A block of contiguous 6 MHz channels is used. The full channel is used in TDD fashion. The downlink uses the full bandwidth. When a time period is assigned for uplink, the channel is split into a number of smaller bandwidth uplink channels with CPEs' assigned to one or the other of these uplink channels permanently. When the time period arrives for uplink transmission, CPEs assigned to different uplink groups transmit in parallel.

Modulation and Coding

Digital modulation is used on the uplink and the downlink. The modulation supports several bits-per-Hertz on the downlink and on the uplink. A representative modulation would be 64 QAM at 6 bits-per-Hertz. A representative MTU is 6 bits. The channels are coded and interleaved. A representative bit-error-rate with the channel coding is 10-10. A coding rate of 0.9 is representative.

Channel symbol rates may be fixed. Representative information rates after coding are 100 Mbps on the downlink and 15 Mbps on the uplink.

Interval and Message Structure

The downlink has continuous transmission of messages. There may be no Guard Space in the intervals.

Transmission is coherent across message boundaries. The uplink is message boundary aligned. A representative accuracy is 1/10 of an MTU. There may be no guard spaces in the intervals. The uplink messages have acquisition sequences in their message headers.

System Time

In the registration process, the CPE is informed of the downlink symbol rate with respect to the Master System Clock. The CPEs lock their Local System Clock rates to the downlink and tracks this rate. The CPEs do not lock to the time phase of the HCC.

Operating Parameters and Operating Point

The following may be operating parameters for the system 10:

1) Average Message Length—640 bytes;
2) Average Message Rate—2850 Messages/sec.;
3) Aloha slot rate—10,800 slots/sec.;
4) Aloha slots/Aloha interval—108 slots (100 ASBIs per second
5) Operating Point—0.4 (3.73 Aloha slots/message);
6) Message Size Resolution (MSR): 6 bytes;
7) Minimum Message Length: 6 bytes; and
8) Maximum Message Length: 9,250 bytes General Message Format—Downlink The following may be a downlink general message format for the system 10:

| field | size in bits |
| --- | --- |
| Downlink Message Header Size | 48 bits |
| Acquisition Sequence | 0 |
| Address | 22 |
| Application ID | 8 |
| Type or Priority | 6 |
| Message Length (in MSRs) | 12 |
| Other Control Information | 0 |
| Message Body | variable length |

This structure may support over 4 million CPEs and 256 distinct applications with 64 distinct type and priority levels. It may support messages of up to 200,000 bits in length. The message header overhead may be less than 1%. The HCC sends a special control message from time to time that supports downstream acquisition.

General Message Format—Uplink

The following may be an uplink general message format:

| field | size in bits |
| --- | --- |
| Message Header Size | 24 bits |
| Acquisition Sequence | 24 |
| Address | 0 |
| Application ID | 0 |
| Type or Priority | 0 |
| Message Length (in MSRs) | 0 |
| OCI* | 0 |
| Message Body | variable length |

*OCI denotes Other Control Information

The Address and other control information are carried in the Associated IR.

Interval Request (IR)

The following may be an IR:

| field | size in bits |
| --- | --- |
| Data | 56 bits |
| Address | 22 |
| Application ID | 8 |
| Type or Priority | 6 |
| Message Length (in MSRs) | 12 |
| OCI - IR Counter | 6 |

The IR Counter is an option that is present to allow a number of IRs to be in distribution at the same time from the same CPE. This counter need only be a few bits.

In the IR manifestation in RQ, several fields may be added:

| field | size in bits |
| --- | --- |
| Data | 56 bits |
| Address | 22 |
| Application ID | 8 |
| Type or Priority | 6 |

| field | size in bits |
| --- | --- |
| Message Length (in MSRs) | 12 |
| OCI - IR Counter | 6 |
| OCI - IR Transmit Time | 28 |
| OCI - IR Age | 6 |

The IR Transmit Time is in a range of one second to a resolution of 10 nanoseconds.

IR Age is in terms of RQUM count. It may be initialized at 1, representing the RQUM that carried it, and incremented each time another RQUM arrives (at the HCC as well as at the CPE).

Interval Request Message (IRM)

The following may be an interval request message:

| field | size in bits |
| --- | --- |
| Message Header Size | 24 bits |
| Message Body | 56 bits |
| One IR | 56 |

The IRM is allowed to break the message size resolution rule to save channel capacity. It is a fixed known length.

In this embodiment, the IR overhead is 2.3% (considering the average number of IRs transmitted per message, which may be more than one because of repeated transmissions).

ASBI

The following may be an ASBI:

| Interval Size | 8640 bits |
| --- | --- |
| Slot 1 | 80 |
| . | |
| . | |
| . | |
| Slot 108 | 80 |

Request Queue Update Message (RQUM)

| field | size in bits |
| --- | --- |
| Message Header Size | 128 bits |
| Address | 22 |
| Application ID | 8 |
| Type or Priority | 6 |
| Message Length (in MSRs) | 12 |
| OCI - RQ Depth | 12 |
| OCI - RQ Top Time | 28 |
| OCI - RQUM Counter | 10 |
| OCI - RQ Age | 6 |
| OCI - DTA Data Structure | 24 |
| Message Body Size | Variable, a number of 80 bit IRs (including 0) |

RQUMs are formed and transmitted whenever an ASBI arrives and is processed in the HCC. This occurs 100 times a second.

There are about 29 IRs per RQUM giving an average size of somewhat over almost 300 bytes.

The RQ Depth field carries the number of IRs in RQ.

The RQ Top Time is the difference in time between the transmit time of the RQUM and the IR Transmit Time of the top element of RQ (that element whose associated message has not started to be transmitted). The RQ Top time is carried in seconds to the resolution of 10 nanoseconds.

The RQ Counter is a circular counter (incrementing from the largest number to zero).

The DTA Data Structure is a Correlation Sequence used for Downlink Acquisition.

RQ Size: S

The following may be an RQ size:

The RQ size is 1000 IR elements. The expected RQ depth is determined:

Uplink information rate: 15,000,000 bps

Uplink Message rate: 2850 messages per second

Uplink Message size: 640 bytes.

The efficiency of the uplink is 97% and the RQ depth on the average is 36 IRs.

The expected delay through RQ is 36 messages or 13 milliseconds.

IR Pool Size

The following may be an IR pool size:

The Master IR Pool and the Local IR Pool may be hold 1000 IRs

Message Queue Structure

The HCC has one message receive queue for each Service Provider present, as represented by one SPCS. The limit is close to 256 Service Providers. A typical number of Services present is expected to be on the order of 10. The HCC has one message receive queue for control messages.

Each CPE forms a message receive queue for each SIM present. The CPE has one message receive queue for control messages.

The HCC has one message transmit queue for each Service Provider present, as represented by one SPCS. The HCC has one message transmit queue for control messages.

Each CPE forms a message transmit queue for each SIM present. The CPE has one message transmit queue for control messages.

ASSA

The Aloha slot supply algorithm (ASSA) generates a request for an ASBI every 10 milliseconds. The ASBI requested may be of fixed slot size—108 slots.

The slots are of fixed size—80 bits.

IRSF

Every IRM transmission is transmitted with uniform probability into a slot of the "next" ASBI. This is true for the first transmission.

For re-transmissions, the CPE must receive an RQUM to determine whether the IRM has been successfully received by the HCC. This RQUM is formed and sent immediately upon receipt of the ASBI at the HCC. The delay to get back the RQUM is approximately 0.5 milliseconds, at worst. Thus, the CPE has time to setup and retransmit the IRM in the "next" ASBI.

Regulation of IRM Transmission rate

The CPEs may not regulate IRM Transmission. Multiple IRs may be put into IR

Distribution from a single CPE. The IR Counter may be used to distinguish different IRs that are in Distribution. The IR counter may be incremented for each new IRM formed.

Regulation of message length and message rate may be left to the SIMs. However, a control message is included in the embodiment that is used by the HCC to direct all terminals to cease transmitting data for a Service Provider. This provides a substantially fail-safe mechanism for the cases that a SIM control function either has an error in design that causes its SACF to fail, or it has been altered or pirated.

In the case where an IRM has been retransmitted 8 times, the terminal randomly distributes the next IRM retransmission over 20 ASBIs. This occurs for one IRM in 10,000 in this embodiment, and indicates a clumping of IRM requests that is burdening the ASBIs. This may add 100 milliseconds on average to the reservation delay for these rare IRM transmissions. However, every IRM entering the Network is successfully transmitted.

The expected number of transmission attempts for successful IRM transmission is 1.5. Thus, the expected delay due to the request protocol is 20 milliseconds.

RQ Insertion—FIFO

The RQ Insertion Algorithm may place newly IRs in RQ at the back as they are taken off RQUM—from the message header end first.

RQ Insertion—Priority Example

An unlimited number of priority placement methods may be available for consideration. The key criterion is that if elements are missing from a Local RQ (compared with the Master RQ), IR relative placement may not changed. An example method is given here.

IRs may be taken from nearest the message header of RQUM by the RQ Insertion Algorithm and considered as follows, one after the other.

IRs may be placed in RQ by the RQ Insertion Algorithm as follows: In the process of placing a new IR in RQ, a search by the RQ Insertion Algorithm is made from the back of RQ forward for the first IR with a equal or higher rated priority. The candidate IR is put as close behind this IR as possible. However, it is not put ahead of any IR with an IR Age greater than a priority delay limit.

| Priority | Priority Delay Limit |
|----------|----------------------|
| 1        | 0                    |
| 2        | 1                    |
| 3        | 5                    |
| 4        | 16                   |

The average maximum IR Age may be RQ may be about 1.5.

For example, a priority 1 IR arrives. The RQ Insertion Algorithm searches forward through RQ, continuing past IRs of lower priority whose IR Age is not equal to or greater than the Priority Delay Limit listed above, until it encounters a priority 3 message with IR Age 6. The new priority 1 IR is then put immediately behind this IR.

In this example, the priority 3 IR has been in RQ for 5 RQUM transmission periods (it was initiated with an IR Age of 1). This takes approximately 50 milliseconds. Once its resident time has been this long, no IRs can be placed in front of it in RQ and it moves forward smoothly.

After adjusting IR Age values upon completion of placing IRs from an RQUM, the RQ Insertion Algorithm deletes all IRs with IR Age equal to or greater than 64. (a probability 0 event).

Should RQ overflow (a probability 0 event), the RQ Insertion Algorithm discards IRs from RQ, starting with the newest priority 4 IRs (including those arriving in RQUM) and proceeding through them until all priority 4 IRs are discarded, and then proceeding to the newest priority 3 IRs etc. Only a number of IRs are discarded sufficient to make way for placement of newer IRs of adequate priority to avoid the cut.

Clock Synchronization

The downlink symbol rate is defined in control information passed to the CPE during Registration. The CPE locks to the downlink, using the symbol rate to drive the Local System Clock. The terminal declares itself in Clock Synchronization when the phased lock loop locks.

Downlink Synchronization

The DTA Data Structure provides a means to capture the position of this field within an RQUM by correlation. The known message header structure of the RQUM may allow the CPE to determine the location of the message length field. This may allow the CPE to lock on the RQUM as well as to determine where the next message's length field is. The CPE recursively decodes following messages by means of this successive locating of the message length field.

The CPE may declare itself in Downlink Synchronization when it confirms the capture of the DTA Data Structure by a capture of this structure in the following RQUM at the place it is expected, thereby ruling out the following of a sequence of falsely detected message lengths.

The CPE confirms Downlink Synchronization with every DTA Data Structure arriving within an RQUM. Should there be a failure to confirm, the terminal declares itself out of Downlink Synchronization.

RQ Synchronization

The RQ Synchronization Process in the disclosed embodiment may use four data elements to achieve RQ Synchronization: IR Age, RQ Age, RQUM Count, and RQ Count.

IR Age is measured in the number of RQUMs that have been transmitted since the IR entered the RQ. The 6-bit field can hold a count to 64 RQUMs, which represents approximately 640 milliseconds, and over 1824 IRs (i.e. messages) on the average. The RQ has a capacity of 1000 IRs, and an expected depth of 36 IRs. Thus, this field is adequate to record IR Age for any IR in RQ.

RQ Age is transmitted in RQUM and is the IR Age of the oldest IR in the Master RQ. This parameter is an example of Other Control Information specific to a given embodiment.

The RQ Synchronization Process starts by clearing RQ and initiating placement of new IRs starting with the next received RQUM. It continues to collect IRs and enter them into RQ so longer as the RQUM Counter of each new RQUM indicates that no RQUM has been missed. If one has, the RQ Synchronization Process starts over.

When the RQ Age in an RQUM is equal to or less than the oldest IR Age in the local RQ, the RQ Synchronization Algorithm declares the CPE in the RQ Clear state, and declares the associated RQUM the Sync RQUM. It can be seen that all IR in the Master RQ are present in the Local RQ.

The RQ Depth field in the Sync RQUM establishes the number of IRs that should be in the Local RQ. IRs are eliminated from the top of the Local RQ until it contains this number of elements. It can be seen that the associated messages for these IRs have already been transmitted.

The terminal is then declared to be in RQ Synchronization.

Uplink Synchronization

In the disclosed embodiment, after a CPE has achieved Clock Synchronization, Downlink Synchronization, and RQ Synchronization, it may perform Uplink Synchronization each time that an RQUM arrives starting with the Sync RQUM.

In the Uplink Synchronization process, the IR Transmit Time of the top IR of RQ is set to the RQUM Top Time value less the CPE Offset (or Bootstrap CPE Offset) plus present Local System Time. This step may tie the IR Transmit Time to Local System Time, but does not require the Local System Clock to be synchronized in phase (absolute time) with the Master System Clock.

Before CPE Registration, the Bootstrap CPE Offset is used to compute IR Transmit Time. This provides transmission time adequate for registration, but not adequate for the transmission of regular messages. Acquisition of CPE Offset is required before normal uplink transmission is allowed.

The process continues with message length values being used to calculate the IR Transmit Time for all IRs in the Local RQ, based on the IR Transmit Time of the IR at the top of the Local RQ.

The CPE is declared in Uplink Synchronization when this process occurs for the first time, and is maintained in Uplink Synchronization thereafter.

Registration and CPE Offset Adjustment

After the CPE has initially achieved Uplink Synchronization it may perform the Registration Process. In the disclosed embodiment, the HCC has a list of CPEs candidate to Register. The operator at the HCC updates this list on a daily basis.

From time to time, the HCC may sends out an IR for a special Registration control message that contains as Address, the Address of a candidate CPE, such Address being built in to the hardware or software of the CPE.

Having achieved Uplink Synchronization, the candidate CPE monitors for the IR of the Registration message directed to the CPE by means of the Address. When this IR appears at the top of the Local RQ, the CPE transmits a registration message into the reserved upstream interval. The interval is reserved with large enough guard space to allow for misalignment of the IR Transmit Time within the range of possible time, as determined by the propagation distance from the CPE to the HCC.

The HCC receives the registration message, records the location of the message in the interval, and thereby determines the CPE Offset.

The HCC transmits the CPE Offset value to the CPE in a Control message. The CPE records the CPE Offset, and uses this to update the IR Transmit Times thereafter. After the first such update, the CPE is Synchronized and in a position to transmit messages.

From time to time, the HCC may transmit an IR designating an offset update message, and addressing an arbitrary terminal. In this special instance, the CPE may transmit the message at a point slightly later than the IR Transmit Time of the Associated IR. This slight offset is chosen to place the message in the center of an interval with some small Guard Space so that the HCC can calculate a fine correction to the CPE Offset of the terminal. The HCC cycles through all of the terminals on a regular basis; adjusting their Offsets as it goes. The cycle time selected for the Embodiment is 2 hours.

The disclosed method and system 10 provide the Medium Access Control (MAC) function for a communications system (the "Network") in a way so as to support a scalable and responsive message exchange among a plurality of terminals distributed at a distance. The method of the disclosed embodiment may support the communications of data for any digital service without preference or distinction, for example data for Internet, telephony, and television services. The word "application" as used herein means hardware or software functions or processes, and the method of an embodiment of the invention may be organized into a set of control applications and databases, which reside, possibly with other applications, in the hardware or software physical elements of terminals.

The Headend Control Computer (HCC) 21 may comprise a set of databases and applications located at a central site. The HCC is the sole source of communication system data sent to the distributed terminals on the Network, and the sole destination of communication system data sent from the distributed terminals on the Network, and, further, the HCC 21 causes the data to be sent and received by means of the methods, protocols, techniques, formats, and processes as disclosed herein. The linkage on the Network that supports data flow from distributed terminals to the HCC is described herein as uplink. The linkage on the Network that supports data flow from the HCC to the distributed terminals is described herein as downlink.

A plurality of Customer Premise Equipment terminals (CPEs) each include comprising a set of databases and applications, and receives, on the Network, messages that are addressed to it or to groups that it is included in, such CPEs which share access to the Network for the purpose of sending and receiving messages by means of the methods, protocols, techniques, formats, and processes as disclosed herein. The CPE may be partitioned into the transmission/reception section, the CPE CC control section, and a set of interface modules.

In the preferred embodiment of the disclosed method, the CPEs are in fixed locations. The CPEs may be employed in mobile locations according to another embodiment of the invention.

Control information associated with the regulation of traffic flow on a Network may be carried in the Network itself. All or part of this control information may be carried by links not a part of the Network.

When integrated with it, are two interfaces, with special characteristics, that provide by known means complete separation of Service-specific control from system control; such interfaces comprising databases and applications, the applications on the Service-specific side of the interfaces are called service applications.

An interface between the HCC and Service-specific modules or functions called Service Provider Control Subsystems (SPCSs), provides one for each of the Services that are supported in the Network. The interface and control functions necessary to use the disclosed method to support the Services' particular offerings. FIG. 1 presents a depiction of the functional blocks associated with the interface between an SPCS and the HCC.

The second interface is within the CPE, being between a CPE CC and Service-specific modules or functions called Service Interface Modules (SIMs). Such modules provide, for each of the Services supported at a CPE site, the interface and control functions necessary for the use of the disclosed method to regulate data flow between presentation and storage devices associated with said Services at the CPE local site, and the SPCSs that are associated with the Services at the HCC site. FIG. 2 shows the functional blocks associated with interface between a SIM and the CPE CC.

As a variant in the SPCS interface, when incorporated as a part of the disclosed method, an SPCS (or related systems associated with the SPCS) forwards messages sent from one CPE, or variations or derivatives of such messages, to a distinct CPE or group of CPEs, thereby providing provide peer-to-peer connectivity between CPEs.

The system 10 and method provides a Service-Message Admission Control Function (SACF) that is one of the functions carried out by the SPCSs and SIMs at the interfaces to the HCC and CPEs, such SACF with the function of disciplining or policing message traffic offered to the Network so that this traffic has the statistical or average properties required by the BSDP embodiment. The properties include, but are not limited to, some or all of the following: (1) average message length, and (2) average rate of messages (see claim 10 with subparagraphs). In order to support the SACF function, service applications, or control applications acting to support a Service, can communicate among themselves using Service-specific control information transmitted within particular types of service messages. FIGS. 1 and 2 depict the role of the SACF function at the SPCS and the SIM in regulating message flow to the network.

The system 10 and method for a Network may share one or more channels using Time Division Multiple Access (TDMA) are claimed when integrated into the system structures. FIG. 3 presents the physical organization of channels in the disclosed method.

Transmission time may be organized into a series of contiguous time periods of variable length called herein intervals. Interval boundary times are measured at the HCC in terms of the Master System Clock.

Certain intervals have substructure providing for more than one contiguous time period within the interval. Such a substructure time-period is called a Slot. Whether an interval has slots or not is conveyed in the message header on the downlink and in the interval request on the upstream. For the sake of clarity, slots have the purpose of allowing several messages to be carried within one interval. Since the control overhead of the system 10 is associated with scheduling intervals, the use of slots can increase the efficiency of channel use with the disclosed method.

Messages may be carried in uplink and downstream intervals. Each of such intervals may be dynamically assigned and sized to carry exactly one message with an efficiency and effectiveness commensurate with the embodiment goals— typically the message fits the interval exactly or closely. For certain purposes slots may be assigned to carry a specified message, or to carry an unspecified message of known application and length (e.g. voice packets). For the sake of clarity, the messages may be transmitted on the uplink into different slots of a single interval by different CPEs. Empty intervals or slots are allowed, or in which more than one message can be transmitted into an interval or slot in a way such that the signals may contend or conflict and the information may be obscured or destroyed.

Upstream messages are transmitted so that they may arrive at the HCC positioned correctly within the associated interval or slot time boundaries, and downstream messages may be transmitted so that they may leave the HCC positioned correctly within the associated interval or slot time boundaries The system 10 utilizes separate physical layer frequency bands for uplink and downlink transmission of messages, an organization known in the art as Frequency Division Duplex (FDD). The system 10 sends uplink and downlink messages in one shared TDMA physical frequency band, such a channel organization is called in the art Time Division Duplex (TDD).

For the FDD channel organization, upstream intervals are in a contiguous sequence with the ending time of one interval serving as the beginning time of the next interval; and downstream intervals are arranged in a contiguous sequence with the ending time of one interval serving as the beginning time for the next interval. An alternate also claimed is that unused gaps are allowed between intervals in either uplink or downlink channels, or both. FIG. 3 depicts the arrangements of intervals in channels.

For the TDD channel organization, intervals are arranged in a contiguous sequence with the ending time of one interval serving as the beginning time of the next interval, but each interval may either be an uplink or a downstream interval. An alternate claimed is that unused gaps are allowed between intervals in the TDD channel organization. FIG. 3 contains examples of the use of intervals in channels, and is incorporated herein by reference.

A Network's CPEs are organized into groups that are assigned to sub-channels. The assignments are static, i.e. made once or from time-to-time in the life of the group, or are dynamic, i.e. made on the fly as a function of the instantaneous needs of the CPEs or of the pattern of Network usage. An elaboration on the TDD structure is with one full-bandwidth, downlink channel, and with the uplink channel split into a number of narrow-band channels that together have the same center frequency and total bandwidth as the downlink channel; such arrangement designed to require less CPE transmission power but maintain high-bandwidth downlink connectivity. For the sake of clarity, in such structure, the HCC maintains a Master RQ for each uplink group.

Some or all intervals and slots may include a Guard Space (a protective time gap between messages). The need for such Guard Space depending on the accuracy of the Local System Clock in tracking the Master System Clock in a particular embodiment.

The system 10 modulates transmits, acquires, tracks and demodulates signals on the uplink and downlink, collectively referred to as the Physical Layer. The Physical Layer may be appropriate to the medium and application of the particular embodiment. Physical media and/or modulation forms are different on the uplink and the downlink. Uplink and downlink modulation forms and data rates may be controlled within the system 10 so as to be altered in real-time in order to optimize the performance of data transmission on the various channels of an embodiment.

Each message on a channel may be a contiguous sequence of physical layer Minimum Transmittable Units (MTUs), organized and formatted, and transmitted coherently during an interval or Slot. An MTU is the minimum sized data transmission of which the Physical Layer implementation is capable. The size, measured in bits and/or seconds, of an MTU may vary according to the physical layer embodiments. For example, a QPSK modulation scheme may have an MTU of 2-bits. The size of an MTU may be different in the uplink and in the downlink or can differ as time goes on.

Downstream and upstream messages on FDD channels or sub-channels are sent back-to-back, the last MTU of one message being immediately followed by the first MTU of the next message. A single TDD channel or sub-channel upstream and downstream messages may be mixed into the sequence, but may be sent back-to-back.

In the absence in the message transmit queues (FIG. 1) of messages from the SPCSs, or of needed control messages, the downlink intervals of the Network are kept full by the HCC with harmless control messages, or of null messages or a combination of both. In the absence of requested message intervals from the CPEs or of needed upstream control messages, uplink channels of the network are kept full with harmless control messages, or of null messages or a combination of both, as requested by the HCC.

There may be gaps in downstream message transmissions and/or gaps in upstream message transmissions. Such gaps may be associated with empty intervals or slots, or with the absence of intervals.

Clock Synchronization may be held to an accuracy that allows demodulation without loss of symbol boundaries between one interval and the next; either on the downlink or on the uplink or on both. Downlink transmission by the HCC may be coherent from one message to the next.

An Acquisition Sequence field is used at the front of some or all message headers or in special control messages to support, by known methods, some or all of frequency, phase, and symbol boundary acquisitions, and other such functions, the specifics of such field depending on the embodiment.

Upstream sequence of messages may have contiguous boundaries, and accurate frequency alignment, both being adequate to provide the means to successfully track symbol boundary and frequency from one message to the next, such method providing the means to eliminate acquisition information on the message header. For the sake of clarity, the HCC demodulator in this variant is able to track or pull into lock, the modulation of each incoming message, without falling back to full signal acquisition. Known channel coding and interleaving methods are used to recover from message symbol errors likely in the first few symbols of a message resulting from application of this variant.

Integration of known methods of digital signal acquisition, demodulation, and tracking to be used for synchronization of the CPE clock, called the Local System Clock, may be used to determine the time for system associated actions; the synchronization to be with the HCC clock, called the Master System Clock, used to determine the time for system associated actions at the HCC; synchronization (Clock Synchronization) herewith meaning that the Local System Clock runs (i.e. tick rate) substantially at the same rate as the Master System Clock. The Local System Clock also tracks the phase (i.e. time) of the Master System Clock, with time possibly displaced by some fixed, known value such as the CP Offset. For the sake of clarity, in the preferred embodiment of the disclosed method, the Local System Clock may not be required to provide the time of the Master System Clock. Tracking the rate of advance of the Master System Clock by the Local System Clock (i.e. the tick rate) is adequate.

The clock rate of the Master System Clock is determined by means of tracking of the downlink data rate, such methods being by use of a phased locked loop or other known methods, in combination with a defined and communicated downlink data rate value or time-stamp-based protocol. A data element recording Clock-Synchronization state is kept in the CPE—the data element recording that the CPE is either in Clock Synchronization or out of Clock Synchronization, such state determined by the Clock Synchronization method. For example if a phase-locked-loop tracking the downlink data is in lock, the CPE is in Clock Synchronization The CPE transmission MTU rate is determined based on the Local System Clock that is in Clock Synchronization. The uplink is locked to the downlink. The HCC knows exactly the baud rate on the uplink relative to the Master System Clock and can compute the time span associated with interval or message Length.

Conventional methods for the CPE to acquire and track interval boundaries on the downlink, called the Downlink Tracking Algorithm (DTA), may be employed.

When a CPE has information of the downstream messages' starting time, measured in terms of the Master System Clock, with practical certainty (i.e. to a probability adequate for the purposes of the embodiment), it is said to be Downlink Synchronized; also called in Downlink Synchronization.

Each downstream message has an Acquisition Sequence, and the CPE acquires each message, thereby automatically determining message start time, and thereby always being in a state of Downlink Synchronization. For the sake of clarity, this method is of practical use when the message start time cannot be known with accuracy to allow capture without acquisition, for example in the case where the HCC transmitter is turned on to transmit each message and then turned off.

The message length field located in the message header of the associated downstream message provides a means for the determination of the next interval boundary and so on recursively; such variant includes use of a DTA Data Structure placed in some convenient set of downlink control messages, such as RQUM, but perhaps not in all downlink messages; and the DTA Data Structure being used to determine the location of the message length field of the associated message, which in turn is used in defining the location of the associated message and in finding the message length field of the following message, thereby supporting initiation of said recursive interval boundary determination; such variant to be applied in the case that downlink messages are transmitted continuously (allowing, however, for start-up and occasional gap exceptions which cause a known and acceptable amount of transmitted data to be lost by the CPEs), without Guard Space in the intervals, and with modulation maintaining symbol boundary alignment from one message to the next, and with or without phase coherence across message boundaries.

The DTA Data Structure has a structure having a rarely occurring data pattern and an attractive self-correlation property, as determined appropriate for each embodiment. For the sake of clarity a DTA Data Structure does not support the basic Physical Layer channel acquisition functions of frequency, phase, and symbol acquisition. A variant DTA Data Structure is claimed that is known in the art as a correlation sequence (i.e. a sequence of fixed bits, with the property that it has very low self-correlation unless it is correctly aligned with itself), such sequence with false detection and false dismissal probabilities adequate to support practical Downlink Synchronization. as required for a specific embodiment.

The CPE may capture each DTA Data Structure, and use a cross check with predicted location of said correlation sequence to establish and confirm Downlink Synchronization. If such a check fails the CPE declares the terminal not in Downlink Synchronization.

A data structure, called the message, is shown in FIG. 5, which presents the structure of the message. messages are carried in intervals or slots.

The format of the message body (FIG. 5) for a particular message, as designated by a particular application ID, is determined by the designer of those applications which are intended to send and receive the message, this being either service applications or control applications. In the disclosed method, a message may have a message header (FIG. 5) or the functional equivalent. The message header is depicted in FIG. 5. A downstream message will have a message header, or equivalent functionality. An upstream message may not have a message header, depending on the embodiment. For the sake of clarity, this is because in the disclosed method, the control information that needs to be associated with the message may be carried in an Associated IR. A message header carries control information used in the disclosed method to determine, among other things, the routing, priority, and format of a message. The message header may also be used to carry synchronization and acquisition information.

A message length field (FIG. 5) carries the value of the length of the associated message, such value in terms of time, MTUs, or other data units, or functionally equivalent, as convenient. The message length field is included, in the BSDP method, in the message header of downlink messages and may be included in upstream messages.

An Address (FIG. 5) is included in the message header of downstream messages, and may be included in the message header of upstream messages. For a downlink message the destination is named in the Address field, such destination may be a CPE, a group of CPEs, or all CPEs. For an upstream message, the controlling entity is named in the Address field, if this field is present. This is the HCC or a CPE. Typically it is the CPE designated to transmit a message into an interval. However, the Controlling Entity may be other than such transmitting entity. The Controlling Entity may request the interval for use by one or more other entities as organized and controlled by service and/or control applications in a particular embodiment.

An application ID (FIG. 5) is included in the message header of downstream messages, and may be included in the message header of upstream messages. The application ID indicates to the receiving Receive Router which service or control application is the intended destination, and provides said Receive Router the necessary information to route the message.

A Type and Priority field (FIG. 5) is included in the message header of downstream messages, and may be included in the message header of upstream messages. The Type and Priority field is used by the RQ Insertion Algorithm application to determine scheduling of a message, and may be used for other purposes.

The message header may carry additional control information specific to the embodiment called Other Control Information.

In the disclosed method, service applications organize and direct to be transmitted service messages; such service message being a type of message. Service messages are directed to service applications.

Control applications which reside either in the HCC or the CPE CC (FIGS. 1 and 2) organize, and direct to be transmitted, control messages; such control message being a type of message. Control messages are directed to control applications. Certain embodiments may include control messages associated with: (i) CPEs joining the Network including Registration and determining CPE Offset (see claim 26 and subparagraphs), (ii) establishing and supporting various priority and categorization arrangements, (iii) updating control algorithms, (iv) synchronizing encryption systems, (v) modifying or varying modulation and other physical layer modes, and (vi) supporting other management and control functions as deemed necessary by the specific implementation designer. For any given embodiment, there is a required set of control message types and associated data types, as defined here below, that are present.

An interval request (IR) (FIG. 6). The IR data structure is used to convey a request for an interval of uplink channel capacity. The upstream interval associated with an IR is called the Associated interval. An IR associated with an upstream interval is called the associated IR. Every interval has one and only one Associated IR. If the interval does not have slots, it is then associated with one and only one message (see claim 5(c)), such message being called in this case the associated message. Certain key interval characteristics, as depicted in Drawing 6, are recorded in the IR. Every IR has an interval Length field, which defines the length of the Associated interval in terms of a convenient measure (see claim 10(c) for the comparable message length field of a message header). For the sake of clarity, because of the presence of Guard Space, interval Length for an associated interval may be larger than message length for an associated message, or larger than the combined message lengths for a set of messages to be placed in slots in a single interval. The IR contains Address, application ID, and Type and Priority fields. The combination of these three fields may be used in an embodiment to convey the control information needed, at the MAC layer, to organize distinct and separate message transmissions into slots of a single interval. The IR may contain Other Control Information as per claim 10(g).

The IR is present in several different control message types—to wit at least in the IRM and the RQUM, and is the element, or provides information for the element, carried in the Request Queue. For the sake of clarity, an RQ element may contain a data structure comprising a part of the IR information, all of the IR information, or independent information plus some or all of the IR information, depending on the detailed design of the embodiment. However, the RQ element must, as a minimum, contain the Address and interval Length from the IR on which it is based (see FIG. 6). For the sake of descriptive convenience, the RQ elements are also called IRs. There is one and only one RQ element created for each IR received by the RQ Insertion Algorithm application. Each IR as an element in the RQ has associated with it a Transmit Time data element, such time being the best estimate by the RQ Insertion Algorithm of the time that the associated message (whether local or not) is to be transmitted. When reference is made herein to the Transmit Time of a message, as such Transmit Time is carried as the value of a data element associated with said message's Associated IR; it is called the IR Transmit Time. The Transmit Time is a field of the IR added by the RQ Insertion Algorithm when modifying the IR for placement in the RQ. Transmit Time is measured in terms of the system clock of the terminal—in terms of the Master System Clock for the HCC, and the Local System Clock for each of the CPEs.

An interval request message (IRM) is a control message that carries, on the uplink, an interval request from a CPE to the HCC. The IRM is of fixed length. The IRM is of variable length. The IRM is depicted in FIG. 6.

An Aloha slot is a slot of size fixed to best suit carrying an IRM message. Since IRMs are allowed to have variable length, the Aloha slot may be of variable size, with size for a particular slot chosen to fit a particular sized IRM. For the sake of clarity additional control messages may be used, or rules must exist in the embodiment. for this variant of BSDP, so that the Aloha slots can be designated to appropriately fit the intended IRMs without such information being provided on an individual IRM basis. As example, the size of IRM can be based on the time of day, or the embodiment may include different types of intervals, as designated in the Type and Priority field, to carry different size IRMs, the different size used for the different types of messages—perhaps for messages of different services. The preferred embodiment is that the IRMs are of fixed size for all messages and that the Aloha slots are of fixed size.

ASBIs are intervals assigned on the uplink to carry a contiguous set of one or more Aloha slots. A variant is claimed in which different types of ASBIs carry different types of Aloha slots, either with different format or with different purpose. An ASBI is typed to carry IRMs that have been previously transmitted a given number of times and have suffered contention on those transmissions, or variations thereto. The application ID and/or Type and Priority field of the IR for the ASBI may be used to designate distinct ASBI types.

A Request Queue Update Message (RQUM) is a control message that is a variable length downstream message originating at the HCC that contains variable number of interval requests and, possibly, additional control data in the Body of the message. FIG. 6 presents an example RQUM structure and is incorporated in this claim by reference.

The RQUM Top Time field is contained in the message header of an RQUM message; such field contains information used to precisely define the transmission time for that message that is at the top of the Master RQ (i.e. whose transmission has not started yet) at the instant that the RQUM is transmitted. Time is taken relative to the exact transmission time of the RQUM—i.e. the span of time between the transmission instant of the RQUM and the planned transmission instant of the top element of the Master RQ, thereby providing the CPE opportunity to adjust said Transmit Time as computed locally. For the sake of clarity, this variant allows the CPEs' Local System Clock to be locked only in rate to the Master System Clock, and not in absolute time. The RQUM Top Time field may be carried in another control message of the embodiment.

The RQ Depth field is contained in the message header of an RQUM message; such field containing information used to define the number of entities in the Master RQ at the transmission time of the RQUM, the entities possibly being measured in: (1) number of IRs; (2) number of MTUs; (3) time span from the bottom to the top of RQ; or (4) other measures of convenience.

The Other Control Information field of the message header of an RQUM is null, or containing control information particular to an individual embodiment. The Other Control Information field contains, as a sub-field or as the whole field, a data field called an RQUM Counter (FIG. 6) which provides information that allows a CPE to determine that an RQUM has been missed, and example of an RQUM Counter is a field of some fixed number of bits which is incremented circularly (i.e. after the largest number is reached, the next increment is to 0) for each RQUM transmitted. The Other Control Information field contains, in a sub-field or the whole field, a DTA Data Structure.

The HCC and CPEs contain message transmit queues and message receive queues (FIGS. 1 and 2) or the equivalent.

Message receive queues hold messages that have been received. These queues are filled by the Receive Router and are timely served by control and service applications. There may be one, or more than one, message receive queues in a CPE and in an HCC. Each message receive queue is assigned to one and only one application (which may itself be a router), thereby facilitating routing of messages.

Message transmit queues hold messages to be transmitted. There may be one, or more than one message Transmit queue in a CPE or in an HCC, or there may be more than one. Message transmit queues are filled by control and service applications and are timely served by the Transmission Scheduler.

When a service message is presented as input from a SIM or SPCS, according to service specific policies and the regulation of the SACF, the message is stored in a message transmit queue. Placement in this queue is by means of a placement algorithm, which can be FIFO, or a priority-based algorithm that places higher priority messages so as to be served more quickly in the message transmit queue. When a message arrives at the top of the queue, it is candidate for next-to-be-transmitted.

In the case that more than one message transmit queue is used at the HCC or the CPE, the specific message transmit queue selected for placement of a message by an application is determined by characteristics of the message: including but not limited to application ID, Priority and type, and message length.

Control messages originating with a control applications within HCC or CPE are also placed in a message transmit queue. Placement in this queue is by means of a placement algorithm, which can be FIFO, or a priority-based algorithm that places higher priority messages so as to be served more quickly in the message transmit queue. When a message arrives at the top of the queue, it is candidate for next-to-be-transmitted.

The Request Queue (RQ) is a distributed data structure. It is depicted in FIG. 7. RQ is formed as follows: The version of the Request Queue carried in the HCC database is called the Master Request Queue and is the correct and accurate version of the Request Queue. Each CPE carries an estimate of the Master Request Queue called the Local Request Queue, which can be different from the Master RQ even though the BSDP method provides the means for the CPE to maintain the Local RQ as a copy of the Master RQ. The local RQ can be different because for some amount of time the CPE does not receive information from the HCC needed to keep the Local RQ identical to the Master RQ. RQ is a single queue of interval requests, including a mix of IRs for service messages and for control messages. The size of RQ is set to support variations in message rates on the upstream.

The system 10 organizes the scheduling of TDMA messages in the uplink and in the downlink. The basic system functions associated with organizing and scheduling message transmission and reception are:

Receiving a message in the CPE
Receiving a message in the HCC
Routing received messages in the terminal
Transmitting messages
Scheduling message transmission
RQUM generation
Maintaining the Request Queue—the RQ Insertion Algorithm
RQ synchronization
Uplink synchronization
Registration
Creation of IRs and IRMs
Transmission of IRMs
The interval request spreading function
IRM contention resolution
ASBI and Aloha slot scheduling Given that a CPE has achieved Downlink Synchronization, a method is claimed when integrated into the disclosed method, in which each CPE monitors the downlink for the purpose of selectively inputting messages intended for it, and for the purpose of maintaining Downlink Synchronization.

In the variants of downlink channel organization in which there is Guard Space, the CPE causes its downlink receiver to acquire and demodulate each message independently. For variants of downlink channel organization where messages are contiguous, a CPE, once having attained Downlink Synchronization, collects each message on the downlink to the point of being able to reference the message mength field in the message header, and by this means determines how long said message is, this providing a means for receiving the message contents if appropriately addressed, and a means of determining where the next message starts and stops. The method for determining message boundaries is strengthened by a Downlink Synchronization method used to assure that uncorrected channel errors occurring in the message length fields do not cause the CPE to lose its ability to locate messages on the downlink for any significant period of time.

The HCC monitors the uplink for the purpose of inputting messages, and for the purpose of maintain acquisition and tracking in accordance with the specific embodiment. The HCC-associated receiver demodulates and decodes upstream messages.

The Receive Router is a control application, which resides in both the HCC and the CPE (FIGS. 1 and 2).

All messages received at the HCC from the associated receiver subsystem may be intended for the HCC. The Receive Router at the HCC monitors the messages received from the receiving subsystem of the HCC and routes them in accordance with their message headers to the appropriate message receive queues. The Receive Router at the CPE CC monitors the messages received from the receiving subsystem of the CPE and routes all Control and service messages, that are addressed to the CPE or to groups of which the CPE is a part, to appropriate message receive queues, in accordance with their message headers, as The Receive Router discards all other messages.

The Receive Router selects a message receive queue to place a message, as determined by means of the application ID of the message, and thereby directs said message to the appropriate application in the terminal.

The Receiver Router coordinates with the lower-layer receive functions to aid said receive functions in demodulation and tracking of messages.

Referring now to FIGS. 1 and 2, the Transmission Scheduler is a control application, which resides in both the HCC and the CPE. The means and methods of the Transmission Scheduler, or equivalent functionality, for affecting transmission of messages:

The Transmission Scheduler affects transmission of messages by causing them to be taken from the message transmit queue or queues and to be placed in intervals on the downlink. The Transmission Scheduler at the HCC determines the interval size on the downlink at the time of transmission. The Transmission Scheduler at a CPE is given the interval size in an Associated IR for an uplink transmission. A variant is claimed in which the Transmission Scheduler affects transmission of a message in a slot. Various known methods of causing data groups or messages to be transmitted on a priority basis onto a TDMA link may be used by the Transmission Scheduler.

The Transmission Scheduler coordinates with the transmission subsystem and schedules messages to flow across the interface to this subsystem to affect the correct transmission time. At the HCC this flow of message information occurs so that the subsystem can maintain downstream message transmission as specified in the embodiment. In the case of the downlinks, this is a continuous transmission of downstream messages with one interval immediately following another, and every interval containing transmitted message data. The transmission is coherently transmitted across the interval boundaries. At the HCC, in the case where message transmit queues are found to be empty, the Transmission Scheduler creates and schedules null messages, formatted as convenient for a particular embodiment. A variant is claimed in which the embodiment always has available to the Transmission Scheduler at the HCC control messages that may be scheduled if there are no other messages ready for transmission.

The Transmission Scheduler only causes a message to be transmitted if there is a message in one of the message transmit queues, but transmission is structured such that signals are coherent from one message to another, even though there are gaps between messages. For the sake of clarity, on the downlink this flywheel-type transmission mode supports accurate Clock Synchronization at the CPEs so long as gaps are not too frequent or long lasting. On the uplink, it can support more rapid HCC demodulation of CPE messages.

The Transmission Scheduler only causes a message to be transmitted if there is a message in one of the queues, and modulation from one message to another is not coherently related, but the MTU transmission rate and the symbol boundaries may be synchronized across messages. This mode also supports Clock Synchronization on the downlink, but less accurately because the synchronization process at the CPE must deal with full signal acquisition for each interval.

The Transmission Scheduler is a control application, which resides in both the HCC and the CPE (FIGS. 1 and 2) for scheduling of messages for transmission by the Transmission Scheduler, or equivalent functionality; being depicted in example embodiments of FIG. 10.

The Transmission Scheduler coordinates with other control applications to regulate the length and frequency of transmitted messages so that these are within the range-of-values required by the embodiment.

At the CPE, the Transmission Scheduler only schedules a message transmission into an interval or slot if the CPE is Synchronized, also called in a Synchronized State, a CPE is Synchronized when it has achieved Clock Synchronization, Downlink Synchronization, RQ Synchronization, Uplink Synchronization, and has determined the CPE Offset. An exception to this rule is that in most variants and embodiments envisioned, a CPE can and may transmit at least one REGM after it has attained all synchronization stages here listed except for determining the CPE Offset and Uplink Synchronization.

In Synchronized CPEs, messages are selected by the Transmission Scheduler for transmission from the message transmit queue or queues, or variants thereof as follows: the Transmission Scheduler monitors the top IR of the Local RQ, and the associated IR Transmit Time, to determine if it is to schedule a transmission of a message into a pre-defined interval or slot, and in the case that it finds that it is assigned to transmit, the Transmission Scheduler causes the designated message to be taken from a message Transmit Queue and to be transmitted at precisely the IR Transmit Time so designated. Said determination is based on the information of all of the fields of the IR, but most particularly that the Address is the Address of the local CPE. For the sake of clarity, the Transmission Scheduler can be required to cause transmissions of several messages into different slots of the same interval.

The Transmission Scheduler causes to be transmitted local messages that have Associated IR Addresses that are not the local CPE's, such criterion for transmitting depending on some or all of: the Type and Priority field, Other control information in the IR, and on side communications with the local SIMs. As an example, a telephone circuit may be established by one CPE and all intervals of the circuit have its Address, but the assignment of who talks on said set of intervals (i.e. circuit) at any instant is determined by the SPCS and SIMs associated with the telephone service. The Transmission Scheduler receives information from the Service Provider's control subsystem (i.e. the SPCS or SIM), or from other control applications of the control system in order to have sufficient information as to when to transmit a message.

Slot location and/or slot size is carried in the message header as Other Control Information and/or in the associated IR as Other Control Information, thereby allowing the determination by the Transmission Scheduler of a slot which it is to use. A variation is claimed in which the message is designated such that the Transmission Scheduler, or associated application, determines randomly a slot for transmission of the message, with the understanding that contention is allowed. This variant is in fact the variant used for IRM transmission. If this variant is used for other than IRMs, it is not the function of the disclosed method to resolve contentions for slots. The local applications determine a contention and reschedule as appropriate in accordance with their particular methods, this typically being service applications. For the sake of clarity, in this last variant, for service messages, the SPCS applications would typically provide a means for contention resolution, working with the SIMs of a particular service. The practical value of the use of slots by services is that longer interval lengths can be maintained, while transmission of shorter messages is supported—a characteristic affecting over-all channel-use efficiency of the disclosed method. Additionally, efficiency and flexibility may be gained in having this capability available. The Transmission Schedulers for each Synchronized CPE and for the HCC update RQ by removing the top IR element from the queue, and possibly archiving it for future reference, such removal occurring at the IR Transmit Time for the top IR, and occurring whether the associated message is transmitted from the local CPE or any other CPE. For the sake of clarity, with this process, all Transmission Schedulers working together to effectively schedule every upstream interval.

An HCC control application called the Request Manager collects IRs, forms RQUM, communicates the RQUM contents to the RQ Insertion Algorithm at the HCC, and places RQUM in a message transmit queue. (FIG. 1 depicts the role of the Request Manager and is incorporated wherewith by reference.)

The HCC receives IRs from the CPEs in ASBIs. HCC Control applications also generate IRs from time to time as required in accordance with the BSDP method, and with requirements particular to attendant embodiments. For the sake of clarity, IRs may be formed by the HCC in support of and working with the SPCSs, to provide for uplink service messages (essentially polling), intervals with slots, or intervals of other special Type and Priority. Also, the SPCSs may generate IRs (essentially scheduling CPE transmissions). From all possible sources the HCC collects and maintains a pool of IRs (the Master IR Pool), as depicted in FIG. 1. All IR sources direct their IRs to the Request Management control application in the HCC.

From time-to-time, but timely for the purposes of the embodiment, the Request Manager forms an RQUM and places it in a message transmit queue. The Request Manager takes IRs from the Master IR Pool to form an RQUM, placing these in an order in RQUM in according with any standard method of art, which method is claimed herewith when incorporated into the BSDP method. A variant is claimed in which at the time of formation of the RQUM, every available IR is taken from the Master IR Pool, said variant supporting rapid interval-scheduling-response to requests. A variant is claimed in which certain of the IR are selected from the pool to form the RQUM. For the sake of clarity, this method can beneficially supply means to give priority to requests or to aid in regulation of channel loading. As a variant claimed as a part of the BSDP method when integrated therewith, a message transmit queue in the HCC may be reserved for only RQUMs or for RQUMs and other high-priority Control messages. For the sake of clarity, the Transmission Scheduler would typically serve said message transmit queue with high priority.

The Request Manager schedules RQUM formation and placement in a message transmit queue on a regular basis. RQUMs are formed and placed at times including at the times of receipt by the HCC of an Aloha interval. A variant is claimed in which RQUMs are formed and transmitted at times including those times when one or more IRs are received from control applications in the HCC. RQUMs are formed and transmitted when a certain number of IRs have accumulated in the Master IR Pool. RQUMs are formed and transmitted periodically, whether IRs are present in the Master IR Pool or not.

The Request Manager provides the RQ Insertion Algorithm application in the HCC a copy or view of each and every RQUM placed in a message transmit queue, said action to occur substantially coincident with the time that the RQUM is placed in said message transmit queue. This action is indicated in FIG. 1 by a dotted line connecting the Request Manager with the RQ Insertion Algorithm.

An RQ Insertion Algorithm control application, in the HCC and in the CPEs, receives RQUMs and places the IRs from these RQUMs, possibly as modified by the RQ Insertion Algorithm, in the Request Queue. In the HCC, the IRs are placed in the Master Request Queue version of the RQ. In the CPE, the IRs are placed in the Local Request Queue version of RQ. For the sake of clarity: the RQ Insertion Algorithm carries on this task independent of the synchronization state of the terminal. If the application receives an RQUM, it places the IRs from this RQUM in RQ.

In the BSDP method, the RQ Insertion Algorithm embodied in the HCC and CPEs employs an identical algorithm for placement of the IRs in RQ. A variant is claimed in which said algorithm is static and unchanging in an embodiment. A variant is claimed in which the HCC can send parameters or software updates to the CPE as a means to change said algorithm, such change to occur at the same point in time (with respect to placement of IRs), in all terminals.

In the BSDP method, the RQ Insertion Algorithm is such that IRs are placed in the RQ with their mutual ordering preserved, whether all IRs are present or not, and every IR placed in RQ arrives at the top of RQ in reasonable time, or is discarded.

Known methods are claimed, when integrated into the disclosed method, in which the RQ Insertion Algorithm is such that RQ can in reasonable time be put into RQ Synchronization if it falls out of RQ Synchronization. As a specific example of this set of methods, the known method of placing each new IR at the bottom (i.e. last to be taken from the queue) of the RQ (known in the art as the FIFO method) is integrated into the disclosed method as a variant.

It is possible for an IR to be inserted into RQ in such a way that the scheduled IR Transmit Time for the associated interval, as measured at a specific CPE with a specific Offset Delay, has already passed. The message corresponding to an IR that meets this description is ineligible for transmission. Whenever the HCC determines that RQ is empty, it arbitrarily sets the RQUM Top Time, or equivalent, so that all CPEs, including the transmitting CPE or CPEs, can establish the Associated IR before this Transmit Time arrives. The HCC RQ Insertion Algorithm incorporates a characteristic that it does not place IRs in the Master RQ if their IR Transmit Time has passed before they are received at the CPEs. The HCC generates a null interval IR, and the RQ Insertion Algorithm at the HCC orders a special control interval such that this interval has highest priority when placed in RQUM and such interval is placed in RQ such as to have its associated time period span the period in which an actively scheduled transmission would start before the associated IR arrives. For the sake of clarity, it provides padding at the start of RQ in which no one transmits on the uplink. Therefore receiving this past its IR Transmit Time is without consequences.

The RQ Insertion Algorithm culls or deletes IRs from RQ in a known way in the case that RQ grows to a certain size. For the sake of clarity, this is to control the overflow situation. It is to be noted that one method of controlling overflow is for the RQ Insertion Algorithm to throw away any new IR when there is no space left in the RQ.

A CPE utilizes an RQ Synchronization Algorithm control application to determine that the CPE's Local RQ is identical (in terms of entries and order of entries) to the Master RQ (i.e. the CPE is in RQ Synchronization or RQ Synchronized); such comparison for identity being made between the Master RQ and at the Local RQ as each has completed receiving placement of IRs from the same RQUM or equivalent functionality, as is illustrated in FIG. 8. For the sake of clarity the Master RQ and the Local RQ do not receive placement of IRs from the same RQUM at the same time. IRs are received in an RQUM, or equivalent functionality, by the RQ Insertion Algorithm of the HCC and placed in the Master RQ, and such RQUM is forthwith sent to all CPEs, or distributed with the same effect by some other methodology.

In the disclosed method, a CPE is not in RQ Synchronization in a Network until the RQ Synchronization Algorithm has brought it into the condition of RQ Synchronized. For the sake of clarity, a CPE freshly joining a Network is not RQ Synchronized. The HCC is always RQ Synchronized.

The HCC provides information on a regular basis to all CPE so that their RQ Synchronization Algorithms are able to timely detect loss of RQ Synchronization and establish RQ Synchronization. Any approach providing such information from the HCC to the CPE is claimed herewith, whether such information is provided in the RQUM messages or in other information elements of the disclosed method; For the sake of clarity, it is a characteristic of the disclosed method that the only reason that a CPE can be out of RQ Synchronization is that the CPE has not received from the HCC all information that has been sent by the HCC.

Some or all information necessary to determine, establish, and maintain RQ Synchronization is carried in RQUM messages, such data to include, but not be limited to RQ Depth. RQUM contains an RQUM Counter. A detection of loss of RQ Synchronization may occur because of the difference between certain control data received from the HCC and the value of this same control data as computed by the RQ Synchronization Algorithm from information available locally to this application. Such information may include some or all of the following, but not be limited thereto: (i) RQ Depth; (ii) RQUM Top Time, and RQUM Counter value.

If the RQUM, or like control data, transmission is interfered with by channel noise or interference, such that the data is incorrectly received at a CPE, and therefore discarded with practical surety, the CPE will go out of RQ Synchronization. For the sake of clarity, this condition is determined at the CPE at the receipt of the next set of HCC control data, such control data typically being sent by means of an RQUM.

It is possible that the CPE can transmit while out of RQ Synchronization between the time that the CPE goes out of RQ Synchronization and the time that it receives data by means of which it detects this condition, such a transmission by the CPE under these circumstances possibly causing interference with another transmitted message. The RQ Manager assures the presence of a sufficient number IRs in RQ, and the RQ Insertion Algorithm places IRs in RQ, so that a CPE will be declared out of RQ Synchronization before any IR reaches the top of the queue with incorrect Transmit Time. Specific means are claimed as a part of this variant as follows: (1) After an IR has reached a certain IR Age; IRs can no longer be placed in front of it. It might be said to have tenure. When an RQUM has been received after this certain IR Age has been reached by an IR, and RQ Synchronization been confirmed thereby, the associated message can be transmitted when the IR reaches the top of RQ with surety of being transmitted without error. The RQ Manager guarantees an RQUM can monitor the Master RQ and assure transmission of an RQUM to assure the conformation process is effective. Hence if such an RQUM is not received the CPE declares itself out of RQ Synchronization and does not transmit; (2) After a certain number of RQUM have arrived, once an IR is in RQ, no further IR can be put in front of it, then the scenario as of (1) herewith; (3) IRs cannot be put in front of a certain number of IRs at the top of RQ, and once an IR is in this group and an RQUM has been received, then the scenario of (1) herewith applies; and (4) Any such technique in which an IR can no longer have IRs placed in front of it in RQ, and RQ Synchronization is confirmed, then the scenario of (1) herewith applies. Message will not be transmitted until control information needed to detect loss of RQ Synchronization has been received (normally in an RQUM) from the HCC after its Associated IR position in RQ is determined to the extent that no IR will be placed in front of it from future RQUMs. For the sake of clarity, messages scheduled for transmission, will not be incorrectly transmitted in said vulnerable time period in this variant.

There is a maximum time span between RQUM (or equivalent mechanisms delivering control information to the CPE), and if an RQUM (or equivalent) does not arrive at a CPE within this time span, the CPE declares itself out of RQ Synchronization.

The RQ Synchronization Algorithm synchronizes the Local RQ with the Master RQ. When an RQ Synchronization Algorithm determines that a CPE is not in RQ Synchronization, it timely initiates an RQ Synchronization Process, which puts the CPE into RQ Synchronization. All such processes are claimed, such processes sharing the method that they (1) determine that all IR present in the Master RQ are present in the Local RQ; When such is the case the CPE is said to be in the RQ Clear state, or to be RQ Clear; and (2) When a CPE is RQ Clear, all IR not in the Master RQ are deleted from the Local RQ; all comparisons as to presence or absence of IR in the Master and Local RQ are made as illustrated in FIG. 8. Upon completing step (2) herewith, possibly also having taken additional confirmation steps, the CPE is said to be RQ Synchronized.

FIG. 9 presents a state diagram of an example RQ Synchronization Process and is incorporated herewith by reference. For the sake of clarity, it is assured that the IRs in the Local RQ always have been placed in the same order as they are placed in the Master RQ because of the ordering property of the RQ Insertion Algorithm. The RQ Synchronization Algorithm performs the two stages of the process as defined herewith, but waits to declare RQ Synchronized until it confirms the state of RQ with information received in one or more following RQUMs or their equivalent.

The inclusion of an RQUM Counter provides a means for the RQ Synchronization Algorithm to determine that it has received all IRs sent by the HCC over a certain span of time; the use of this means to determine the RQ Clear state.

By one of several possible means, the RQ Synchronization Algorithm determines that a CPE is RQ Clear, and upon determining this, the RQ Synchronization Algorithm selects the present or an ensuing RQUM, designated the Sync RQUM once selected, whose information is to be used by the RQ Synchronization Algorithm in a means to bring the CPE into RQ Synchronization, such means being that, after placement of the IRs from the Sync RQUM into the RQ, the RQ Synchronization Algorithm references the RQ Depth field of the Sync RQUM and retains in RQ those IRs to be transmitted most distant in the future (i.e. at the bottom of RQ), the combined depth of such set of IRs equaling the RQ Depth value carried in the Sync RQUM. The remaining IRs (nearer the top of RQ) are discarded. For the sake of clarity, all IRs present in the Master RQ are present in the Local RQ when the CPE is RQ Clear, and they are ordered correctly. Thus, if there are more IRs in the Local RQ, a number of these must have been discarded at the Master RQ because their IR Transmit Time had passed. For the sake of clarity, the CPE cannot be in the RQ Clear state and have a Local RQ of less depth than the Master RQ. For the sake of clarity, in the example of FIG. 9, the Sync RQUM is implicitly the RQUM whose information allowed the RQ Synchronization Algorithm to determined the CPE to be RQ Clear.

The initial step, common to all means of determining RQ Clear is for the RQ Synchronization Algorithm to verify that the CPE has received every IR sent by the HCC since the start of the RQ Synchronization Process; this being equivalent to verifying that every RQUM, or equivalent information transmission, sent during such said time period has been successfully received. In the case where it is found that IRs have been missed, the RQ Synchronization Algorithm restarts the RQ Synchronization Process. This procedure is depicted in the example of FIG. 9. RQUMs contain the RQUM Counter field and this field provides a means for the RQ Synchronization Algorithm to determine that no RQUMs are missed.

For the sake of clarity, in order for a CPE to be RQ Clear, all IRs that were in the Master RQ, but not in the Local RQ, at the beginning of the RQ Synchronization Process must have been considered and discarded by the HCC Transmission Scheduler, i.e. their associated IR Transmit Times must have moved to the past.

In the case where the CPE tracks Master System Clock time as well as phase, the CPE records the time of arrival of each RQUM or equivalent (an equivalent being to record the RQUM Top Time of an RQUM, where in this variant such RQUM Top Time is to be provided in terms of the Master System Clock absolute time); the time-of-arrival then being associated in a local database with the RQ entries of the IRs arriving in an RQUM, the time being called the IR Birth Time of these IRs. The HCC from time-to-time provides the IR Birth Time of the oldest IR in the Master RQ (most conveniently done in the RQUM message header), thereby providing the means for the local RQ Synchronization Algorithm to determine when it has received all IRs now in the Master queue and to determine that older IRs have been cleared or discarded from the Master RQ, and therewith and thereby allowing it to declare RQ Clear. IRs of a IR Birth Time older than some pre-established and fixed value relative to present time are discarded from the RQ by the RQ Insertion Algorithm, or equivalent. As a variant, such discard IR Birth Time threshold can be varied by the HCC, and its present value be timely communicated to the CPEs by the HCC.

In certain variants of the RQ synchronization Algorithm, a record is associated with each IR of RQ, said record being called the IR Age (FIG. 6), the IR Age for a particular IR is initiated by the RQ Synchronization Algorithm upon receipt of said IR (in the HCC and in all CPEs). The IR Age for a particular IR is initiated at zero value in the HCC at the time that the RQUM, that contains said IR, is sent. The IR Age for an IR received at a CPE is initiated at the CPE Offset value. The IR Age associated with each IR of the RQ in a terminal is incremented at the same time and by the same amount by the RQ Synchronization Algorithm, or equivalent functionality, said incrementing process to be performed at comparable times in the CPE and the HCC as determined (FIG. 8). If the measure used for IR Age is time, said increment will be by the elapsed time since the last increment. (In the variant here cited above, this would be the elapsed time since the last RQUM.) All methods using IR Age when used as a part of the RQ Synchronization Algorithm, are claimed. A variant of IR Age is claimed in which the measure of age is in terms of number of RQUMs that have been created and transmitted since the initial placement of an IR, the CPE IR Age and the HCC IR Age being initiated in said variant at the same number (1 or 0 are appropriate choices), and are incremented by "1" each time that an RQUM arrives at the RQ Insertion Algorithm.

The HCC, from time-to-time, most conveniently in the RQUM message header, provides the IR Age of the oldest IR in the Master RQ, thereby providing the means for the RQ Synchronization Algorithm to determine when it has received all IRs that remain in the Master queue and that older IRs have been cleared or discarded in the Master RQ, and therewith and thereby allowing the RQ Synchronization Algorithm to determine and declare RQ Clear.

The IR Age record may be established and maintained and IRs of older than a certain IR Age called the Maximum IR Age are discarded from RQ and, further, that the RQ Synchronization Algorithm declares RQ Clear When the RQ Synchronization Process has collected IRs for a time equal to or greater than the Maximum IR Age.

The RQ Insertion Algorithm of a CPE is RQ Synchronized, establishes and maintains the IR Transmit Times for an adequate number of IRs in the Local RQ so that the Transmission Scheduler substantially always has available the IR Transmit Time of the top element in RQ. When the CPE is in a state in which the RQ Insertion Algorithm has recorded the Transmit Times to an accuracy adequate for the successful and practical transmission of upstream messages (i.e. so that these messages are within their associated intervals) in a particular embodiment, the CPE is said to have attained or achieved Uplink Synchronization, or alternatively the CPE is said to be in Uplink Synchronization, or Uplink Synchronized.

The RQ Insertion Algorithm control application at the HCC, or a functional equivalent, dictates the Transmit Time for each interval on the uplink. For the sake of clarity, the IR Transmit Times are always perfectly recorded in the HCC because the RQ Insertion Algorithm in the HCC defines them. Thus, the HCC is always in Uplink Synchronization. However, the IR Transmit Times may be recorded inaccurately in a CPE if said CPE is not Uplink Synchronized.

In the BSDP method, the HCC assures that the CPEs receive information reporting any change in IR Transmission Times of the IRs in the Master RQ, such information to be received by the CPEs in a timely manner (i.e. before they have an opportunity to transmit a message using an erroneous Transmit Time), thereby providing each CPE the means to maintain Uplink Synchronization.

The RQ Insertion Algorithm, upon receiving notice from the RQ Synchronization Algorithm that RQ Synchronization has been established, establishes Uplink Synchronization at the first instant that an adequate set of IR Transmit Times can be recorded. In the case that the RQ Insertion Algorithm determines that the CPE has fallen out of Uplink Synchronization (it not necessarily being the case that it has also fallen out of RQ Synchronization), it immediately proceeds to establish Uplink Synchronization.

The RQUM Top Time of the Sync RQUM, along with other information available to the RQ Insertion Algorithm at a CPE, is used as a means to establish Uplink Synchronization for the CPE.

Upstream intervals are contiguous, and the interval length value of each IR in RQ is used, at a CPE, along with the Sync RQUM Top Time, as a means to determine the IR Transmit Times for every IR in the RQ, and thereby to establish Uplink Synchronization for the CPE. For the sake of clarity, the RQUM Top Time is the transmit time for a message rather than an interval, such time possibly not being coincident with the start-time for the associated interval in the case where the interval is larger than the message. In such a case a variant of known practice of art, claimed when integrated herewith, is for the RQ Insertion Algorithm at the HCC to establish and maintain the Transmit Time for each and every message, measured at the HCC, such that each message is transmitted in the center of the associated interval. When such a Transmit Time is taken as the RQUM Top Time, and thereby used by the CPE RQ Insertion Algorithm to compute the IR Transmit Time for the corresponding message; then computation of Transmit Times causes each of said Transmit Times to place the associated message in the center of their associated interval, within the uncertainty of the Local System Clock and the CPE Offset.

The IR Transmit Times for all IRs in an RQ are re-computed after the arrival of an RQUM, or information of equivalent functionality, and the placement of the IRs that it carries. The re-computation starts with the IR Transmit Time at the top of RQ and proceeding, using the interval length value for each IR to determine the next IR Transmit Time, sequentially through RQ. If the insertion algorithm is FIFO, only new IR Transmit Times need be computed and entered in a Synchronized CPE and in the HCC, starting with the IR Transmit of the last old IR in RQ.

An embodiment that maintains IR Ages and also has a Maximum IR Age in such variant the RQ Insertion Algorithm, immediately after placing a set of new IRs in RQ (the set being taken from a newly arrived RQUM), and given that the terminal is in Uplink Synchronization, and immediately after updating the IR Age for each IR of the RQ, eliminates all IR from the RQ whose IR Ages are greater than the Maximum IR Age; the actions to be affected at the time coordinated between the HCC and CPEs (FIG. 8).

A parameter of an embodiment is defined and known in the HCC and all CPE, such parameter being called the Maximum RQ Delay; the variant being that immediately after placing a set of new IRs in RQ any IR is discarded from RQ whose IR Transmit Time is further in the future than Maximum RQ Delay; the action to be affected at the time coordinated between the HCC and CPEs as shown in FIG. 8, and given that the terminal is in Uplink Synchronization.

The RQ Insertion Algorithm determines the Transmit Time of an IR using an RQUM Top Time, such time then being compared with the Transmit Time as computed internally using interval length values and a previous RQUM Top Time; and if there is a substantive difference in these two times, the RQ Insertion Algorithm declares the CPE not in Uplink Synchronization, and, therefore, out of Synchronization. Upon initially obtaining the conditions for Uplink Synchronization, the RQ Insertion Algorithm confirms that the terminal has synchronization by comparing one or more than one RQUM Top Time with internally computed values based on an earlier RQUM Top Time, and only when such process confirms synchronization does the RQ Insertion Algorithm declare the CPE to have acquired or obtained Uplink Synchronization.

For establishing with the HCC the presence of a CPE and providing the CPE with information allowing it to participate in the Network, Registration of the CPE is called. As a part of Registration, a CPE Offset is determined, the CPE Offset being the propagation time on the downlink (and on the uplink, if different) between the CPE and the HCC. A Bootstrap CPE Offset is used to time transmission of the CPE to the HCC for the purpose of Registration; the Bootstrap Offset being a permanent database element that is an estimate of the CPE Offset. Clock Synchronization, Downlink Synchronization, and RQ-Synchronization is achieved by the CPE before initiating Registration.

The HCC has included in its database a list of CPEs who are candidate for Registration. From time-to-time the HCC, by known methods, polls certain of these Unregistered CPEs using control message or control messages, in order to give them an opportunity to Register. The HCC requests an interval on the uplink to be used by a CPE, or set of CPEs, to initiate Registration.

Registration is initiated by a CPE by the means of transmitting an uplink control message called the registration message (REGM). The interval or slot set aside for the REGM, called the registration interval (REGI), in said variant is to include Guard Space of adequate time span to allow a CPE to transmit a REGM into the REGI without having the knowledge of CPE Offset, but with knowledge of a Bootstrap CPE Offset. For the sake of clarity, a CPE must obtain Clock Synchronization, Downlink Synchronization, and RQ Synchronization prior to receiving and acting on an IR that assigns it a REGI. For the sake of clarity, in this variant Guard Space is included in REGI that allows for enough time uncertainty such that the CPE can transmit from the minimum (early in the interval) to the maximum (late in the interval) limits of the pre-defined range without its message overlapping into adjacent intervals.

The embodiment of the system acts with symbol boundary alignment from message-to-message in all uplink intervals except in the REGIs. The HCC acquires REGMs in REGIs. However, in this extension, the HCC also maintains knowledge needed to return to the symbol boundary alignment previously established in order to acquire messages following a REGM. The HCC includes an associated interval or slot with the REGI, in which interval or slot a separate CPE (already Registered) is commanded to send a control message containing an acquisition sequence, thereby allowing the HCC to timely re-acquire the uplink, after acquiring an REGM.

The HCC does not know or does not poll CPEs who are candidate for Registration, such variant being that the HCC requests REGIs from time-to-time without designating the users, and REGMs are sent in these intervals by CPEs who thereby attempt to initiate Registration. Contention is allowed, and managed by the CPEs, in accordance with known contention management techniques. The HCC determines the CPE Offset by means of the time of arrival of its REGM within the REGI, such CPE Offset being provided to the CPE in an ensuing control message.

The HCC aids each CPE in the maintenance of an accurate CPE Offset, by from time-to-time providing information to each CPE that is used as a basis for correcting or updating the CPE Offset; the information provided by means of a control message or a field of a control message; the information being gathered based on the early or late arrival of messages from said CPE.

The CPE Offset, or equivalent, is provided to a CPE before Registration as a known piece of data in the CPE database. In the preferred embodiment, the CPE Offset of the HCC is zero.

For creation of IRs at the CPE, and IRMs as shown in FIG. 10, the CPE contains, at any instant, a set of messages to be transmitted. The messages are kept in one or several message Transmit Queues. The Transmission Scheduler of the CPE, or equivalent functionality in the CPE, references the messages as each arrives in a message transmit queue, and forms for each an Associated IR, which it places in a database, this database called the Local IR Pool.

As shown in FIG. 10, IRs are distributed from a Local IR Pool to the distributed RQs. The Transmission Scheduler, or functionally equivalent, in a Synchronized CPE timely selects, from the Local IR Pool, an IR (FIG. 6) to be transmitted. The method of selection is in accordance with any suitable algorithm. The Transmission Scheduler algorithm may be employed to select an IR for transmission, and determines the order of IR selection for transmission based on characteristics of the IR, possibly including the time that the IR was created or that the associated message arrived. The Transmission Scheduler, or functional equivalent, creates an IRM (FIG. 6) to carry the selected IR, and places this IRM in a message transmit queue.

The Transmission Scheduler, or equivalent, in a Synchronized CPE, manages the transmission of IRMs. An IR that is actively in the process of being sent to the distributed control system, but not yet in RQ is said to be in an IR Distribution Process, or alternatively in IR Distribution; such process consisting of one or more attempts to transmit the IRM to the HCC from its originating CPE, using Aloha slots, and the forwarding of the Associated IR in an RQUM to all CPEs from the HCC. The Transmission Scheduler of a Synchronized CPE takes an IRM from the top of a message transmit queue as soon as possible after it appears and thereby puts the Associated IR into IR Distribution. For the sake of clarity, the Transmission Scheduler may distribute IRs one at a time—assuring that the distribution of one IR is completed before the distribution of another IR starts, or may be able to support several IRs in IR Distribution at the same time, depending on the specific embodiment of the disclosed method. The Transmission Scheduler may delay putting an IR into Distribution in consideration of traffic management requirements.

At the initiation of the IR Distribution Process for an IR, the Transmission Scheduler schedules and causes to be transmitted the Associated IRM, the schedule and transmission to be in an Aloha slot selected by means of the IRSF. The Transmission Scheduler then holds the IRM in a database called the IRM Holding Pen for possible re-transmission. If re-transmission is required as determined by the Transmission Scheduler. The IRM is scheduled and re-transmitted in an Aloha slot selected by means of the IRSF, and the IRM is placed back into the IRM Holding Pen for a possible further re-transmission as above. If re-transmission is not required, the Transmission Scheduler removes the IRM or places it in some archival database not essential to the disclosed method. For the sake of clarity the IRM Holding Pen can contain more than one IRM in some embodiments of the disclosed method.

The Transmit Scheduler modifies, in RQ, the IR start-time associated with the ASBI selected for transmission of an IRM, such modification to reflect the IRM's particular slot position in the ASBIAfter a number of IRM retransmission attempts, such number called the Retransmission Limit (RLIM), the Transmission Scheduler removes the IRM from the IRM Holding Pen, thereby removing its Associate IR from IR Distribution, such action possibly including notifying the interested application in the local CPE of a failure to schedule the IR. The RLIM is established by any of the following means: (1) being a fixed parameter in the CPE Control System; (2) being a function of the traffic pattern on the Network; (3) being a function of the values carried in the IR, (4) being assigned from time-to-time by the HCC, or (5) other means, or any combination of these. The Transmission Scheduler may give priority to retransmitted IRMs over IRMs for fresh or new messages. Different types of ASBIs are used for re-transmission of IRMs.

Multiple IRs are in Distribution and their Associated IRMs are in the same IRM Holding Pen during the same time period, said IRMs possibly being associated with the top messages of several queues or with multiple messages in one queue or a combination thereof, and, further; in said extension a means is provided to distinguish without possible ambiguity, by means of the contents of the IR, the associated message for that IR. A counter, called the IR Counter, is included in the Other Control Information field of the IR (FIG. 6), such IR Counter to contain a value incremented (modularly, in a circular method, as determined by field size) from that of the IR Counter value of the previous IR formed in the same CPE. For the sake of clarity, the purpose is to provide a means for a CPE to have multiple IRs in Distribution in the system 10 at one time, and to easily and surely avoid confusion as to which associated message is attached to a specific IR in RQ. The system 10 allows high-priority mMessages to move ahead of lower-priority message during the IR Distribution Process.

The HCC can create an IR to be used in requesting an upstream interval, such request to be placed in a downstream RQUM along with IRs from CPEs, said interval to be used by a designated CPE or CPEs (in the case that it has slots) to transmit a certain message or message type, as these are designated by means of the Address, application ID and Type or Priority fields of the IR. Such arrangement requires pre-arranged, cooperative, or associated, means and methods on the part of an SPCS and/or BSDP control applications to be of practical value. For the sake of clarity, this method provides the means for polling by the HCC of designated CPEs. The HCC can form an IR based on the control action (i.e. "request") of an SPCS. A means within the disclosed method polls the related CPE SIMS for services. The HCC can form an IRM to request an interval that is meant to support contending transmission attempts.

As CPE can form an IRM to request an interval to be used by another CPE to transmit a certain message or message type, as designated by the application ID and Type or Priority fields of the IR (FIG. 6), such arrangement requiring pre-arranged, cooperative, or associated, means and methods on the part of an SPCS and/or BSDP control applications to have practical value. A CPE can form an IRM to request an interval that is meant to support contending transmission attempts.

A CPE or the HCC can form an IRM to request an interval with slots, such set of slots to be used by a set of CPEs, which may or may not include a requesting CPE, to transmit messages, the arrangement of which requiring cooperative or associated means and methods on the part of an SPCS and/or BSDP control applications to be a capability with practical value. A CPE can form an IRM to request an interval with slots that is meant to support contending transmission attempts. For the sake of clarity, it is noted that the structure of this extension and/or variant can be useful in achieving a desired average interval length in an environment of small messages.

The Transmission Scheduler of a CPE schedules (also called to select) an Aloha slot for transmission of an IRM. Each CPE makes the selection of the Aloha slot in which to transmit an IRM without knowledge of whether one or more other CPE have selected the same Aloha slot for transmission. Thus, IRM transmissions from different CPE units may collide (also called to contend) and be lost to the intended receiver—the HCC.

The selection of an Aloha slot is by means of an interval request spreading function (IRSF). The IRSF, operating in cooperation with the SACF, maintains to within a range of values, the probability of collision of IR transmissions in any given Aloha slot, such range of probabilities set by the embodiment designers to satisfy specified performance requirements of the BSDP method in the embodiment; the method used to maintain such probability being by known methods, which when integrated with the system 10.

The IRSF makes its slot selection with different and random results from one attempt to another under the same circumstances, whether such selection is made by IRSF embodiments in different CPE, or the selection is made by the same IRSF embodiment in a single CPE acting at different times; to wit the random selection process of the IRSF for an Aloha slot has as a fundamental element of its method for scheduling an Aloha slot, the sampling of a probability distribution, with an algorithm of known art, such sampling that arrives at independent and un-correlated results (to a practically significant degree) between any two samplings.

The Aloha slot selected for an IRM transmission is randomly chosen (with uniform distribution) within the next-available ASBI. The Aloha slot is selected from a contiguous set off Aloha slots spanning some number of the ASBIs (such set possibly spanning part of one ABI or a part of several ASBIs) in a random way in accordance with a given probability distribution. The contiguous set of candidate Aloha slots starts with the next-available slot. The span of Aloha slots that are candidate for an IRM retransmission is a function of the number of previous retransmissions of that IRM. For the sake of clarity, this extension includes the exponential back-off algorithm used for Ethernet.

Each transmission of an IRM, as executed by the Transmission Scheduler, includes the first transmission of an IRM. For the sake of clarity, it is noted that it is possible that one or more CPEs transmit an IRM into one Aloha slot, resulting in a collision of signals, also called Contention. Contention is explicitly allowed in the system algorithm and is resolved by the re-transmission means of the system 10.

A CPE Transmission Scheduler determines that an IRM that it has caused to be transmitted has suffered Contention or other impairment effects that have prevented it from being successfully received by the HCC; such determination by means of monitoring RQUMs on the downlink, or data of equivalent functionality, and determining that the Associated IR has not been included in an RQUM in a given and limited time period, called herein the IRM Retransmission Delay. The IRM Retransmission Delay value is a fixed parameter for an embodiment of the disclosed method; such value is determined by an embodiment designer to allow for headend processing and propagation delays. If an IR transmitted by the CPE does not appear in an RQUM within the IRM Retransmission Delay period, then the CPE designates the Associated IRM transmission as a Failed IRM Transmission.

In the case of a Failed IRM Transmission from a CPE, the Transmission Scheduler performs to either retransmit the IRM or to remove it from the IRM Holding Pen.

HCC processing errors or delays, or RQUM errors, can cause more than one copy of an IR to be offered for placement in RQ. The circumstance may be caused because a CPE was successful in transmitting a given IRM more than one time, such circumstance arising because said CPE was not successful in finding the Associated IR on the downlink within the IRM Retransmission Delay period; said multiple versions of IRs that arrive at the HCC are called herein Duplicate IRs. Duplicate IRs are forwarded on RQUMs and entered into the RQ. For the sake of clarity, Duplicate IRs in RQ do not cause lost or misdirected messages. These can cause, at worst, a wasted interval.

The detection of Duplicate IRs is by means of the IR Counter of claim 28(f); said detection providing the means for the RQ Manager to remove Duplicate IRs from Distribution. The detection of Duplicate IRs is by means of the IR Counter. The RQ Insertion Algorithm does not enter Duplicate IRs into RQ.

The unique use of the Aloha slot supply algorithm (ASSA) control application may be located in the HCC and may generate interval requests for ASBIs. The requests are distinguished by a unique Type and Priority field or equivalent. The ASSA generates ASBIs of a fixed size (i.e. fixed number of fixed size Aloha slots) and at a fixed interval rate, such size and rate determined to assure that the Network associated with the disclosed method embodiment operates at the Operating Point for the embodiment.

The number of slots in an ASBI is also selected in consideration of the span of slots required in one ASBI for successful operation of the IRSF algorithm. The ASSA creates different types of ASBIs for different types of requests, Examples are: repeat requests, requests for different types of messages, and requests of different priority. The ASSA sets different lengths of Aloha slots for different types of requests. The ASSA varies the rate of requests for ASBIs, and varies the number of slots in ASBIs. The ASSA creates and adapts ASBIs in real time using suitable methods in order to react to changing traffic patterns and service needs by adjusting the Operating Point.

Slotted Aloha Mathematical Model

In the Slotted Aloha mathematical model N sources send messages on a probabilistic basis. Everyone transmits into the same channel. The channel is organized into "slots," i.e. time periods of fixed size, and a message is exactly the same size as the slot. Messages are transmitted in synchronized fashion to just fit into a single slot. The decision made at one source to transmit a message is independent of the decision made at other sources. Thus, several sources may choose to transmit into the same slot, thereby contending for the slot and destroying each other's signal. In the mathematical model each source chooses to transmit into each and every slot with probability p.

This approach applies to the sequence of Aloha slots that flow on the uplink in ASBIs. Herein the Aloha slots are sized to carry request messages called IRMs. In the use of this method herein, once a terminal transmits a message, it waits to learn if the message has been received. If the message has not been received, the terminal assumes that the message was lost to Contention, and retransmits the message. This changes the probability that it will transmit into a slot. An IRSF algorithm may be used in the patent to randomize the choice of a Aloha slot for the CPE both in its first attempt and in following attempts, thereby bringing the message transmission pattern of the terminal back towards the theoretical model.

In this system and method, the sources are CPEs transmitting IRMs on the uplink. The disclosed method anticipates that N is typically a large number. In the preferred embodiment, N will be thousands of CPEs. The method may be used for any N, but for the performance analysis to apply, N should be 10 or greater.

The performance of the Slotted Aloha model is evaluated as follows:

Every source has the same probability, p, of trying to send a message in a particular slot. The probability that a single source sends a message successfully in a slot is $p(1-p)^{N-1}$, and the probability that any of the N sources sends a successful message is:

$$E(p,N)=pN(1-p)^{N-1} \quad \text{(Equation 1)}$$

E(p,N) is called the efficiency of the Slotted Aloha method. It is easily shown that the value of p, p*, which gives the highest probability of success is:

$$p^*=1/N$$

$$E(p^*,N)=(1-1/N)^{N-1}$$

Figure 11:
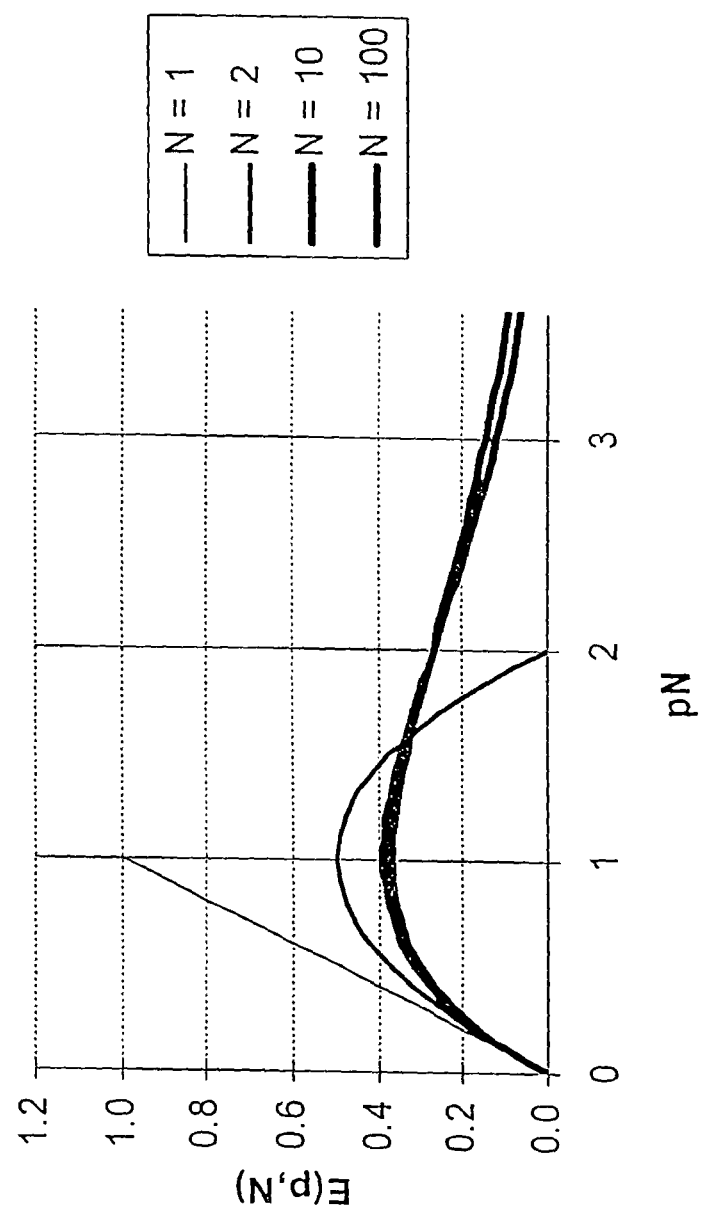

FIG. 11 shows the value of efficiency with Np as the independent variable, and N as a parameter.

For a large number of sources, like BSPD, it is seen:

$$E(p^*) = \lim_{N \to \infty} E(p^*, N) = \lim_{N \to \infty} (1 - 1/N)^{N-1} = 1/e_{N \to \infty} \quad \text{(Equation 2)}$$

This value is approached very quickly with increasing N as can be seen in FIG. 11.

This important result shows that the efficiency does not go to zero, as the number of users gets large. Rather it stabilizes at a throughput rate determined by Np, but which can be a little better than ⅓.

The expected number of attempts by a single source is computed. Denote the probability that a message transmission is successful, given that it is transmitted, as $P_s$, $$P_S = (1-p)^{N-1} \qquad \text{(Equation 3)}$$

With maximum efficiency and large N, $$P_s^* = \lim(1-p^*)^{N-1} = E(p^*) = 1/e$$

Letting ν be the number of attempts that it takes to achieve a success (including the successful attempt)

$$E(v) = P_s + 2P_s(1-P_s) + 3P_s(1-P_s)^2 + \ldots = 1/P_s$$

$$E(v) = 1/(1-p)^{N-1} \qquad \text{(Equation 4)}$$

For $P_s = P_s^*$, we have the result, $$E(v^*) = e$$

The variance in the number of attempts is computed:

$$\sigma_v^2 = (1-E(v))^2 P_s + (2-E(v))^2 P_s(1-P_s) + (3-E(v))^2 P_s(1-P_s)^2$$

$$\sigma_v^2 = P_s + 4P_s(1-P_s) + 9P_s(1-P_s)^2 + \ldots - 2E(v)P_s - 4E(v)P_s(1-P_s) -$$

$$6E(v)P_s(1-P_s)^2 - \ldots + E(v)^2 P_s + E(v)^2 P_s(1-P_s) + E(v)^2 P_s(1-P_s)^2$$

Noting that $E(v) = 1/P_s$, $$\sigma_v^2 = P_s/(1-P_s) * [(1-P_s) + 4(1-P_s)^2 + 9(1-P_s)^3 + \ldots ] -$$

$$2 * [1 + 2(1-P_s) + 3(1-P_s)^2 - \ldots ] +$$

$$1/P_s * [1 + (1-P_s) + (1-P_s)^2 + \ldots ]$$

$$\sigma_v^2 = P_s/(1-P_s) * (1-P_s)(1+1-P_s)/P_s^3 - 2*1/P_s^2 + 1/P_s * 1/P_s$$

$$\sigma_v^2 = (2-P_s)/P_s^2 - 2/P_s^2 + 1/P_s^2$$

$$\sigma_v^2 = (1-P_s)/P_s^2$$

For the optimum efficiency case, $$\sigma_{v^*}^2 = e(e-1)$$

Giving deviation $$\sigma_{v^*} = \sqrt{e(e-1)}$$

Applicability of the Slotted Aloha Technique

In the disclosed method, the average time between Aloha slots over a long period is denoted by ξ. Thus, the Aloha-slot rate is 1/ξ that these slots come in bursts in ASBIs. So, we are averaging over many ASBIs in contemplating the average rate.

The parameter λ denotes the average time between the start of intervals on the uplink. The uplink is assumed full in the analysis. This is the worst case.

The rate of intervals on the uplink is 1/λ. Upstreams carry the following types of intervals: (1) intervals requested by CPEs; and (2) intervals requested by the HCC, including ASBIs. There is one IRM that successfully reaches the HCC from the CPE for each interval requested of type (1). There is no IRM associated with intervals of type (2). The intervals of type (2) are rare on the uplink. Thus, herewith we approximate for the analysis:

The rate of upstream intervals requested by CPEs=1/λ    (Equation 1)

The BSDP method quickly reaches a steady-state condition (i.e. the average depth of RQ is constant—see Attachment 3). In this steady-state condition the average time between successful IRM transmissions in Aloha slots is equal to the average time between message transmissions on the uplink, λ, with the approximation of Equation 1. [The overhead associated with Class (2) intervals can simply be deducted from the information capacity available on the channel to make this approximation exact. However, the loading due to HCC requested control messages is embodiment-specific. So, the approximation approach is taken in this analysis.] 1/λ is therefore the rate at which IRMs are successfully transmitted on the channel. This will be called message rate henceforward, and we will refer to "messages" for the sake of convenience.

As noted above, we have the efficiency of IRM transmission: In a time period T, large with respect to the IRM transmission rate, there will be T/λ, IRMs transmitted successfully. In the same time span, there are T/ξ slots.

$$T/\lambda = E(p,N)T/\xi \qquad \text{(Equation 2)}$$

Where p is the probability that any one terminal (CPE) will transmit into a slot and N is the number of terminals.

E is the portion of slots that are successfully used to transmit requests. To reform:

$$E(p,N) = \xi/\lambda, \qquad \text{(Equation 3—Aloha Efficiency)}$$

This equation is immutable. Note from Attachment 1, ξ/λ=N The efficiency curve is introduced in Attachment 1 and shown in FIG. 12, for large N. This curve gives the performance of the system request method. As can be seen from the curve, over half the slots do not carry successful transmissions. These surplus slots either are empty or carry contending transmissions. It is to be noted that when p=0, all slots are empty, and when p=1, all slots are full with contending transmissions. The efficiency and message rate is 0 in either case. (The function E(p,N) has finite span.)

For maximum efficiency, we have pN=1, or ξ=λE.(1)=λ/e=0.36*λ. At this operating point there are 2.718 times as many request slots as messages.

The Parameter Np In Terms of BSDP Parameters

It can be shown that Np can be considered a single parameter and how this parameter relates to the message and slot rates of the disclosed method.

In Equations 1 and 4 of the mathematical model, the efficiency and expected number of requests are given in terms of p:

$$E(p,N) = Np(1-p)^{N-1}$$

$$E(v) = 1/(1-p)^{N-1}$$

For large N, the geometric term is approximated, by an exponential. It is seen that Np is a parameter in the key expressions, $$E(p,N) = Npe^{-Np}, \; N \text{ large} \qquad \text{(Equation 4)}$$

$$E(v) = e^{Np}, \; N \text{ large} \qquad \text{(Equation 4)}$$

The expressions collectively are referred to as Equation 4.

Figure 13:
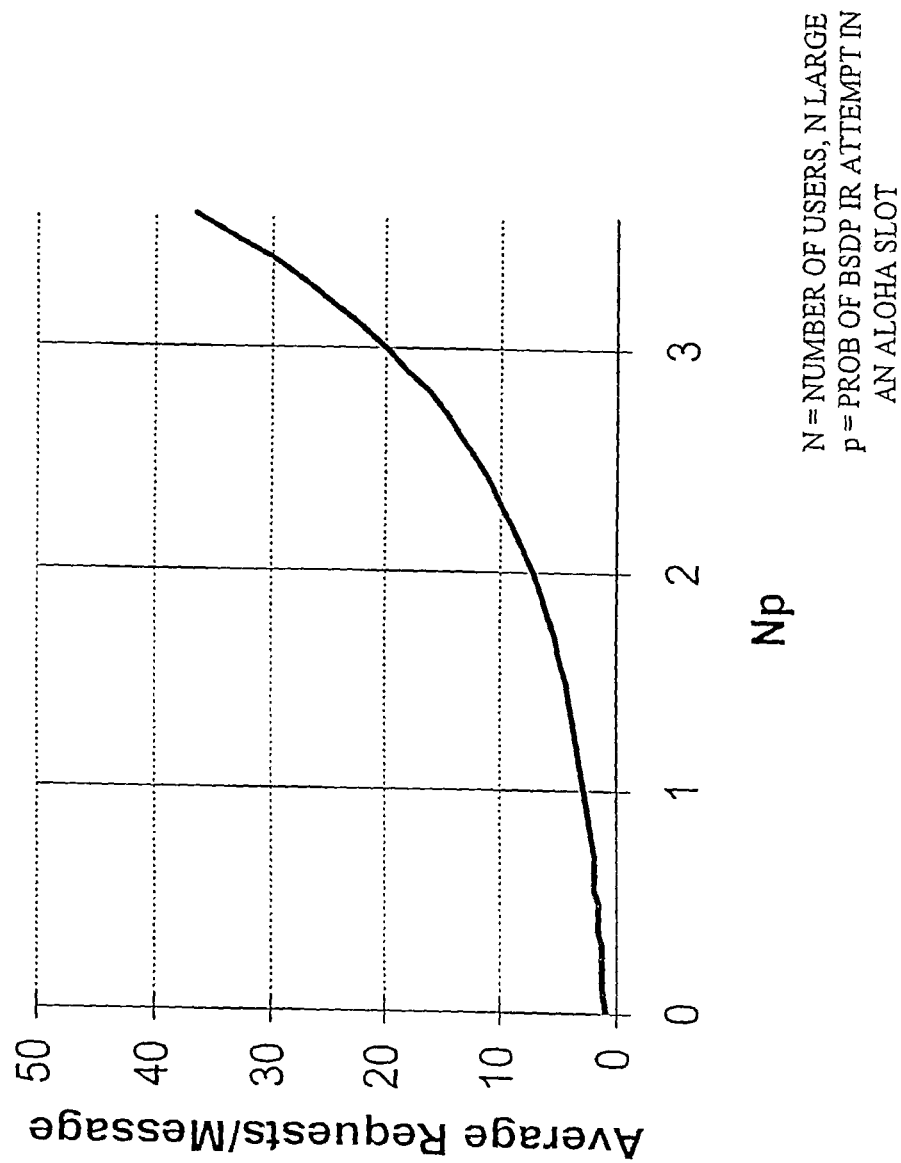

Annotation for E(p,N) is simplified to E(Np), for large N (larger than 10). This is the applicable expression for the disclosed method. FIG. 13 presents the expected IRM transmissions/message in terms of Np.

Np is the probability that some terminal will transmit into a given slot. With the BSDP method of repeated attempts, we have:

$$Np = E(v)\xi/\lambda, \qquad \text{(Equation 5)}$$

This a statement from first-principles, but can also be confirmed combining Attachment 1, Equations 1 and 4, and Equation 3 from here above. From first principles: $E(v)/\lambda$ is the IRM transmission rate (when measured over a long span of time). The ratio of transmissions to slot rate gives the probability that a slot will receive a transmission (assuming totally random selection of slots). Ergo, Equation 5.

No Lost Messages

A preferred embodiment of system 10 repeats IRM transmissions until successful (FIG. 10). The analysis here assumes re-transmission of requests until success. Other variants drop IRM transmissions after a number of attempts. These other variants only lighten the loading (i.e. lowering p) on the request subsystem of the disclosed method, making this analysis herein conservative. Here we address the question: Will an IRM always get through if repeats continue forever? ("Always" means with probability equal to 1.)

The maximum expected delay for the Slotted Aloha method is $e^N$. Of course, N has been considered to be "very large" in the above discussion, and, therefore, the delay is effectively infinite when p=1. (Every terminal transmits into every Aloha slot.)

In a more benign case with p<1, it is shown here that the message rate, $1/\lambda$, is equal to the rate that messages are offered to the system, which will be denoted $1/\lambda_o$, i.e. messages are not lost because requests are not received. (There is a mathematical nuance in this statement. Formally messages will get lost with probability 0—which means that once in a blue moon a message does not get through.) The probability of successfully transmitting a request on one transmission is $P_s$, where $P_s=(1-p)^{N-1}$ The proof is immediate: The probability of success on repeated transmissions is:

$$P_s+P_s(1-P_s)+P_s(1-P_s)^2+\ldots=1, p<1.$$

Thus, $1/\lambda_o=1/\lambda$.

Operating Point

For any IRSF method used to schedule IRM repeat transmissions, the delay in transmitting an IRM successfully is a direct function of the number of repeats; such number being shown in FIG. 13.

The Operating Point of an embodiment of the BSDP method is the value of Np selected for its operation. Np relates to efficiency E(Np) by Equation 4, and E(Np) related to the tangible controllable factors (i.e. Operating Parameters) $1/\lambda$, and $1/\xi$ by Equations 3 and 4.

$$Npe^{-Np}=\xi/\lambda, \quad \text{(Equation 6)}$$

Thus, by controlling the message rate and the slot rate, we determine the operating point of a MAC embodiment using the disclosed method. This is the key to the successful and efficient functioning of the system request method. For the sake of clarity, $1/\lambda$ and $1/\xi$ cannot be selected arbitrarily. Available channel capacity obviously influences the choice, but the ratio can be maintained with any channel capacity. The effective functioning of the RQ structure requires a careful selection of message rate and message length (this is interval Length in the disclosed method), which also limits and influences the relationship. From the point of view of the request part of the disclosed method the factor that is controllable in an embodiment is the rate of transmission of Aloha slots ($1/\xi$). This can be made a function of time or traffic patterns on the Network.

It is to be noted that the behavior of the request methodology only depends on the average or statistical behavior of the key parameters. Message rate and slot rate can and will be above and below the average value for these parameters over any period measured. However, as the period of measurement gets arbitrarily large, these values must approach the Operating Point values for the disclosed method to be practically applied. The amount of variation tolerated by a particular embodiment depends explicitly on the size limit on the IR Pools in the HCC and CPEs and on the size limit of RQ specified for that embodiment.

Regulation of the message rate on the uplink is accomplished primarily by the SACF in the SIMs. In the disclosed method the Transmission Schedulers provides a barrier inside of the disclosed method to assure that the SIMs honor the average message rate Operating Point parameter. In the preferred embodiment, the message rate operating parameter is constant, on the average, i.e. the system does not adapt the Operating Point by varying the message rate parameter in the regulating mechanisms here designated.

Regulation of the slot rate is an internal system function. The ASSA controls the slot rate of the disclosed method. In the preferred embodiment, the ASSA provides a constant slot rate to the network.

Figure 12:
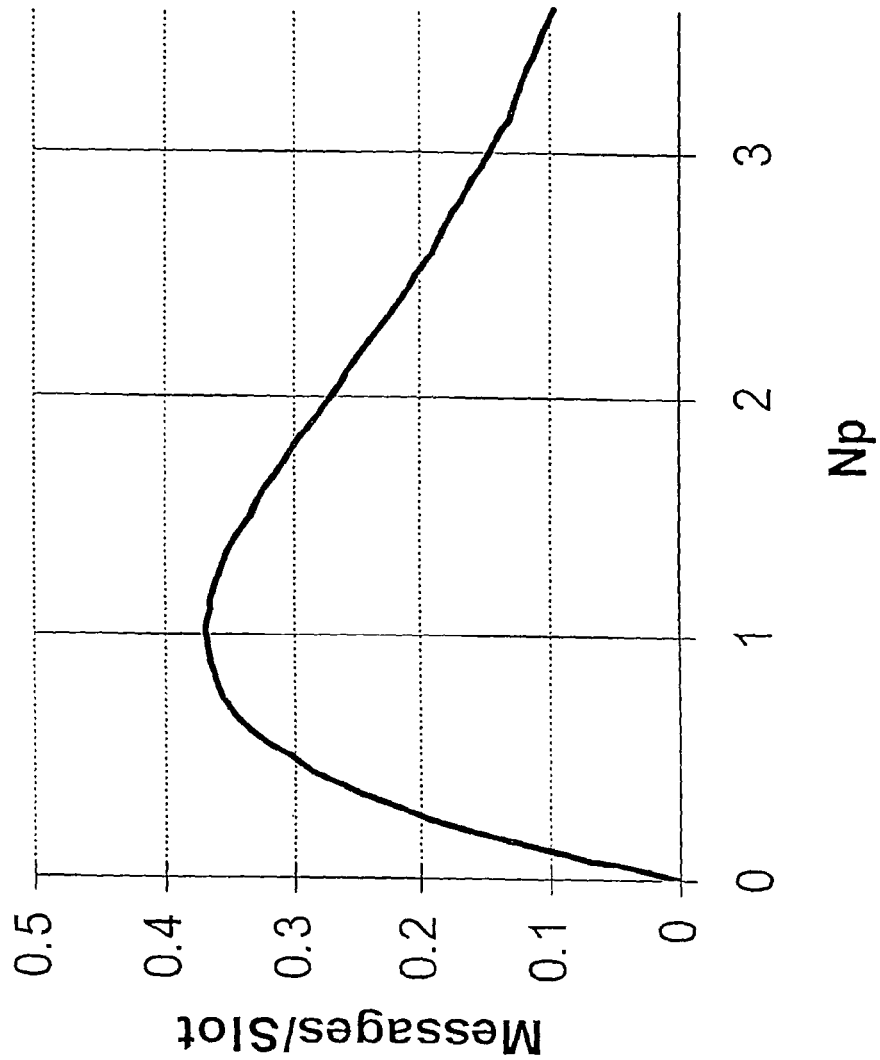

Equation 4 indicates that efficiency goes down and delay goes up when Np gets above 1 (FIGS. 12 and 13). Thus, the region of choice for the Operating Point, in a practical system is between 0 and 1—the Operating Region. (There is always a better point to the left of 1 for any point considered to the right of 1.)

Figure 14:
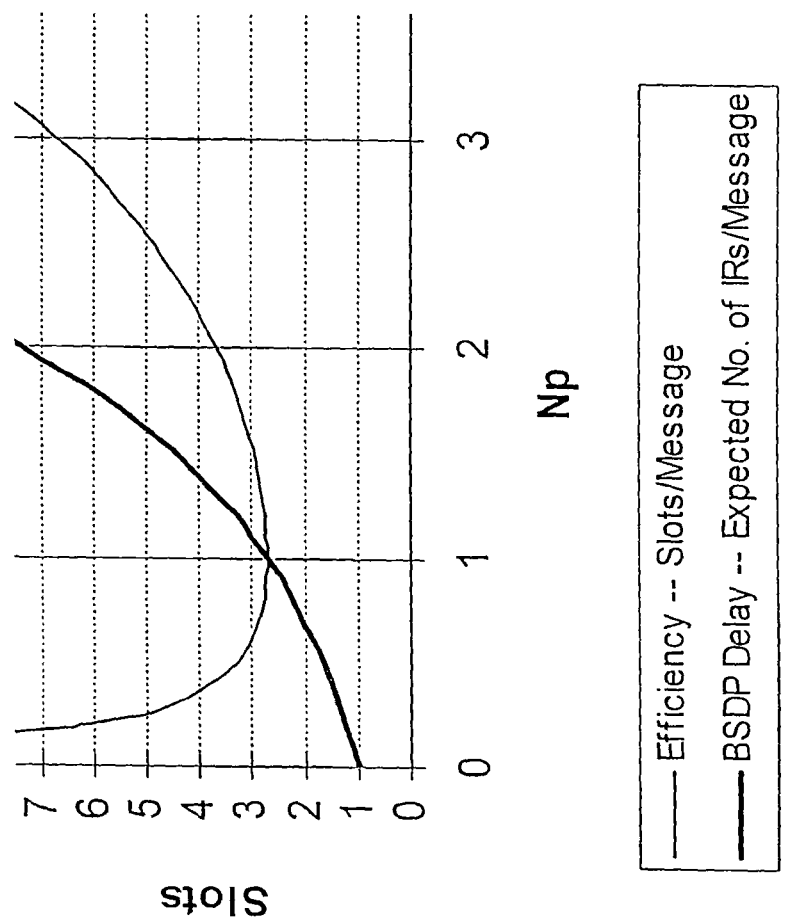

The exact most favorable operating point depends on the relative importance of delay and efficiency of slot use. FIG. 14 presents the information of FIGS. 12 and 13 on a single graph that highlights the appropriate range of operation for the disclosed method. The Efficiency is presented inverse to normal in this Figure; It is in terms of the number of slots required for a single successful IRM transmission.

In the disclosed method, the Operating Point and other parameters are picked for a system operating at full capacity. It can do no better. However, the effects of a drop in loading must be examined to assure the stability of the method. When operating in the Operating Region, the effect of a decrease in the message rate $1/\lambda$, with a constant slot rate $1/\xi$, is to move Np to the left as can be seen by Equation 6 (also Equation 3 with FIG. 12) (p moves because N is fixed). In this case more slots are empty so slot use efficiency decreases, but IRMs get through faster—delay decreases. The method's performance improves for those messages being serviced. In fact, the ASSA may be designed to increase slot rate, by requesting larger ASBIs, when space becomes available under these circumstances, thereby moving p even more to the left and getting still faster response time.

The system request method affects quality of service (QOS) in two ways:

Dropped messages

Delay in message transmission

The disclosed method can be embodied in a way so as to drop IRMs after a certain number of attempted transmissions, thereby causing the associated message to be canceled. For the sake of clarity such a "drop" can be known by the appropriate service application, which can resubmit the message for transmission. However dropping messages is not inherent in the method. As can be seen in the discussion of Section 2-3, the preferred embodiment assures that every message that gets into the Network is transmitted with probability 1. Only events with extremely small probability such as RQ overflow can cause a request to be lost once the IR Distribution process has begun.

In order to maintain a given QOS, the SACF must regulate the presentation of messages to the disclosed method, and the means that the SACF in an SCPC or SIM takes to do this may include dropping messages. Thus, although there is no dropping of messages inherent in the disclosed method, there may be an indirect effect of dropped messages.

Delay and variable delay of messages transiting the Network are inherent effects of the BSDP method. This can impact service quality in two ways:

1) The delay through a network is foreseen to be several tens of milliseconds in typical embodiments of the disclosed method. In most applications, this delay has no quality-of-service impact, the exception possibly being with real-time game interactions. Turn-around time for real-time interactive services, such as phone conversations, is double the one-way delay, which may typically be a few tens of milliseconds.

2) In a stream of related data messages the variations in Network transit time can create jerkiness in service presentation if not adequately buffered. However, buffering to smooth data flow adds delay. Examples of the impact of jitter without adequate buffering are picture freezes in video, or sound clicks in audio.

Message delay and jitter may have three causes: Physical delay due to propagation and processing; IR distribution delay; and RQ scheduling delay.

The physical delay in the preferred embodiments of the system is a fraction of a millisecond. Total delay and jitter is dominated by the two other factors. The request methodology of the disclosed method relates to IR distribution delay. This is considered here following.

The probability of a successful request transmission, given large N is given in Attachment 1, Equation 3, $$P_s = e^{-Np}$$

Probability of success in N tries, $S_N = P_s + Ps(1-P_s) + P_s(1-P_s)^2 + \ldots + P_s(1-P_s)^{N-1}$ $$S_N = 1 - (1-P_s)^N$$

Figure 15A:
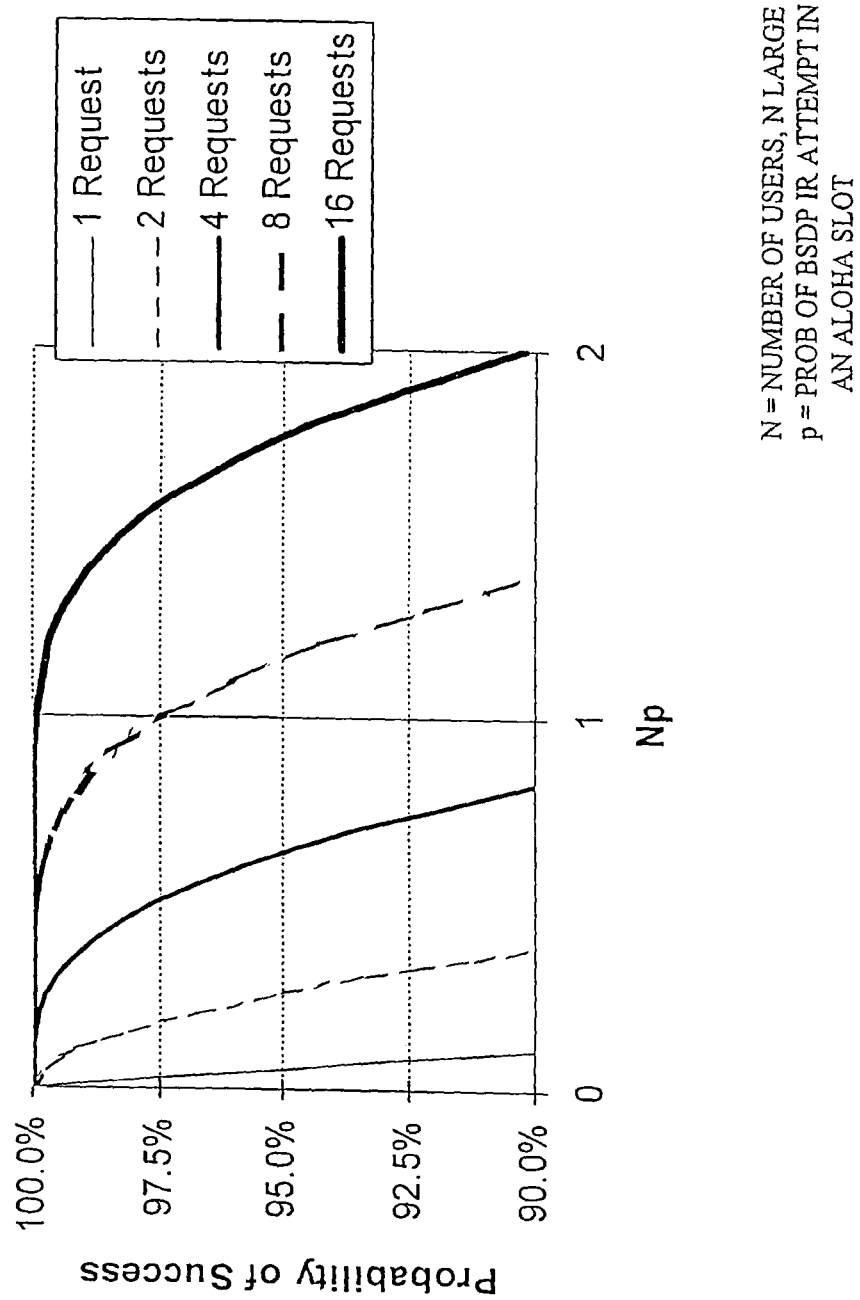
Figure 15B:
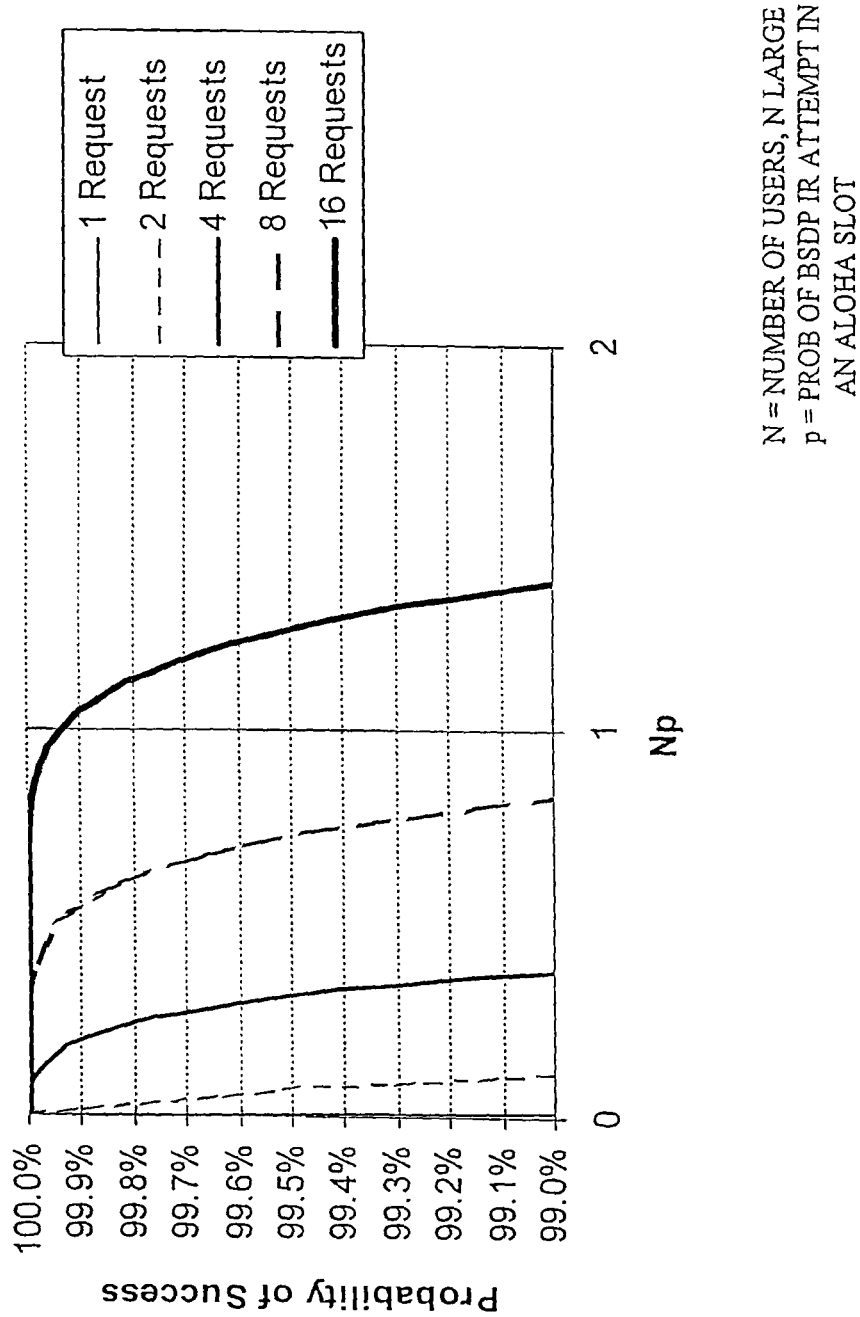

FIGS. 15A and 15B present plots of this equation, giving the probability of successful request transmission as a function of the number of attempts N. The same data is provided in two resolutions in FIG. 15A and FIG. 15B. The time delay associated with the disclosed method depends first, on the expected number of attempts as presented in the Figures, and second on the time between attempts—i.e. on how slots are selected for repeat request transmissions by the IRSF function. FIG. 16 provides important Operating Points of interest regarding telephony and other delay-sensitive services.

System Embodiment Example

In an example of a system embodiment, a re-request is attempted each time an ASBI is offered. A significant fixed number of Aloha slots per ASBI is provided so as to assure that there are enough slots per interval so that "randomization" by the IRSF of the re-request slot is effective. The example Network serves an average of about 2000 messages per second (messages requested on the uplink). The example Network's function is to support a telephone service with 64 kbps VoIP. In consideration of the trade-offs apparent in FIG. 16, the service is designed for 99% packet throughput with a packet being dropped after 4 failed IR transmission attempts. These two considerations lead to an Operating Point selection of Np~0.4. From FIG. 14, it is seen that there are, on average, approximately 1.5 IRM transmissions per successful transmission at the Operating Point.

From Equation 6, the slot rate is 3.7296 times the message rate, giving 7459 Aloha slots per second. In the example Network, the maximum time specified for the request portion of a message delay cycle is 40 milliseconds. Providing one ASBI every 10 milliseconds surpasses this requirement. Thus, there are approximately 75 slots per interval. (There are approximately 20 new requests and 10 repeat requests per ASBI, and approximately 20 of these 30 transmissions are successfully transmitted.)

The capacity required for the ASBIs is under 5% of the total uplink capacity available for messages. A slot might be 1% of the average message size (a very important parameter), and the overhead is then about 3.6% for the request structure.

Consider the QOS of a VoIP circuit with a packet rate of 10 packets per second. In the example Network, a packet would be lost once every ten seconds on average. This packet loss rate represents about 1/10 of a word. Speech circuits easily cover such a loss.

The average delay through the request cycle in this example is 15 milliseconds. When added to a typical RQ delay of 20 milliseconds (see Attachment 3), this gives an expected total one-way delay of approximately 35 milliseconds, and a turn around time on the average of 70 milliseconds. This is a very satisfactory turn-around time for a voice system. The rare long delay caused by the bunching of initial requests in an interval is handled by the cut-off of repeats. Such a bunching will have the effect of one lost packet, once in several conversations. The impact of bunching does not carry for more than 3 repeats~30 milliseconds.

State Model for a Queue

Figure 17:
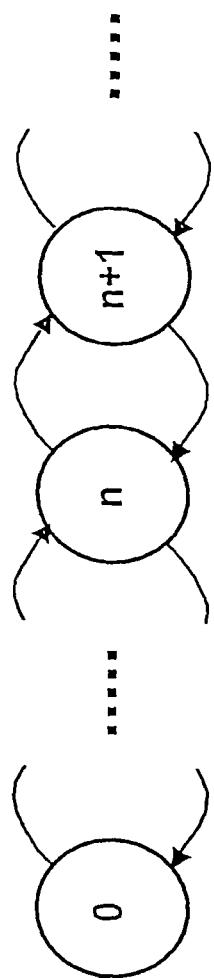

FIG. 17 gives a state diagram model of RQ. The state of the queue is defined as the number of tokens in the queue. In the BSDP method, the Request Queue "tokens" are IRs.

If the queue does not grow without bound as time goes on, it must reach a steady state where the number of tokens in it goes up and down around an average or fixed value, depending on the pattern of arrival and departure of requests. The system 10 is designed so that RQ is stable, i.e. does not grow in size without bound.

The pattern of behavior of a stable queue can obviously be quite complex. A requirement or assumption is imposed on RQ—that it has the ergodic property during the peak traffic period. This means that the arrival of requests, when averaged over all of the CPE's is quite random. (More formally, ergodicity is defined as follows: If an experiment is conducted: The first part of this experiment is to run a very large number of Networks in parallel with the same embodiment and under the same traffic loading statistics, and stop them all at the same time, resulting in the RQ states being distributed in a certain way—so many Networks will have queues of depth 0, so many with queues of depth 1, etc. The second part of the experiment is to run a single system over a long time under the same traffic loading statistics. Then the relative amount of time spent in each state for the second part of the experiment is compared with distribution of states from the first part. If proportions are the "same," the Networks behavior, or that of the underlying process affecting the traffic patterns, is said to be ergodic.)

The stable queue with random inputs has a certain probability of being in each of the states: $P_1, P_2, P_3, \ldots, P_n, P_{n+1}, \ldots$. It is important to note when considering the practical importance of this that this probability set does not depend on the characteristics of the arrival and departure processes. With the ergodic assumption, any system will, on the average be found with states occupied a fraction of the time represented by the same distribution: $P_1, P_2, P_3, \ldots, P_n, P_{n+1}, \ldots$.

The required time period for this average or random behavior to occur does depend on the input and output characteristics. "Very" random arrival with "very" random departure behavior gives very quick convergence to this occupation distribution.

If the arrivals are from different sources, and these sources follow moderately random behavior, and the queue tends to be "quite" full (more than 10 on the average), the Law of Large Number comes into effect: The behavior of the queue becomes quite independent of the details of the statistical behavior of each source, and depends mostly on the average arrival rates, and the deviation of arrivals from this average rate.

Since we can never know the statistics associated with any service in the system 10, it is necessary to run RQ with, on the average; quite a few IRs queued up. How large "quite a few" is depends on how well behaved, in a probabilistic sense, the uplink traffic loading statistics are. The practical situation is that with the large number of CPEs foreseen for applications of the disclosed method, the traffic characteristics are very well behaved.

There is a nice ameliorative effect in the case where traffic is "less random": If the CPEs are very regular in producing requests, the effect is to shorten the queue, and speed up average message throughput time. This is the pattern that occurs with streaming traffic such as voice and video.

RQ Depth

This development is a basic of queuing theory. It depends on an observation that leads immediately to "The Balance Equation." Solving the balance equation under certain input and output assumptions gives the distribution $P_1, P_2, P_3, \ldots, P_n, P_{n+1}, \ldots$. This result is used to compute the mean deviation of queue depth.

The observation depends on ergodicity. We observe time behavior. In some sufficiently long time period, $\tau$ (in seconds), the queue will exist in state i a fraction of the time equal to $P_i$.

Making the least possible assumptions about the statistics of the arrivals and departures:

$\lambda$ is the average amount of time (in seconds) between arrivals $\mu$ is the average amount of time (in seconds) to serve an arrival In BSPD terms, this means that $\lambda$ is the average amount of time between IRs arriving at RQ, and $\mu$ is the average length of an upstream interval.

We note that:

$1/\lambda$ is the average number of Requests in a second.

$1/\mu$ is the average number of services in a second.

For the queue to be stable, the average time between requests must be at least as large as the average time to service a request, $\lambda > \mu$. Rephrasing: $1/\mu - 1/\lambda$, <1.

In period $\tau$, state i is occupied $\tau P_i$, seconds. On average, the number of arrivals at the queue while i is occupied, thereby kicking the state up to i+1, is $\tau P_i/\lambda$. On the average, the number of departures (or services, or transmissions) while i is occupied, thereby kicking the state down to $i-1$, is $\tau P_i/\mu$.

The observation leading to the balance equation is that for the queue to be stable, over a long time period, the number of transitions up, must equal the number of transitions down between two adjacent states:

$$\tau P_n/\lambda = \tau P_{n+1}/\mu \qquad \text{(Equation 1—the Balance Equation)}$$

Defining $\mu/\lambda = \rho < 1$, it is easy to see $P_n = P_0 \rho^n$ and $P_0 = (1-\rho)$. The probability of occupancy of states goes down geometrically.

The expected depth of the queue is E(n):

$$E(n) = 0 \times P_0 + 1 \times P_1 + 2 \times P_2 + \ldots + n \times P_n + \ldots = \rho/(1-\rho).$$

The region of E(n) is where the queue depth is found most of the time. The slight dead or empty time implied by $\rho < 1$, is catch up or breathing-space time.

There is a characteristic of practical communications systems based on queue processing MPEG2 is the example) that the message rate of the system is slightly below the communications capacity of the system. This slight sacrifice of capacity provides flexibility resiliency and predictability of behavior for the system.

By taking advantage of this smoothing property of the distributed Request Queue, the disclosed method this allows: preparation at the CPE for message transmission with no loss of channel capacity due to set-up delay, ability to confirm scheduling synchronization before transmission of a message, no wasted channel capacity for the information associated with scheduling messages, predictable delay, and priority scheduling.

Efficiency of the System

The fact that IRs arrive randomly and are being processed through a queue, means that at some times the queue will be empty (i.e. state 0), and the link will stand idle. How often does this happen? From the Balance Equation $P_0 = (1-\rho)$ is the answer. Noting the percentage of time that the system remains empty as the overhead O, this result can be derived more intuitively: Let $\epsilon$ be the average unused time per arrival in the link: $\tau(\mu+\epsilon) = \tau\lambda$. The fraction of the time that the queue is empty, and there is no transmission is.

$$O = \epsilon/\lambda = (\lambda-\mu)/\lambda = 1-\rho$$

Relationship of Queue Depth to Efficiency

In the system 10, RQ is preferably "pretty deep" on the average so that the exact probabilistic characteristics of the incoming traffic are not too sensitive, which traffic may be somewhat fractilious. "Pretty deep" means that the queue depth may be greater than about 10.

Noting that $\rho = E(n)/[1+E(n)]$:

$$O = 1 - E(n)/[1+E(n)] = 1/[1+E(n)]$$

As the queue depth gets small, the overhead goes to 1 (the channel is empty most of the time.). Note that the queue depth is small when $\rho$ is small. In fact, the expected queue depth limits to $\rho$ for $\rho \ll 1$.

More interesting, and applicable to the system 10, when the queue depth gets large, $$O \to 1/E(n), \text{ large } E(n) \qquad \text{(Equation 2)}$$

For E(n)>10, this equation is correct to less than 1%.

So, practically speaking a embodiment that is 99% efficient has a queue depth of 100.

Deviation of the RQ

How well does RQ depth approximate E(n)? This is measured by the expected deviation of the queue depth around E(n). This means if at any instant the queue is sampled, how close is the sample depth likely to be to E(n).

Assume that E(n) is "large." By this, "large" may mean greater than 10.

The arrival time of Requests may follow a very complex probability model. However, assume that it is well behaved (or "real-world") enough to have a deviation $\sigma$, as well as a mean m. ($\sigma$ is the square root of the variance $\sigma^2$.)

As the statistical behavior of more arrivals at once—e.g. what's the behavior of 15 arrivals at a time—is considered, the underlying probability behavior becomes more and more bell-shaped, or Gaussian. In fact, the mean and variance completely define the behavior of a Gaussian random variable. So, a very tight grip on things may be achieved as soon as the behavior of groups of arrivals (such as happens with RQUM delivery of IRs) is considered.

For n arrivals, the tendency is for:

$$m_n = n\, m$$

$$\sigma_n = \sqrt{n}\,\sigma$$

Since the behavior of the Gaussian is known, we can predict the behavior of the queue may be predicted when it typically has a large number of IRs queued. This is, in fact, the smoothing effect of buffering.

At this point, one must reach to a more precise model of the underlying process to model a deviation. A reasonable model of RQ is M/M/1. This is Poisson arrivals, exponential service time (which is equivalent to message length), and a single server.

With a Poisson process, the mean and deviation of the Request process, with E(n) large, is.

$$\sigma E(n) = \sqrt{E(n)\lambda},\qquad \text{(Equation 3)}$$

For example, the nature of the Gaussian distribution tells us that 66% of the time, the queue will remain within 10% of the mean for E(n)=100.

System Performance

—The disclosed method performance depends on a set of uplink parameters, which are called the Operating Parameters:

$\Lambda_A$ is the average length, in bits, of Aloha slots in the interval
$\Lambda_M$ is the average length, in bits, of messages in the interval
$1/\xi$ = average slot rate specified for the system
$1/\lambda^*$ = approximate average new-message request rate specified for the Network

[*This is an estimate because it does not include any uplink messages that are ordered by the HCC (ergo not requested by CPE). These are such messages as those associated with initialization and time control of a network. These messages are assumed to be relatively rare.]

These parameters relate to the Operating Point of Attachment 2, Section 2-4 herein. We have from Attachment 2 Equation 3, the efficiency:

$$E(Np) = \xi/\lambda$$

Where Np is the Operating Point of the disclosed embodiment as defined in the referenced Attachment. In an embodiment of the disclosed method, the Operating Point will be selected depending on the exact objective of the embodiment. This value will be between 0 and 1.

In most embodiments foreseen the uplink will be kept full during times of critical or "peak traffic" operation. It is obvious that when there is a dearth of demand for service and control messages, the performance of an embodiment is improved by filling the surplus capacity with ASBIs. This speeds the responsiveness of the method.

It is conceivable that embodiments will run with an Operating Point closer to 0 then typical in order to increase system robustness to peaks in message demand, and/or because of the desire for very little throughput delay.

Let R be the information rate of the uplink channel. An estimate of R is, $$R = \Lambda_M/\lambda + \Lambda_A/\xi$$

The question of the tolerance of system is addressed to increases and decreases in length and rate parameters over some time period.

The Operating Parameters are fixed. The actual values of these factors vary from instant-to-instant. These values are denoted as follows: For any time period (t, t+τ), where τ is the span of the period:

$\Lambda_A(t, \tau)$ is the average length, in bits, of Aloha slots in the period
$\Lambda_M(t, \tau)$ is the average length, in bits, of messages in the period
$1/\lambda(t, \tau)$ is the average message rate in the period
$1/\xi(t, \tau)$ is the average slot rate in the period Under-Burdening the Disclosed Method What happens when the demand relaxes on a Network that is using the BSDP method? If the rates remain at the Operating Point, but either or both of the following are true, $$\Lambda_M(t,\tau) < \Lambda_M$$

$$\Lambda_A(t,\tau) < \Lambda_A$$

the system simply has extra capacity. It is expected $\Lambda_A$ to be a constant in most embodiments.) This does not cause degradation of performance. The extra capacity can be used as desired (probably with extra Aloha slots, thereby moving Np to the left and increasing the responsiveness of the method (FIG. 13).

If the average lengths remain the constant, but, $$1/\lambda(t,\tau) < 1/\lambda$$

capacity is also freed up.

The slot rate is controlled in the disclosed method. Slot rates can be decreased to keep slot use efficiency constant, but there is no point in this. It just leaves more empty capacity. Thus, slot rates can be increased, increasing responsiveness, or left the same and the excess capacity used for other control or message purposes as the designer desires. There is no loss of system performance.

In summary, the disclosed method performance does not degrade with any decrease in slot or message lengths or rates below the Operating Point values during a period of time.

Overburdening a System

Assume that the Operating Parameters of the disclosed method implemented in a particular system are selected to fill the capacity of that system. Because the capacity is committed, an implementation cannot support, for any sustained length of time, increases in slot or message lengths or rates. However, the method is robust in managing excursions to longer messages or more frequent messages so long as such excursions do not last too long.

The question is examined by assuming steady state operation up to the beginning time for an excursion—steady state meaning that RQ is near its expected depth and, on the average, IRMs are requiring close to the expected number of repeats to achieve a successful transmission. The excursion occurs of duration τ, with increased average message length and/or increased average message. Then, after the excursion, a settling times which allows the method to return to steady state operation. The embodiment designer can pick any time span T and evaluate the tolerance of the method for slot and message rates and lengths above the Operating Parameter values during time period τ. This performance is one factor to be considered in selecting the Operating Point.

Slot Rate Above the Operating Parameter Value

First consider the implications of increasing the slot rate. The Aloha Slot rate is under the complete control of the HCC. An increase might be used to decrease delay in picking up requests during a given period:

$$1/\xi(t,\tau) > 1/\xi$$

More slots taken from a full system means that less message capacity is available. More slots insure that the message requests, arrive with less delay, but still at the operating rate, $1/\lambda$. And, the slot-use efficiency decreases (Np moves to the left). For this to occur, some capacity must be freed or the requests build up.

The lowering of message capacity assures that: $1/\lambda(t,\tau) < 1/\lambda$

The formula is:

Let $\Delta_{MR}$ denote the percentage increase in message rate.
Let $\Delta_{SR}$ denote the percentage increase in slot rate.

$$\Delta_{MR} = \Delta_{SR} * \Lambda_A / E(Np) \Lambda_m \quad \text{(Equation 1)}$$

The IRs build up in RQ at the above rate due to the loss in message capacity. A reasonable choice of values leads to a 3% message rate buildup in RQ (3% of the rate, not of RQ depth) for every 100% slot rate increase. Other reasonable numbers suggest a doubling or RQ each second.

This leads to guidelines for embodiment of the method: It is practical to have RQ capacity be 10 times its expected depth E(n). Thus, something like 10 seconds of 100% surplus slot rates can be tolerated by an embodiment with these example values.

Message Rate Above the Operating Parameter Value

Increased message rate is expressed:

$$1/\lambda(t,\tau) > 1/\lambda$$

The HCC can increase slot rate to match the increased message rate, thereby maintaining slot-use efficiency. However, this reduces available capacity for message transmission, and, yet, there are more messages than set in the Operating Parameter.

The importance of the previous observation is that there is no inherent hard limit on message rate due to the Aloha request collection approach. HCC can always increase slots to keep the Aloha system stable. The only limit is when all capacity is used by ASBIs, which would not be a realistic danger in practical implementations. The price paid is, of course, that fewer messages are actually getting transmitted as more capacity is allocated to ASBIs. Thus, RQ grows.

If HCC chooses to maintain $1/\xi$, Np moves to the right (see FIGS. A2-3 of Attachment 2) with increased message rate (more requests means that p has increased).

The message rate relates to slot-use efficiency. The maximum possible increase in slot-rate efficiency determines how far message rate can increase (on a sustained or permanent basis), and still maintain successful response to requests with the method. This maximum excursion is determined by moving from the assigned Np Operating Point to an Np of 1.

$$E(1) = \xi / \lambda(t,\tau)$$

$$1/\lambda(t,\tau) - 1/\lambda = [E(Np,t,\tau) - E(Np)]/\xi \quad \text{(Equation 2)}$$

Figure 18:
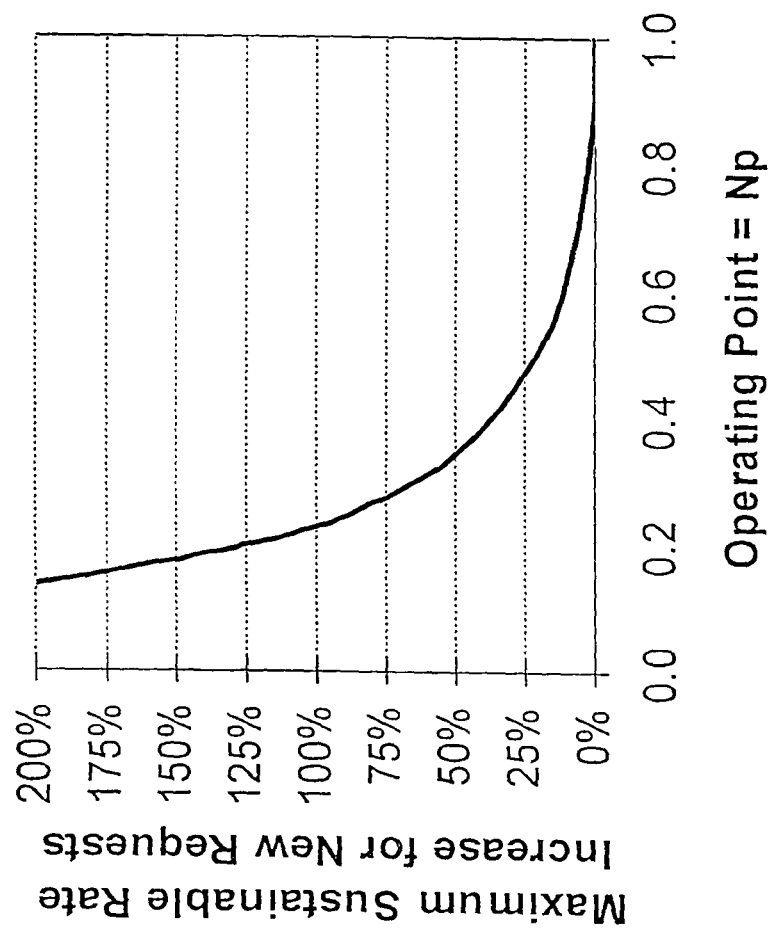

FIG. 18 presents the maximum sustainable message rate increase for a system with Operating Point Np. (Sustainable rates mean rates that can be kept at this level forever.)

For a sustaining message rate increases greater than the bound of FIGS. A4-1, the Aloha slots become increasingly blocked with requests, until in the long run every slot has contention and the system stops successfully forwarding requests.

It is to be noted that if the message rate drops below an excess rate, the method does correct itself. There is no permanent failure caused by excess message rates, so long as the average message rate eventually subsides in good form.

In the case of message rates that have increased, but not gone beyond the sustainable boundary, the limit in S is set by the limit in RQ depth. RQ has more IRs coming in than going out during this period, and the time that this can be tolerated is simply determined by the depth.

Reasonable numbers are: Given a rate increase of 50% and a ×10 RQ depth, a bit over 1 second of such overburdening can be tolerated. For excursions of message rate beyond the sustainable boundary, two effects come into play. As Np increases, Efficiency decreases, and the number of messages that can be served with a fixed slot rate decreases. Thus, requests are essentially lost for the duration of the excursion. In this case, requests that actually get into the system decrease, and RQ recedes. The damage shifts to delays at the input.

Message rates always vary; and there are always excursions to higher rates—above the sustainable rate in accordance with the modeling of the system. The impact of this is to increase the number of repeat requests attempted for a message. The impact of this natural variation in the traffic on the behavior of the method is seen best in FIG. 16. Here, to have high probability of getting a request through successfully, one has to plan for more requests than the average Message Length Above the Operating Parameter Value Message length has no effect on the performance of the request collection method in the system 10. The only impact is on the behavior or RQ.

All other parameters held constant, the impact of an increase in the average message length is to increase the number or IRs in RQ. This is simply because not as many longer messages can be transmitted in a given period of time.

The formula

Let $\Delta_{MR}$ denote the percentage increase in message rate.
Let $\Delta_{ML}$ denote the percentage increase in message length.

$$\Delta_{MR} = \Delta_{ML}/(1+\Delta_{ML})$$

The IRs build up in RQ at the above rate. A message length increase of 50% leads to a message rate decrease of 33%. The IRs build up in RQ at a rate of 33% of message rate (not RQ depth) per second. For a reasonable set of parameters and an RQ depth of ×10 the expected operating level this will give about 1 second of operation with sustained longer message lengths before RQ overflows.

Of course, when RQ nears overflow, the IR Insertion Algorithm will naturally be designed to cull IRs from RQ. Such culling is noted at the CPE sites of the messages being culled, and they can react in a controlled fashion. Thus, the disclosed method remains effective under such circumstance.

Summary Re Operating Parameter Excursions

The operation of the disclosed method, as patented herewith, depends on the controlling of the offered message rate, and on the average message length at the CPEs.

However, the disclosed method is robust to "reasonable" excursions of these parameters in intervals of reasonable size, making the method meet the standard of practical applicability.

IRSF Sensitivities

Inherent in the disclosed method is the use of the ASBIs. IRMs are transmitted in groups in the ASBI in order to have the interval size relatively large, as required to harmonize in the embodiment, and the requests are small relative to the average message size, as required for efficient use of the channel. This architecture also supports the effective re-transmission process.

A very general IRSF method is discussed hereafter in order to provide a context for exploring the issues faced in designing the IRSF method for an embodiment. In the progression of this discussion, the existence of an IRSF method that functions in a matter required by the disclosed method is confirmed.

In order to examine the behavior of the IRSF, certain variables are considered:

ρ=probability of a transmission of a new IRM (first time) by a terminal into an Aloha slot.

p=probability of a transmission of an IRM by a terminal into an Aloha slot.

S is a span of Aloha slots being in or across ASBIs.

$S_i$ is Span i in a sequence of spans.

$\pi_i$=is the expected probability that an IRM will be transmitted by one terminal into the $S_i$ $k_i$ is the size of Span i.

Figure 19:
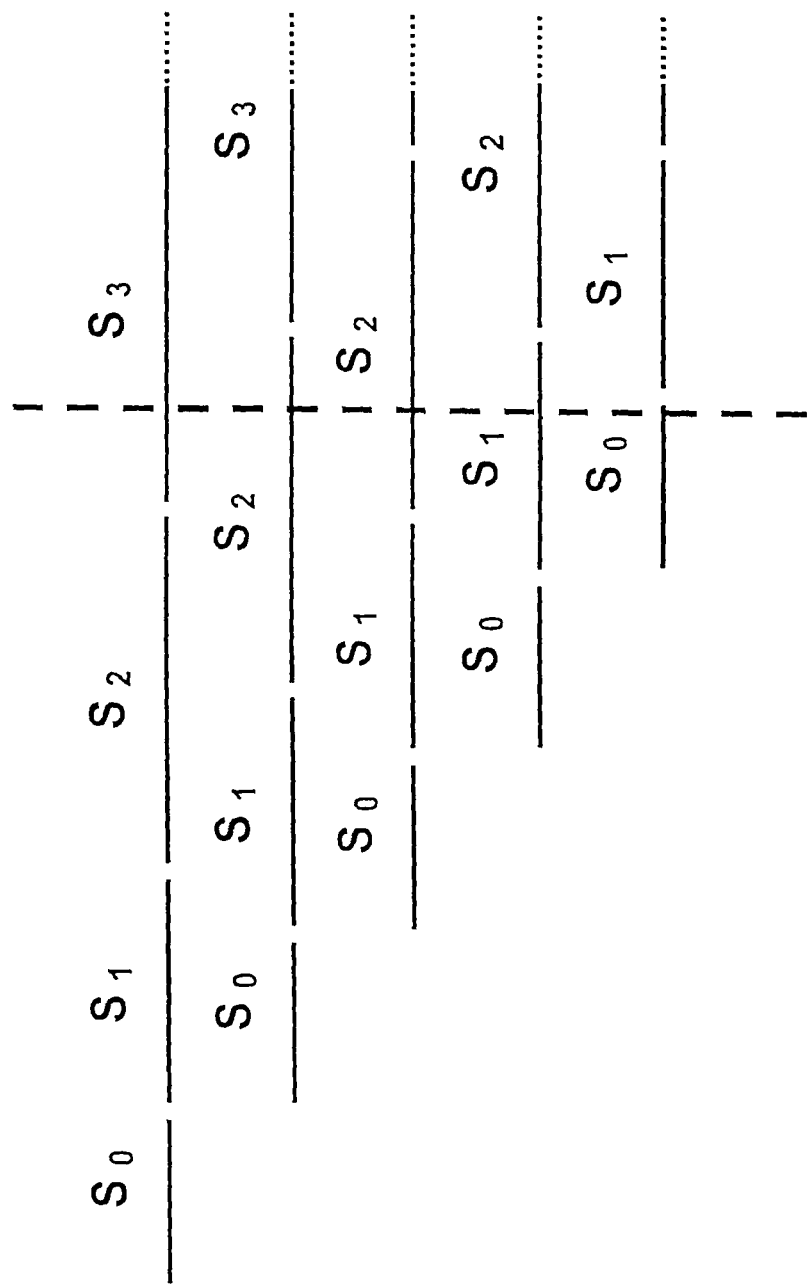

In general p>ρ because of re-transmissions. If retransmissions are spread smoothly over the Aloha slots, Equation 4, gives $Np=N\tau e^{Np}$ FIG. 19 presents the sequence of spans on a channel, each span consisting of a number of slots. For the sake of simplicity, one can think of the basic channel operates as a sequence of spans $S_0$ of size $k_0$. One $S_0$ span follows immediately after another. In span $S_0$ there is a set of new transmissions.

For the sake of simplicity, one can think of an $S_0$ span as a an interval of the disclosed method, although this need not be the case.

In the example IRSF method, each sequence of spans $S_0$, $S_1$, ... is defined as the sequence of spans used by a set of terminals that have transmitted a message (e.g. IRM) for the first time into the span $S_0$. Note that this set of transmitters does not include terminals that re-transmitted into $S_0$. The probability of a new transmission into a slot terminal is defined as p. For an $S_0$ span, the variable $\pi_o$ is introduced, the subscript referencing the span, $$\pi_0=\rho$$

Note that in the system 10, the second equality is Equation 3, results in:

$$N\rho=\xi/\lambda=E(Np) \quad \text{(Equation 3)}$$

The channel is assumed to run at a steady state with probability of transmission into a slot—repeats and originals, of p.

In the example IRSF method, $S_i$ is a second interval of size $k_1$. $S_1$ immediately follows $S_0$. $S_1$ contains the first retransmission of terminals that transmitted into the proceeding $S_0$ and encountered contention. Each transmission with its retransmissions is part of a unique sequence as indicated in FIG. 19. The activity from each of these sequences adds to give the total activity in a slot.

If the probability of a transmission into any slot of a span is equal to the expected probability Np, the expected number of retransmissions from $S_0$ into $S_1$ is $$\text{Expected retransmissions}=k_0[1-(1-p)^{N-1}]\pi_0 \quad \text{(Equation 4)}$$

In general, the expected number of $i^{th}$ retransmissions is denoted $\pi_i$.

$$\pi_i=(\Pi_{j=1,i}k_{i-1}[1-(1-p)^{N-1}]/k_i)\pi_0$$

$$\pi_i=(k_0/k_i)[1-(1-p)^{N-1}]\pi_0$$

There are $k_0$ slots in all $S_0$, each of which contributes a contention with independent probability $[1-(1-p)^{N-1}]\pi_0$. Thus, the expected number of contentions from original transmissions into $S_0$ is $k_0[1-(1-p)^{N-1}]\pi_0$.

The index m, m=−1, 0, 1, 2, ..., is introduced to distinguish the contiguous sequence of $S_0$'s. The sequence of $S_0$'s is denoted:

..., $S_{0,m}$, $S_{0,m+1}$, ....

We also note a particular sequence of retransmissions, as depicted in FIGS. A2-5, by tying it to the particular $S_0$ span that started the sequence, $S_{0,m}$.

..., $S_{0,m}$, $S_{1,m}$, $S_{2,m}$, ....

In fact, the "p" of Equation 4 here above varies from $S_0$ to $S_0$ in a known way, p being the expected value of this variable.

The probability p consists of two components, that component due to random first time transmissions and that due to retransmissions. From Attachment 2, Equation 5, it is known that on the average, $$p=\rho e^{Np}=\rho+\rho(e^{Np}-1)$$

The second term of this expression is the contribution to p due to repeated transmissions. This statistic is an ensemble statistic—in practical sense determined by averaging over a large number of slots. In the embodiment method of retransmission considered here, retransmissions are spread over following spans of some determined size. So, there is correlation of the retransmission probability from one span to the next. Thus, there is correlation in each $S_0$ span on the aggregate probability of transmission into a given slot of $S_0$. To encapsulate: The probability p varies in a deterministic way from one $S_0$ span to the next $S_0$ span.

Explicitly recognizing this correlated variation in p from one $S_0$ to the next, $$\text{Expected retransmissions into span } S_{1,m}= k_0[1-(1-p_m)^{N-1}]\pi_0 \quad \text{(Equation 5)}$$

Considering FIG. 19, the impact of retransmission statistics on an arbitrary $S_{0,m}$ can be seen: A specific slot in any $S_0$ interval sees the same pattern of overlapping sequences (noting that $k_i$ has the same value for every sequence of spans in this example embodiment). There are int $[k_i/k_0]$ overlap segments, one segment being a remainder segment smaller than $k_0$, unless $k_1$ is an integer multiple of $k_0$. For example, if $k_1/\lambda_0$ is 1.5, there is one complete overlap from the previous $S_0$ span, and ½ overlap from the span before that.

In the example embodiment, the distribution of retransmissions is chosen in a span so that the impact on the aggregate in the underlying sequence of $S_0$ intervals is most random—a uniform distribution. It is first noted that the condition $k_i \geq k_0$ is required so that a distribution can be spread over the $S_0$ interval, otherwise it is always impossible to achieve a uniform distribution in $S_0$.

$$k_i \geq k_0 \quad \text{(Equation 6)}$$

With this simple condition, the distribution is determined from first principles (i.e. observation). One observes that the distribution of a retransmission into the next span should be randomized uniformly only if each element of the sequence of span sizes: $k_0, k_1, ...$ is an integer multiple of $k_0$. In general, with non-integer relationships, the choice of distribution is affected by the partial overlap. The observation is: That portion of slots at the end of a Span $S_{i,m}$ that appear as a partial span value in the overlap of span $S_{0,m+k}$ should be assigned random retransmission with ½ the probability of the other slots in the next span. (This is true also for the opposite end of the span.) This probability is chosen so that the net impact on each slot is to receive assignment of repeats from that span (in all sequences) with the same probability.

For example if $k_1/k_0$ is 1.5, the distribution is described: the first ⅓ slots have uniform probability for ¼ of retransmission, the next ⅓ have uniform probability for ½ of the retransmissions, and the last ⅓ have uniform probability for ¼ of the retransmissions.

As can be seen from FIG. 16, there is a proportion of each $S_{i,m}$ sequence affecting the total probability of transmission into a slot of $S_{0,m+k}$. For example, ⅔ of $S_{1,m-1}$ and ⅓ of $S_{1,m-2}$ affect the total probability of transmission into $S_{0,m}$ in the example where $k_1/k_0=1.5$.

For each slot position of $S_{0,m}$, a slice taken cross the ensemble of span sequences, as illustrated in FIG. 16, intersects a set $S_{1,m}$'s, each contributing to the probability that a first retransmission is transmitted into said slot. The expression for the contribution is different for different slots in $S_{0,m}$, but has the form $\Sigma_{i=1,\infty} d_{1,i} k_0 [1-(1-p_{m-i})^{N-1}] \pi_0/k_1$. The $d_{1,i}$ term is 0 for m–i that do not contribute to the probability, and contains the distribution and proportion factors in the case where there is an m–i contribution.

For the example, in the first half of the $S_{0,m}$ span, $d_{1,1}$ is ¾ and $d_{1,2}$ is ¾. In the second half of the $S_{0,m}$ span $d_{1,1}$ is ½ and $d_{1,2}$ is 0.

$$(\tfrac{3}{4})k_0[1-(1-p_{m-1})^{N-1}]\pi_0/k_1 + (\tfrac{3}{4})k_0[1-(1-p_{m-2})^{N-1}]\pi_0/k_1,\text{ first half of slots}$$

$$(\tfrac{1}{2})k_0[1-(1-p_{m-1})^{N-1}]\pi_0/k_1,\text{ second half of slots}$$

Note that if $p_{m-2}=p_{m-1}=p$, the probability of a first retransmit in any slot of the span for the example reduces to $(3/2) k_0[1-(1-p)^{N-1}]\pi_0/k_1 = [1-(1-p)^{N-1}]\pi_0$.

In general $\Sigma_{i=1,\infty} d_{q,i} = k_q/k_0$

The probability of first re-transmissions into a particular slot of $S_{0,m}+$, is denoted $a_{1,m}$, $$a_{i,m} = \Sigma_{i=1,\infty} d_{1,i} k_0 [1-(1-p_{m-i})^{N-1}]\pi_0/k_1 = (k_0/k_1)\Sigma_{i=1,\infty} d_{1,i}[1-(1-p_{m-i})^{N-1}]\pi_0$$

and, continuing with later retransmissions, $$a_{2,m} = (k_1/k_2)\Sigma_{j=1,\infty} d_{2,j}[1-(1-p_{m-j})^{N-1}]\pi_{1,m-j}$$

$$a_{2,m} = (k_0/k_2)\Sigma_{j=1,\infty} d_{2,j}[1-(1-p_{m-j})^{N-1}][1-(1-p_{m-1})^{N-1}]]\pi_0$$

Note that if $p_{m-i}=p$, $a_{1,m}=(k_1/k_0)\pi_{1,m}=(k_1 k_0)\pi_1=[1-(1-p)^{N-1}]^i \pi_0$, and, $$a_{2,m} = [1-(1-p)^{N-1}]^2 \pi_0$$

In general, $$a_{i,m} = (k_{i-1}/k_i)\Sigma_{j=1,\infty} d_{i,j}[1-(1-p_{m-j})^{N-1}](k_0/k_1)(\Pi_{q=1,i-1}[1-(1-p_{m-q})^{N-1}])\pi_0$$

And, with $p_{m-i}=p$, $$a_{i,m} = [1-(1-p)^{N-1}]^i \pi_0$$

The complexity of the general expression highlights the correlation of $p_m$ from one m to the next. This can be seen by, $$p_m = \Sigma_{i=0,\infty} a_{i,m} \quad \text{(Equation 7)}$$

where $a_{0,m}=\rho$. Again, considering the case $p_{m-i}=p$, the consistency of the model is confirmed:

$$p_m = \Sigma_{i=0,\infty}[1-(1-p)^{N-1}]^i \pi_0 = e^{Np}\rho = p$$

Demonstrating the inherent stability of the method and the existence of a satisfactory IRSF.

The focus here is stability and sensitivity of the IRSF function. The above discussion illuminates both the underlying good behavior of the system request methodology and the areas of sensitivity to design parameters. The expected deviation of $p_m$ from p is what determines the excursions that a system request method will have from its expected performance. This may be governed by the Law-of-Large Numbers in two aspects: (1) The number of contentions in a span has an expectation. The likelihood that the actual number is near the expectation depends on the size of the span being large with respect to the expected number of contentions. Practically speaking, with a reasonable Operating Point, between 10 and 30 contentions should be expected in the initial span where the sensitivity is most significant to give reasonable stability. (2) The process should de-correlate quite rapidly over a number of $S_{0,m}$'s. This is accomplished most simply by making the span ratios large—thereby making the likelihood of a repeat transmission relatively rare in any given slot.

The response time of the method is maximized if the spans are small, and $k_i$ is close to $k_{i-1}$. There may be the constraint that $k_i \geq k_0$). On the other hand, both of these desirable traits cause the method to deviate in behavior from one $S_{0,m}$ span to the next. In the disclosed method, this deviation is manifest in a certain burstiness characteristic in the throughput of IRs. This in turn necessitates greater buffering in the BSDP method in a number of places—RQ, message transmit queues, Local IR Pools, and the Master IR Pool. The burstiness in throughput also implies delay in its own right.

There are a number of approaches to the design of IRSF. The simplest is to balance the buffering and delay so that the system never (i.e. with very low probability) overruns buffer sizes. Equation 7 is used in the design process to evaluate needed buffer sizes. A second very controllable method is to simply limit the number of retransmissions, thereby assuring finite $S_{i,m}$ sequences and, therewith, the de-correlation of $p_m$'s in a few spans.

Other modifications can be made to various different embodiments of the present invention by those skilled in the art without departing from the scope thereof. While several forms of the invention have been illustrated and described, it will also be apparent that various modifications can be made without departing from the spirit and scope of the embodiments of the invention.

While particular embodiments of the present invention have been disclosed, it is to be understood that various different modifications and combinations are possible and are contemplated within the true spirit and scope of the disclosed embodiments and the appended claims. There is no intention, therefore, of limitations to the exact disclosure herein presented.

What is claimed is:

1. A Consumer Premise Equipment (CPE), comprising:
 a receiver configured to receive one or more messages; and
 a memory configured to store a request queue update message received from a headend unit, the request queue update message including requests for transmission time intervals for transmissions from one or more other CPE units and at least some of the requests being processed at the headend unit to update a master request queue, wherein the memory is also configured to be updated with requests from the request queue update message;
 a processor configured to apply an algorithm to determine that the memory is updated to substantially match the master request queue at the headend unit; and
 a transmitter configured to transmit an upstream message during at least one transmission time interval assigned to the CPE and stored in the memory.

2. The CPE according to claim 1, wherein the CPE is adapted for a burst interval on the uplink channel.

3. The CPE according to claim 1, wherein the CPE is adapted for an Aloha slot burst interval.

4. The CPE according to claim 1, wherein the CPE is configured to operate with one of uplink and downlink channels adapted for time division multiple access.

5. The CPE according to claim 1, wherein the CPE is configured to operate with an uplink channel that is locked to the downlink channel for clock synchronization.

6. A method comprising:
 receiving at a Consumer Premise Equipment (CPE) a request queue update message from at least one headend unit, the request queue update message comprising a plurality of interval requests for transmission time intervals for transmissions from at least one of the CPE and one or more other CPE units, at least some of the plurality of interval requests being processed at the headend unit to update a master request queue located at the headend unit;

updating a local request queue stored in at least one memory of the CPE with requests from the request queue update message;

applying an algorithm by a processor device of the CPE to determine that the local request queue is updated to substantially match the master request queue;

transmitting an upstream message during at least one transmission time interval assigned to the CPE according to the local request queue.

7. The method of claim 6 further comprising:
transmitting during an uplink burst interval to the headend unit at least one interval request.

8. The method of claim 7 wherein the uplink burst interval further comprises an uplink Aloha slot burst interval.

9. The method of claim 6 wherein transmitting the upstream message further comprises transmitting the upstream message on an uplink channel adapted for time division multiple access.

10. The method of claim 6 further comprising:
receiving at the CPE at least one downstream message intended for at least one presentation device via a downlink channel adapted for time division multiple access, wherein the at least one presentation device is coupled to a computing device 11. The method of claim 6 further comprising:
operating with at least one uplink channel to the headend unit that is locked to a downlink channel from the headend unit for clock synchronization.

12. A non-transitory computer-readable medium having stored thereon computer-executable instructions that, in response to execution by a computing device, cause the computing device to perform operations comprising:

receiving a request queue update message from at least one headend unit, the request queue update message comprising a plurality of interval requests for transmission time intervals for transmissions from at least one of the computing device and one or more other Consumer Premise Equipment (CPE) units, at least some of the plurality of interval requests being processed at the headend unit to update a master request queue located at the headend unit;

updating a local request queue stored in at least one memory of the CPE with requests from the request queue update message;

applying an algorithm to determine that the local request queue is updated to substantially match the master request queue;

transmitting an upstream message during at least one transmission time interval assigned to the computing device according to the local request queue.

13. The non-transitory computer-readable medium of claim 12 having stored thereon, additional computer-executable instructions that, in response to execution by the computing device, cause the computing device to perform further operations comprising:
transmitting during an uplink burst interval to the headend unit at least one interval request.

14. The non-transitory computer-readable medium of claim 13 wherein the uplink burst interval further comprises an uplink Aloha slot burst interval.

15. The non-transitory computer-readable medium of claim 12 wherein transmitting the upstream message further comprises transmitting the upstream message on an uplink channel adapted for time division multiple access.

16. The non-transitory computer-readable medium of claim 12 having stored thereon, additional computer-executable instructions that, in response to execution by the computing device, cause the computing device to perform further operations comprising:
receiving at least one downstream message intended for at least one presentation device via a downlink channel adapted for time division multiple access, wherein the at least one presentation device is coupled to the computing device.

17. The non-transitory computer-readable medium of claim 12 having stored thereon, additional computer-executable instructions that, in response to execution by the computing device, cause the computing device to perform further operations comprising:
operating with at least one uplink channel to the headend unit that is locked to a downlink channel from the headend unit for clock synchronization.

\* \* \* \* \*